(12) United States Patent
Maeda

(10) Patent No.: US 6,389,162 B2
(45) Date of Patent: May 14, 2002

(54) IMAGE PROCESSING APPARATUS AND METHOD AND MEDIUM

(75) Inventor: Mitsuru Maeda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 08/798,132

(22) Filed: Feb. 12, 1997

(30) Foreign Application Priority Data

Feb. 15, 1996 (JP) .............................................. 8-027893
Feb. 21, 1996 (JP) .............................................. 8-033625

(51) Int. Cl.[7] ................................................ G06K 9/00
(52) U.S. Cl. ......................... 382/172; 382/176; 382/165
(58) Field of Search ................................ 382/168–172, 382/251, 176, 224, 180, 162, 165, 166; 358/462, 464, 466, 518–522, 461, 463, 465, 467

(56) References Cited

U.S. PATENT DOCUMENTS

| 4,601,057 A | * | 7/1986 | Tsuji et al. .................. 382/172 |
| 5,060,280 A | | 10/1991 | Mita et al. ..................... 382/33 |
| 5,086,487 A | | 2/1992 | Katayama et al. ............. 382/56 |
| 5,113,492 A | | 5/1992 | Ariki et al. .................. 395/147 |
| 5,124,811 A | | 6/1992 | Ohsawa et al. ............. 358/448 |
| 5,136,396 A | | 8/1992 | Kato et al. .................. 358/426 |
| 5,138,672 A | | 8/1992 | Hirabayashi et al. ......... 382/54 |
| 5,153,749 A | | 10/1992 | Katayama .................... 358/448 |
| 5,159,468 A | | 10/1992 | Yoshida et al. ............. 358/451 |
| 5,289,296 A | | 2/1994 | Yamada ....................... 358/530 |
| 5,303,381 A | | 4/1994 | Yagasaki ..................... 395/800 |
| 5,309,524 A | | 5/1994 | Hirabayashi et al. ......... 382/47 |
| 5,317,411 A | | 5/1994 | Yoshida .................... 358/261.2 |
| 5,331,426 A | | 7/1994 | Kato et al. .................. 358/426 |
| 5,351,314 A | | 9/1994 | Vaezi ............................ 382/54 |
| 5,361,147 A | | 11/1994 | Katayama et al. .......... 358/352 |
| 5,363,219 A | | 11/1994 | Yoshida ...................... 358/539 |
| 5,416,606 A | | 5/1995 | Katayama et al. .......... 382/173 |
| 5,436,981 A | | 7/1995 | Ishikawa ..................... 382/173 |
| 5,465,164 A | | 11/1995 | Sugiura et al. ............. 358/448 |

FOREIGN PATENT DOCUMENTS

| EP | 0325417 | 7/1989 | ........... G06F/15/62 |
| EP | 0415373 | 3/1991 | ............ G06K/9/20 |
| EP | 0496531 | 7/1992 | ............ G06K/9/32 |
| EP | 0516576 | 12/1992 | ............ G06K/9/20 |
| EP | 0587450 | 3/1994 | ............ G06K/9/20 |
| EP | 0629078 | 12/1994 | ............ H04N/1/40 |
| GB | 2217548 | 10/1989 | .......... H04N/1/387 |
| JP | 62226770 | 10/1987 | |
| JP | 6415889 | 1/1989 | |
| JP | 3126181 | 5/1991 | |
| JP | 4248766 | 9/1992 | |
| JP | 5233873 | 9/1993 | |
| JP | 8-30725 | 2/1996 | |

OTHER PUBLICATIONS

M.Matsuki et al., "Structured Color Facsimile for Composite Color Document", vol. 24, No. 1, pp. 26–33, 1995.*

(List continued on next page.)

Primary Examiner—Phuoc Tran
(74) Attorney, Agent, or Firm—Fitzpatrick, Cella, Harper & Scinto

(57) ABSTRACT

There are provided an image processing apparatus and method which can properly determine the number of quantization levels for quantizing image data by properly removing noise from the background of the image data. A histogram forming unit forms the output frequency distribution of densities of image data. A background density width detecting unit determines a density area exhibiting output frequency values equal to or larger than a predetermined threshold and including a maximum output frequency value in the formed distribution. A quantization level count determining unit decides the number of quantization levels on the basis of the number of maximum values included in the distribution other than the determined density area.

30 Claims, 53 Drawing Sheets

OTHER PUBLICATIONS

Matsumoto, Kobayashi: "Study on the Effect of the Resolution Conversion on Picture Quality", The Journal of the Institute of Image Electronics Engineers of Japan, vol. 12, No. 5, pp. 354–362, 1983.

The Transactions of the Institute of Electronics, Information and Communication Engineers, B–I, vol. J75–BI, No. 6, pp. 422–430, 1992, Jun. 1992.

IBM Technical Disclosure Bulletin, vol. 31, No. 7, pp. 73–74, XP00011103, "Automatic Document Segmentation".

Proceedings of the International Conference On Pattern Recognition, Atlantic City, New Jersey, Jun. 16–21, 1990, Conference A.Computer Vision and Conference B: Pattern Recognition Systems and Applications, Jun. 16, 1990, Institute of Electrical and Electronics Engineers, pp. 551–556, Shuichi Tsujimoto, et al. "Undrestanding Multi–Articled Documents", p. 554, Section "3.3 Virtual field separators for universal transformations".

Computer, vol. 25, No. 7, Jul. 1, 1992, pp. 67–71, "DRS: A Workstation–Based Document Recognition System for Text Entry", p. 69, Section "Page structure analysis".

"Automated Entry System For Printed Documents", T. Akiyama et al. Patter Recognition, 1990, UK, vol. 23, No. 11, ISSN 0031–3203, pp. 1141–1154.

Tetsutani, et al., "Method of Binarizing a Document of Mixed Bi–Level Images and Grayscale", Denshi Tsushin Gakkai Ronbunshi, vol. J67–B, No. 7 (1984), pp. 781–788.

Matsuki et al., "Structured Color Facsimile For Composite Color Document", The Journal of The Institute Of Image Electronics Engineers Of Japan, vol. 24, No. 1, pp. 26–33.

* cited by examiner

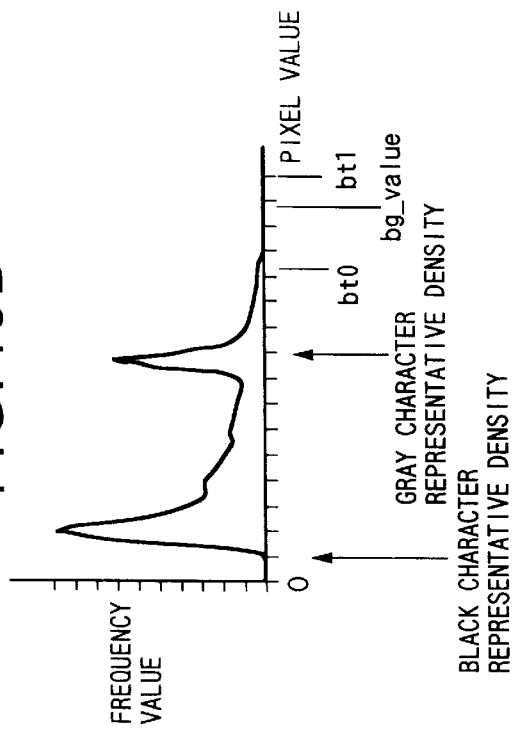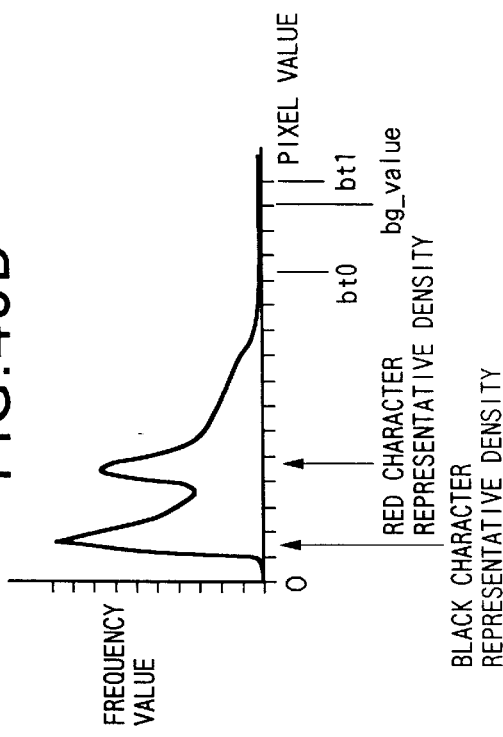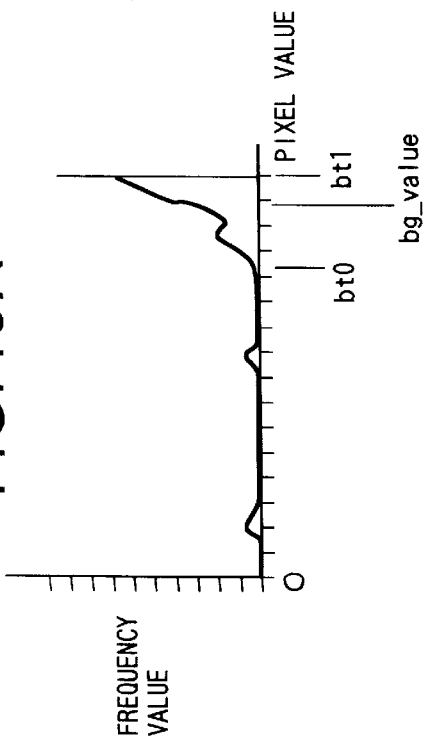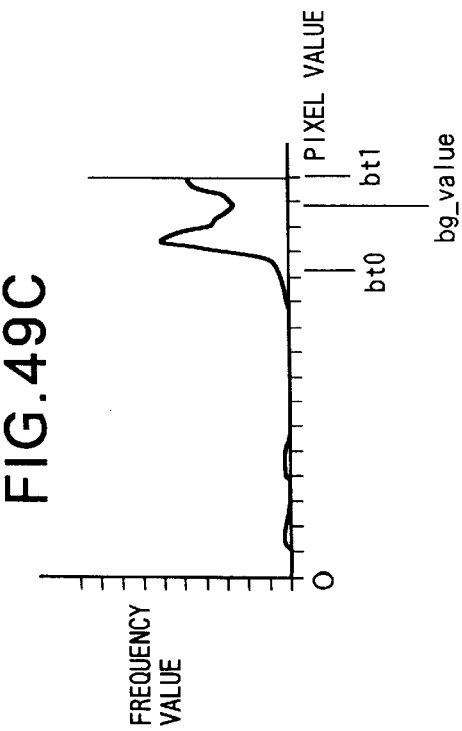

IMAGE PROCESSING APPARATUS AND METHOD AND MEDIUM

BACKGROUND OF THE INVENTION

1. Field of the Invention

The present invention relates to an image processing apparatus and method which examine the characteristics of multi-level image data, and a medium therefor.

2. Description of the Related Art

A technique of expressing an original image by the constituent elements of the original image has recently been developed. More specifically, the attributes and format of an original image, e.g., "image", "graphic pattern", "character", "chapter", "section", "paragraph", "title", and "caption", are defined. An image area separation technique has been realized, which is designed to output information about the attributes and format to be defined, and perform display and retrieval of the original image on the basis of the output information about the attributes and format. These techniques have become popular in the form of data exchanged through networks represented by Internet with development and widespread use of international communication networks, and in the form of SGML in the U.S.A.

In addition, a technique of transmitting and storing image data after properly encoding the image data by switching encoding schemes in units of attributes has been studied as disclosed in Matsuki et al., "Structured Color Facsimile for Composite Color Document", THE JOURNAL OF THE INSTITUTE OF IMAGE ELECTRONICS ENGINEERS OF JAPAN, Vol. 24, No. 1, pp. 26–33.

For example, Japanese Patent Laid-Open No. 8-30725 discloses a technique of inputting a binary original image, and determining information about the attributes and format of the image. In this technique, one pixel with a low resolution is extracted from a predetermined pixel area in image data obtained from an input original image, and the information about the attributes and format of the image is determined on the basis of the spread of pixels with low resolutions. The determined information about the attributes and format of an original image can be extracted, or an area having information about desired attributes and format can be extracted.

According to an image area separation technique, in inputting an original image with a scanner or the like, if, for example, the original image has density irregularity, or a shadow of the reverse side is casted, or the background density of the original image is high, noise is caused in the background of image data obtained from the original image. This noise degrades the precision of image area separation processing. In addition, when image data including such noise in the background is output at a printer or the like, the image quality of the output image is degraded. For this reason, an image processing apparatus which removes such noise from the background of image data is available.

In such an image processing apparatus designed to removes noise from the background of image data, for example, a background density is determined on the basis of the average density of an original image, and control is performed not to output image data having a density equal to or lower than the determined density, thereby removing noise from the background of the image data. Alternatively, correction such as gamma correction is performed for the input/output densities of an original image to remove noise from the background of image data.

If, however, above conventional image processing apparatus uses the method of removing noise from the background on the basis of the average density of an original image, the image quality of an output image obtained from an original image including low-density characters or a continuous-tone image portion is degraded because the densities of these portions are lower than the background density and control is performed not to output the low-density portions of the image including the low-density characters or the continuous-tone image portion.

According to the method of removing noise from the background of image data by performing correction such as gamma correction, when the background density of an original image is close to that of a white portion, output of the background density of the image data is suppressed. As a result, noise is removed from the background. If, however, the background density is high, output of the background density of the image data is emphasized. As a result, the image is output with noise caused in the background being amplified.

As described above, in these methods, the problems associated with the precision of the image area isolation technique and degradation in image quality of output images are still left unsolved in the above cases.

According to image area separation processing executed in the above conventional image processing apparatus, image data obtained by reading an original image is binarized, and image area separation processing is performed for the resultant binary image data. For this reason, a "graphic pattern" which can be easily binarized cannot be properly separated from a "photograph" which cannot be easily binarized. In addition, when an original image partly having color characters or the like for emphasis is to be recognized, image area separation is performed without recognizing the color. For this reason, even if the separate characters are recognized by OCR or the like, since the color information of the characters is not recognized, a desired OCR result cannot be obtained.

Furthermore, even image data from which noise caused in the background is removed cannot be efficiently encoded to be transmitted or stored if the background density varies.

SUMMARY OF THE INVENTION

The present invention has been made in consideration of the above situation, and has as its object to properly perform quantization in accordance with the characteristics of a target image.

In order to achieve the above object, according to the present invention, there is provided an image processing apparatus comprising, input means for inputting multi-level image data representing an image, extracting means for extracting binary image data from the multi-level image data, dividing means for dividing the image into a plurality of blocks based on the binary image data, and quantizing means for quantizing the multi-level image data in the blocks, the number of levels of quantized multi-level image data are determined in units of the blocks.

It is another object of the present invention to properly determine the number of quantization levels for quantizing image data by properly removing noise from the background of the image data.

In order to achieve the above object, according to the present invention, there is provided an image processing apparatus comprising, forming means for forming a frequency distribution of densities of image data, determining means for determining a density area exhibiting frequency values not less than a predetermined threshold and including a maximum frequency value in the distribution formed by the forming means, and first deciding means for deciding the number of quantization levels on the basis of the number of maximum values included in the distribution other than the density area determined by the determining means.

It is still another object of the present invention to properly extract color characters.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 49A and 49B are graphs for explaining how background density widths, background representative densities, and foreground color representative densities are extracted by a conventional method, and FIGS. 49C and 49D are graphs for explaining how background density widths, background representative densities, and foreground color representative densities are extracted in the sixth embodiment;

DESCRIPTION OF THE PREFERRED EMBODIMENTS

The preferred embodiments of the present invention will be described in detail below with reference to the accompanying drawings.

<First Embodiment>

Figure 1:
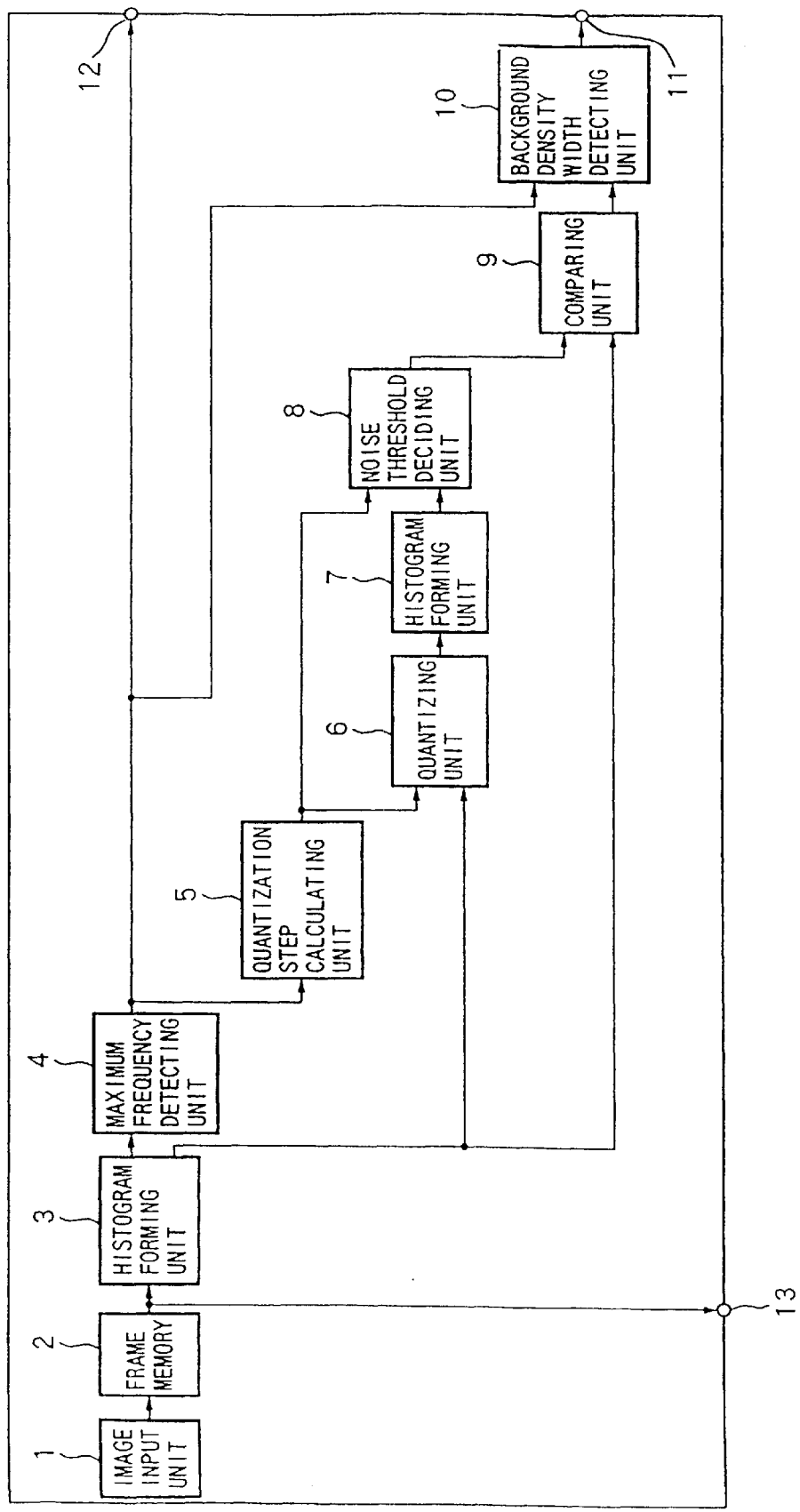
FIG. 1 is a block diagram showing the arrangement of an image processing apparatus according to the first embodiment of the present invention.

FIG. 1 is a block diagram showing the arrangement of an image processing apparatus according to the first embodiment.

Referring to FIG. 1, reference numeral 1 denotes an image input unit for inputting an original image. The image input unit 1 is constituted by an image scanner including a photoelectric conversion means such as a CCD sensor and the like. The following description is based on the assumption that a monochrome multi-level image (8 bits/pixel) is input as an original image. Reference numeral 2 denotes a frame memory for storing image data of an original image which is obtained by the image input unit 1.

Reference numeral 3 denotes a histogram forming unit for forming a histogram of the pixel values of the image data (multi-level image data of 8 bits/pixel) read out from the frame memory 2.

The histogram forming unit 3 is constituted by 256 counters. The respective counters correspond to the pixel values of the readout image data (multi-level image data of 8 bits/pixel). Every time multi-level image data is read out, the counters corresponding to the pixel values of the data are incremented by one.

Reference numeral 4 denotes a maximum frequency detecting unit for outputting the maximum output frequency value in a histogram and the pixel value exhibiting this maximum value; and 5, a quantization step calculating unit for deciding a quantization step q for quantizing a frequency distribution (histogram) on the basis of the maximum value detected by the maximum frequency detecting unit 4.

Reference numeral 6 denotes a quantizing unit for quantizing a histogram with the quantization step calculated by the quantization step calculating unit 5; 7, a histogram forming unit which is constituted by 101 counters and designed to form a histogram of the output from the quantizing unit 6; and 8, a noise threshold deciding unit for deciding a frequency noise threshold for removing frequency noise on the basis of the output from the histogram forming unit 7 and the quantization step q calculated by the quantization step calculating unit 5.

Reference numeral 9 comparing the frequency noise threshold decided by the noise threshold deciding unit 8 with the histogram formed by the histogram forming unit 3; and 10, a background density width detecting unit for obtaining the width of the densities of pixels constituting the background from the maximum value detected by the maximum frequency detecting unit 4 and the output from the comparing unit 9.

Reference numeral 11 denotes a terminal for outputting the width of the densities of the pixels constituting the background, which is detected by the background density width detecting unit 10, to an external apparatus; 12, a terminal for outputting the background density detected by the maximum frequency detecting unit 4 to the external apparatus; and 13, a terminal for outputting the contents of the frame memory 2 to the external apparatus.

Each constituent element of the image processing apparatus in FIG. 1 is controlled by a CPU (not shown).

The processing executed by the image processing apparatus will be described next with reference to FIG. 1.

Prior to the execution of the processing, the CPU (not shown) clears the contents of the frame memory 2 and the counters of the histogram forming units 3 and 7 to 0.

Subsequently, the CPU receives image data representing monochrome multi-level image (8 bits/pixel) from the image input unit 1 and stores the image data in the frame memory 2 in accordance with an instruction from the user. After one-frame image data is stored in the frame memory 2, the CPU reads out the image data from the frame memory 2 and inputs it to the histogram forming unit 3. The 256 counters of the histogram forming unit 3 correspond to the respective pixel values of the input image data. Every time 1-pixel image data is input, the contents of the counter corresponding to the pixel value of the input data are incremented by one.

After a histogram is formed from all the pixels of the input image data, the CPU operates the maximum frequency detecting unit 4 to detect the pixel value having the maximum output frequency value in the histogram (the pixel value corresponding to the maximum counter value). The CPU then outputs a detected maximum output frequency value m and the corresponding pixel value. This pixel value represents a background density, which will be referred to as a background representative density b. The background representative density b is output from the terminal 12.

The detected maximum output frequency value m is input to the quantization step calculating unit 5. The quantization step calculating unit 5 decides the quantization step q for normalizing a histogram according to equation (1):

$$q=m/100 \qquad (1)$$

The decided quantization step q is input to the quantizing unit 6. When the quantization step q is input, the quantizing unit 6 sequentially reads out output frequency values h(i) (i=0 to 255) (histogram) formed by the histogram forming unit 3, starting from the minimum value h(0), and quantizes the values according to equation (2) to obtain quantization results r(i) (i=0 to 255):

$$r(i)=h(i)//q \text{ (i=0 to 255)} \qquad (2)$$

Note that the symbol "//" indicates that the decimal part of the quotient is rounded to the nearest integer.

The histogram forming unit 7 forms a histogram of the output from the quantizing unit 6. The 101 counters correspond to the values of the respective quantization results r(i), and the contents of the corresponding counters are incremented by one.

After a histogram is formed from all the quantization results r(i), the noise threshold deciding unit 8 is operated to decide a noise threshold noise_th on the basis of the contents of the counters of the histogram forming unit 7. The noise threshold deciding unit 8 detects the value of a quantization result mr taking the maximum value from the contents of the counters of the histogram forming unit 7. The noise threshold deciding unit 8 then multiplies the detected value by the quantization step q, and adds a predetermined value α to the product, thereby calculating a noise threshold. That is, the value obtained by equation (3) is calculated as the noise threshold noise_th:

$$noise\_th=mr\times q+\alpha \qquad (3)$$

The noise threshold noise_th calculated by the noise threshold deciding unit 8 is input to the comparing unit 9. The comparing unit 9 sequentially reads out the contents of the counters of the histogram forming unit 3 to compare the respective readout values with the noise threshold noise_th. If the output frequency value h(i) is larger than the noise threshold noise_th, the value h(i) is output. Otherwise, "0" is output. The resultant information is input to the background density width detecting unit 10.

Figure 2:
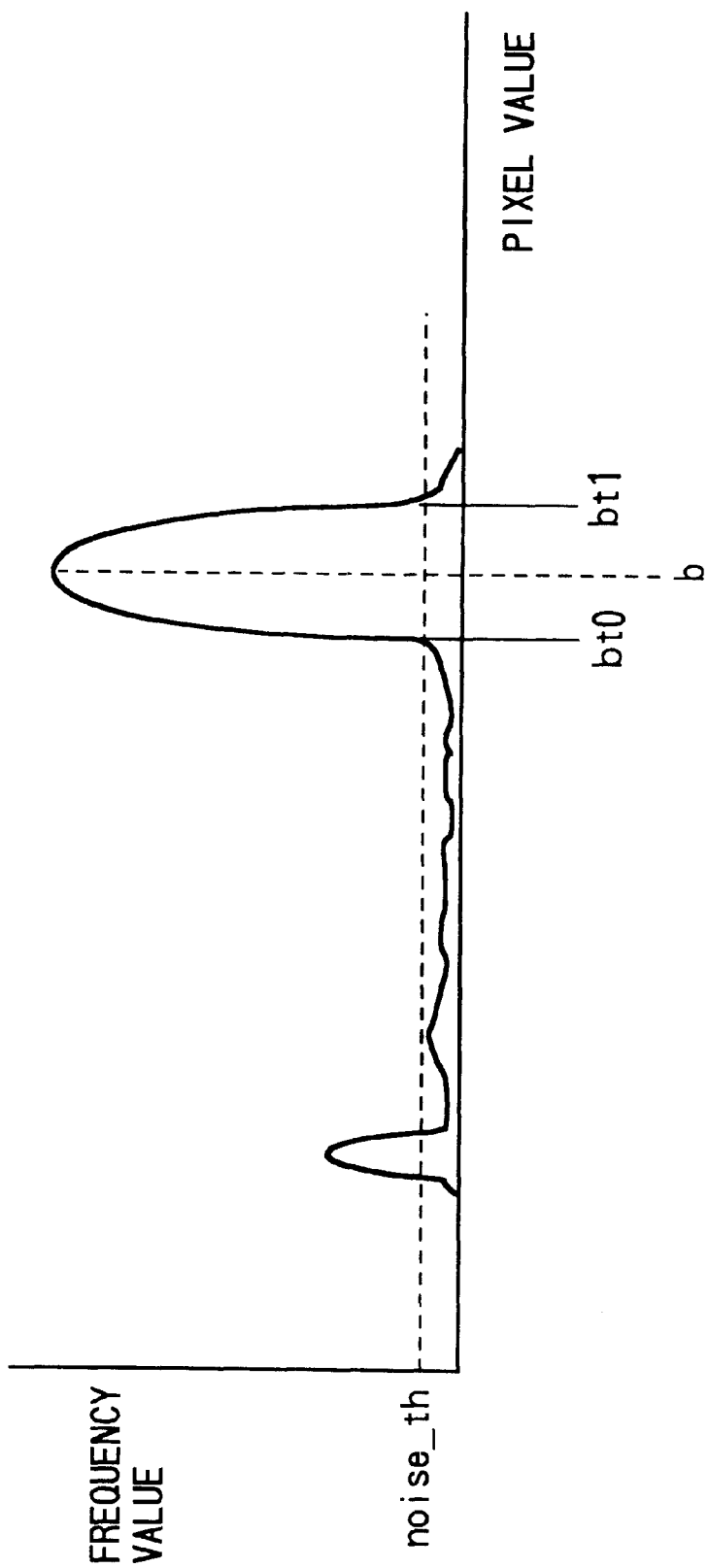
FIG. 2 is a graph for explaining how a background density is extracted in the first embodiment.

The background density width detecting unit 10 calculates the width of the densities of pixels constituting the background from the background representative density b input from the maximum frequency detecting unit 4 and the values input from the comparing unit 9. This width is obtained by detecting the pixel values which are nearest to the background representative density b and exhibit an output frequency of 0. The process of detecting these pixel values will be described with reference to FIG. 2. FIG. 2 shows the relationship between the pixel values of image data of a given original image and the output frequency values. The abscissa represents the pixel values; and the ordinate, the output frequency values.

First of all, the output frequency values are checked from the background representative density b to the smaller pixel values to obtain a value bt0 exhibiting a frequency value of 0. This value is the lower limit of the density width and hence will be referred to as the density width lower limit. Similarly, the output frequency values are checked from the background representative density b to the larger pixel values to obtain a value bt1 exhibiting a density of 0. This value is the upper limit of the density width and hence will be referred to as the density width upper limit. Note that the density width lower limit bt0 and the density width upper limit bt1 are output from the terminal 11.

The processing executed in the first embodiment will be described next with reference to the flow chart of FIG. 3.

Figure 3:
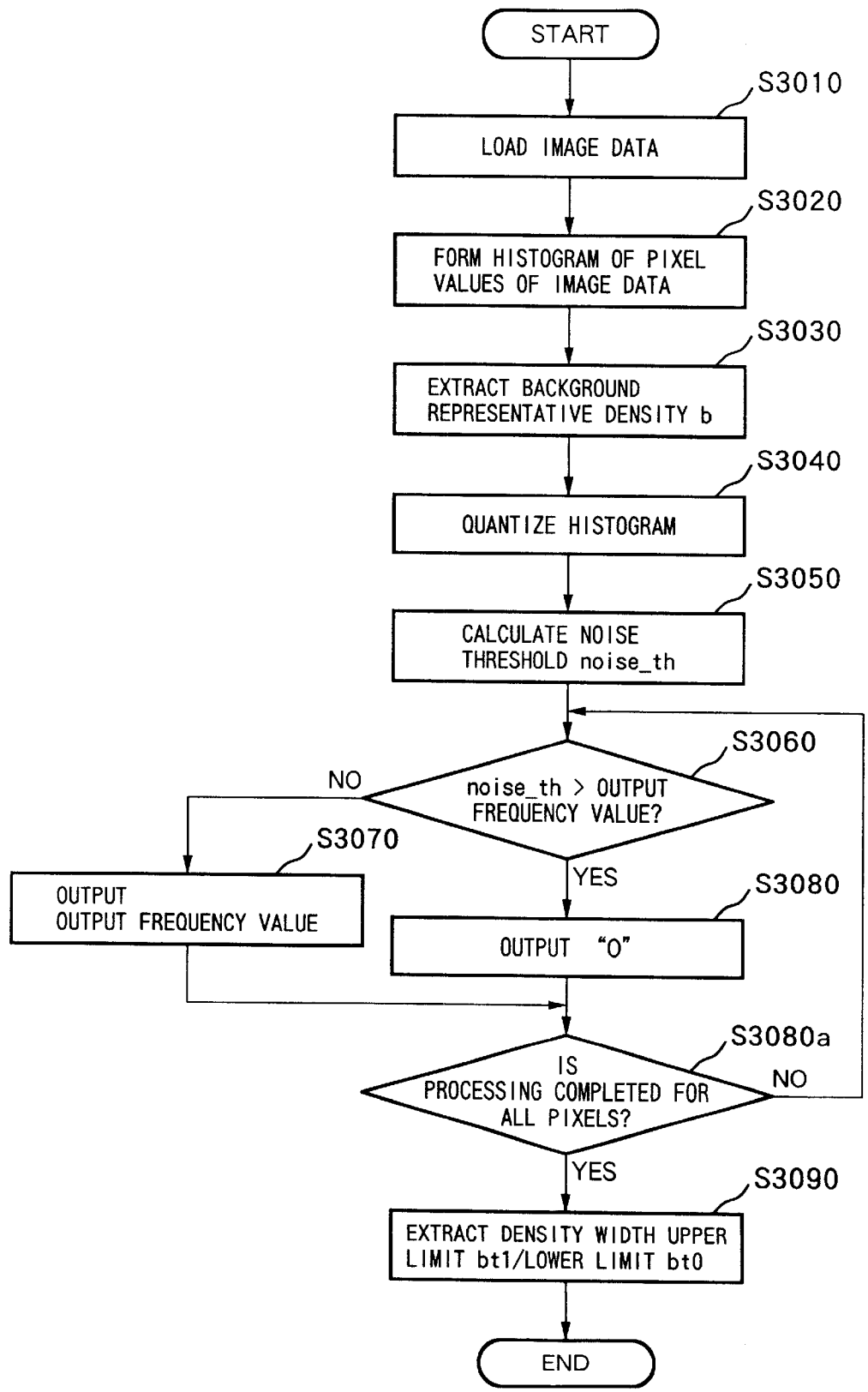
FIG. 3 is a flow chart showing the flow of the processing executed in the first embodiment.

FIG. 3 is a flow chart showing the flow of the processing executed in the first embodiment.

Prior the execution of the processing, the CPU (not shown) clears the contents of the frame memory 2 and the counters of the histogram forming units 3 and 7 to 0.

In step S3010, the CPU loads original image data, which is monochrome multi-level image data (8 bits/pixel), from the image input unit 1 and stores the image data in the frame memory 2. In step S3020, after the image data corresponding to the original image is stored in the frame memory 2, the CPU reads out the image data from the frame memory 2 and inputs it to the histogram forming unit 3, thereby forming a histogram from all the pixels of the input image data.

In step S3030, the CPU operates the maximum frequency detecting unit 4 to extract the pixel value exhibiting the maximum output frequency value in the histogram as the background representative density b. In step S3040, the quantization step calculating unit 5 decides the quantization step q for normalizing the histogram, and outputs the decided quantization step q to the quantizing unit 6. The quantizing unit 6 quantizes the histogram formed by the histogram forming unit 3 on the basis of the decided quantization step q. The histogram forming unit 7 forms a histogram of the output from the quantizing unit 6.

In step S3050, the CPU operates the noise threshold deciding unit 8 to calculates the noise threshold noise_th from the quantized histogram. In step S3060, the comparing unit 9 compares the respective output frequency values h(i) in the histogram formed by the histogram forming unit 3 with the noise threshold noise_th. If the noise threshold noise_th is equal to or smaller than a given output frequency value (NO in step S3060), the output frequency value is output in step S3070. If the noise threshold noise_th is larger than a given output frequency value (YES in step S3060), "0" is output in step S3080. It is checked in step S3080a whether the processing in step S3060 for all the pixel values is completed. Steps S3060 to S3080 are sequentially repeated until this processing is completed.

In step S3090, the background density width detecting unit 10 extracts the density width lower limit bt0 and the density width upper limit bt1 as values defining the width of the densities of pixels constituting the background on the basis of the background representative density b input from the maximum frequency detecting unit 4 and the values input from the comparing unit 9.

An application of the image processing apparatus of the first embodiment will be described next. Assume that the above apparatus is applied to an image communication apparatus like the one shown in FIG. 4. The operation and arrangement of the image communication apparatus will be described below.

Figure 4:
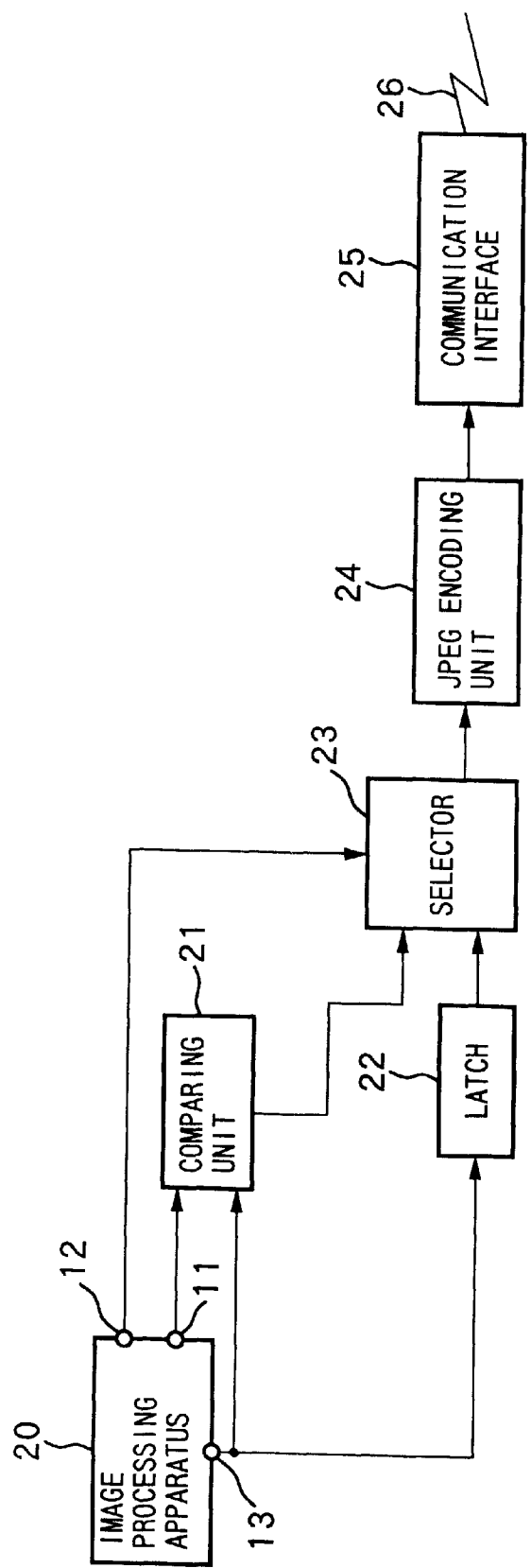
FIG. 4 is a block diagram showing the arrangement of an image transmission apparatus to which the image processing apparatus of the first embodiment is applied.

FIG. 4 is a block diagram showing the arrangement of the image communication apparatus to which the image processing apparatus of the first embodiment is applied.

Referring to FIG. 4, reference numeral 20 denotes the image processing apparatus of the first embodiment shown in FIG. 1; 21, a comparing unit for comparing the density width lower limit bt0 and the density width upper limit bt1 output from the terminal 11 of the image processing apparatus 20 with the contents of the frame memory 2 which are output from the terminal 13; 22, a latch for timing adjustment; and 23, a selector for selectively outputting the output from the latch 22 and the background representative density b output from the terminal 12 of the image processing apparatus 20.

Reference numeral 24 denotes a JPEG encoding unit for performing JPEG encoding, which is a multi-level image data encoding method using orthogonal transformation, quantization, and Huffman encoding, for the input image data; 25, a communication interface for transmitting JPEG encoded data in accordance with a communication protocol; and 26, a communication line constituted by a telephone line or LAN.

The processing executed in the arrangement shown in FIG. 4 will be briefly described next.

Image data is sequentially read out from the frame memory 2 of the image processing apparatus 20 in the pixel order to be stored in the latch 22 through the terminal 13. At the same time, the comparing unit 21 compares each pixel value input from the terminal 13 with the density width lower limit bt0 and the density width upper limit bt1 input from the terminal 11. If the input pixel value falls in the range of the density width lower limit bt0 to the density width upper limit bt1, "1" is output. Otherwise, "0" is output.

The selector 23 selects and outputs the background representative density b output from the terminal 12 if the output from the comparing unit 21 is "1". If the output from the comparing unit 21 is "0", the selector 23 outputs the value latched in the latch 22. The JPEG encoding unit 24 performs JPEG encoding for the pixel values input from the selector 23, and outputs the resultant data to the communication line 26 through the communication interface 25. When the above processing is performed for all the image data in the frame memory 2, and transmission of the resultant data is completed, all the operations are terminated.

With the above processing of JPEG processing, the background of the input image is adjusted, and the encoding efficiency can be improved. In the above case, the JPEG encoding method is used. However, another block encoding method, a differential encoding method, or the like may be used.

As described above, according to the first embodiment, the background representative density b, the density width upper limit bt1, and the density width lower limit bt0 are extracted on the basis of the histogram of the pixel values of the image data, and all the pixel values within the range of the density width upper limit bt1 to the density width lower limit bt0 are output as the background representative densities b, thereby outputting a constant, proper background density. In addition, the pixel value histogram is quantized, and the noise threshold noise_th is calculated on the basis of the quantized histogram. With the use of this calculated noise threshold noise_th, output frequency noise output as a background density can be properly removed.

Furthermore, background density determination can be performed for a monochrome image with a relatively small circuit size at a higher speed than in the prior art. Consequently, background noise can be properly removed. Moreover, since the influences of noise can be eliminated, and a constant background density can be set, the encoding efficiency can be improved.

<Second Embodiment>

The image processing apparatus described as the first embodiment is designed to determine the density width of the background of a monochrome multi-level image as an original image and a proper background density. An image processing apparatus having a background density width determining unit 109 (see FIG. 6) according to the second embodiment will be described below. The background density width determining unit 109 determines the density width of the background of a color multi-level image as an original image and a proper background density by using luminance image data obtained from the color multi-level image.

Figure 5:
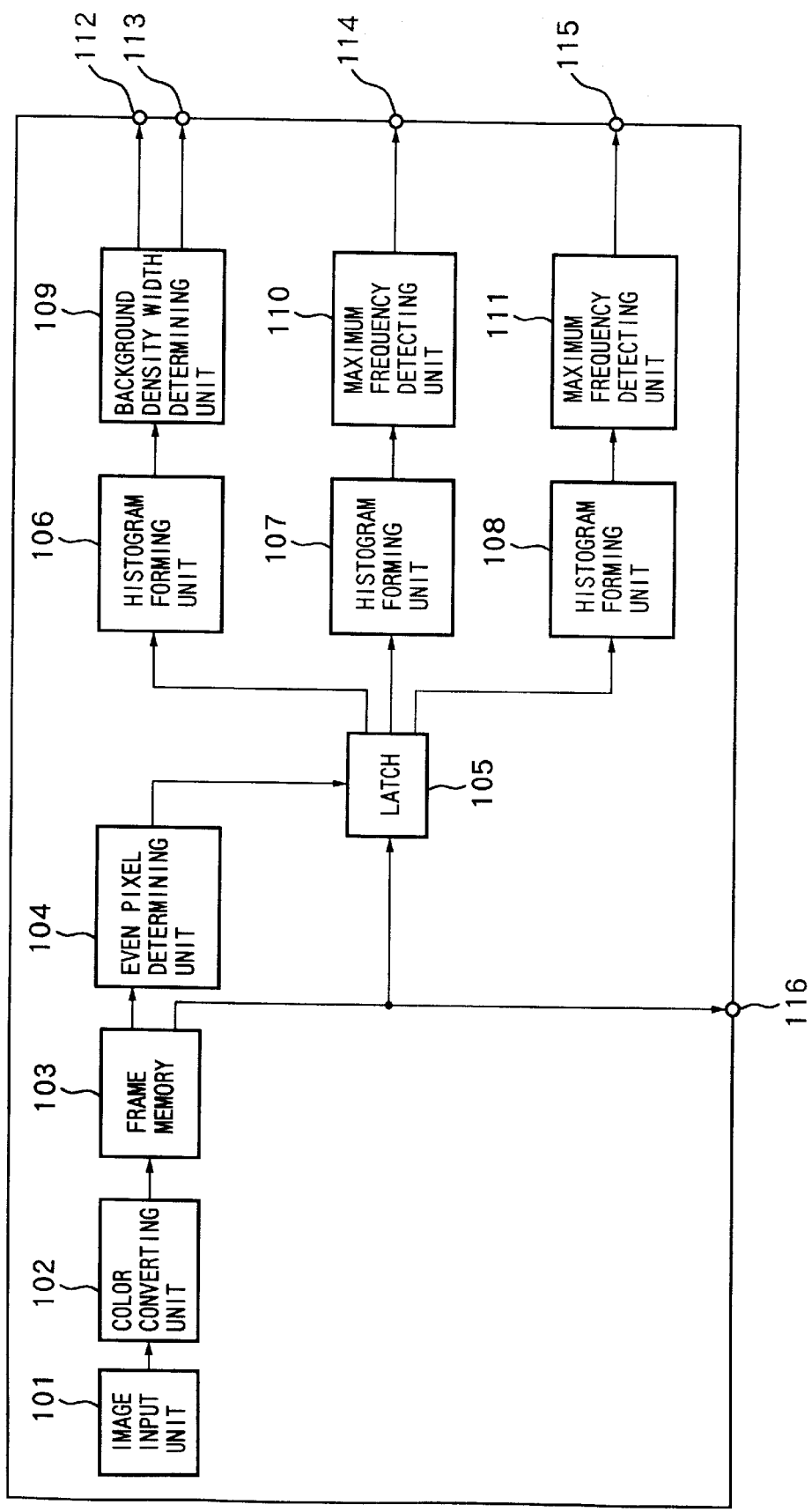
FIG. 5 is a block diagram showing the arrangement of an image processing apparatus according to the second embodiment of the present invention.

FIG. 5 is a block diagram showing the arrangement of the image processing apparatus according to the second embodiment.

Referring to FIG. 5, reference numeral 101 denotes an image input unit for inputting an original image. The image input unit 101 is constituted by a color image scanner or the like. In this case, a color multi-level image is input as an original image, which will be described as image data exhibiting a precision of 8 bits per pixel for each of R, G, and B colors. Reference numeral 102 denotes a color converting unit for converting the original image into CIE1976 L*a*b* image data (each component consisting of 8 bits); and 103, a frame memory for storing the L*a*b* image data of the original image which is obtained by the color converting unit 102.

Reference numeral 104 denotes an even pixel determining unit for determining, on the basis of the L* image data representing the luminance of CIE1976 L*a*b* image data, whether the input pixels are even pixels; and 105, a latch for deciding whether to output its contents in accordance with a control signal.

Reference numerals 106 to 108 denote histogram forming units for forming histograms of the loaded pixel values of the L*, a*, and b* image data.

Each of the histogram forming units 106 to 108 is constituted by 256 counters. The respective counters correspond to the pixel values of the loaded image data. Every time 1-pixel image data is input, the counter corresponding to the pixel value is incremented by one.

The histogram forming unit 106 formes a histogram of the L* image data. The histogram forming unit 107 forms a histogram of the a* image data. The histogram forming unit 108 forms a histogram of the b* image data.

Reference numeral 109 denotes a background density width determining unit for deciding a background representative density b, a density width lower limit bt0, and a density width upper limit bt1 of the L* image data of the pixels constituting the b* image data on the basis of the histogram of the L* image data; and 110 and 111, maximum frequency detecting units for detecting the pixel values exhibiting the maximum output frequency values from the histograms formed by the histogram forming units 107 and 108.

Reference numeral 112 denotes a terminal from which a background representative density bL is output to an external apparatus; 113, a terminal from which the width of the densities of pixels constituting the background (the density width lower limit bt0 and the density width upper limit bt1) is output to the external apparatus; 114, a terminal from which the pixel value, of the a image data, which exhibits the maximum output frequency value is output to the external apparatus; 115, a terminal from which the pixel value, of the b* image data, which exhibits the maximum output frequency value is output to the external apparatus; and 116, a terminal from which the contents of the frame memory 103 are output to the external apparatus.

Assume that each constituent element of the image processing apparatus in FIG. 5 is controlled by a CPU (not shown).

The processing executed by the image processing apparatus will be described next with reference to FIG. 5.

Prior to the execution of the processing, the CPU (not shown) clears the contents of the frame memory 103 and the counters of the histogram forming units 106 to 108 to 0.

Subsequently, the CPU loads original image data, which is RGB color multi-level image data, from the image input unit 101, causes the color converting unit 102 to convert the image data into the L*a*b* image data, and stores the data in the frame memory 103 in accordance with an instruction from the user.

After the L*a*b* image data corresponding to the original image is stored in the frame memory 103, the CPU reads out the L*a*b* image data from the frame memory 103 and inputs the data to the even pixel determining unit 104 and the latch 105.

The even pixel determining unit 104 receives each input pixel and the L*a*b* image data of the pixels around the input pixel. Letting L(x, y), a(x, y), and b(x, y) be the coordinates of the L*, a*, and b* image data stored in the frame memory 103, edge amounts eL, ea, and eb of the L*a*b* image data are calculated according to equations (4):

$$eL = \max((|L(x, y)) - L(x - 1, y - 1)|) \quad (4)$$
$$((|L(x, y)) - L(x, y - 1)|)$$
$$((|L(x, y)) - L(x + 1, y - 1)|)$$
$$((|L(x, y)) - L(x - 1, y)|)$$
$$((|L(x, y)) - L(x + 1, y)|)$$
$$((|L(x, y)) - L(x - 1, y + 1)|)$$
$$((|L(x, y)) - L(x, y + 1)|)$$
$$((|L(x, y)) - L(x + 1, y + 1)|)$$
$$ea = \max((|a(x, y)) - a(x - 1, y - 1)|)$$
$$((|a(x, y)) - a(x, y - 1)|)$$
$$((|a(x, y)) - a(x + 1, y - 1)|)$$
$$((|a(x, y)) - a(x - 1, y)|)$$
$$((|a(x, y)) - a(x + 1, y)|)$$
$$((|a(x, y)) - a(x - 1, y + 1)|)$$
$$((|a(x, y))a(x, y + 1)|)$$
$$((|a(x, y)) - a(x + 1, y + 1)|)$$
$$eb = \max((|b(x, y)) - b(x - 1, y - 1)|)$$
$$((|b(x, y)) - b(x, y - 1)|)$$
$$((|b(x, y)) - b(x + 1, y - 1)|)$$
$$((|b(x, y)) - b(x - 1, y)|)$$
$$((|b(x, y)) - b(x + 1, y)|)$$
$$((|b(x, y)) - b(x - 1, y + 1)|)$$
$$((|b(x, y))b(x, y + 1)|)$$
$$((|b(x, y)) - b(x + 1, y + 1)|)$$

These edge amounts eL, ea, and eb are compared with a threshold Th1. If all the edge amounts are equal to or smaller than the threshold Th1, "1" is output. Otherwise, "0" is output.

When "0" is output from the even pixel determining unit 104, the latch 105 does not output the stored L*, a*, and b* image data, and the histogram forming units 106 to 108 perform no processing. When "1" is output from the even pixel determining unit 104, the latch 105 outputs the stored L*, a*, and b* image data to the corresponding histogram forming units 106 to 108.

The histogram forming unit 106 forms a histogram of the L* image data. Similarly, the histogram forming unit 107 forms a histogram of the a* image data. The histogram forming unit 108 forms a histogram of the b* image data.

When even pixel detection and histogram processing for all the pixels in the frame memory 103 are completed, the background density width determining unit 109 and the maximum frequency detecting units 110 and 111 are started.

The detailed arrangement of the background density width determining unit 109 will be described below with reference to FIG. 6.

Figure 6:
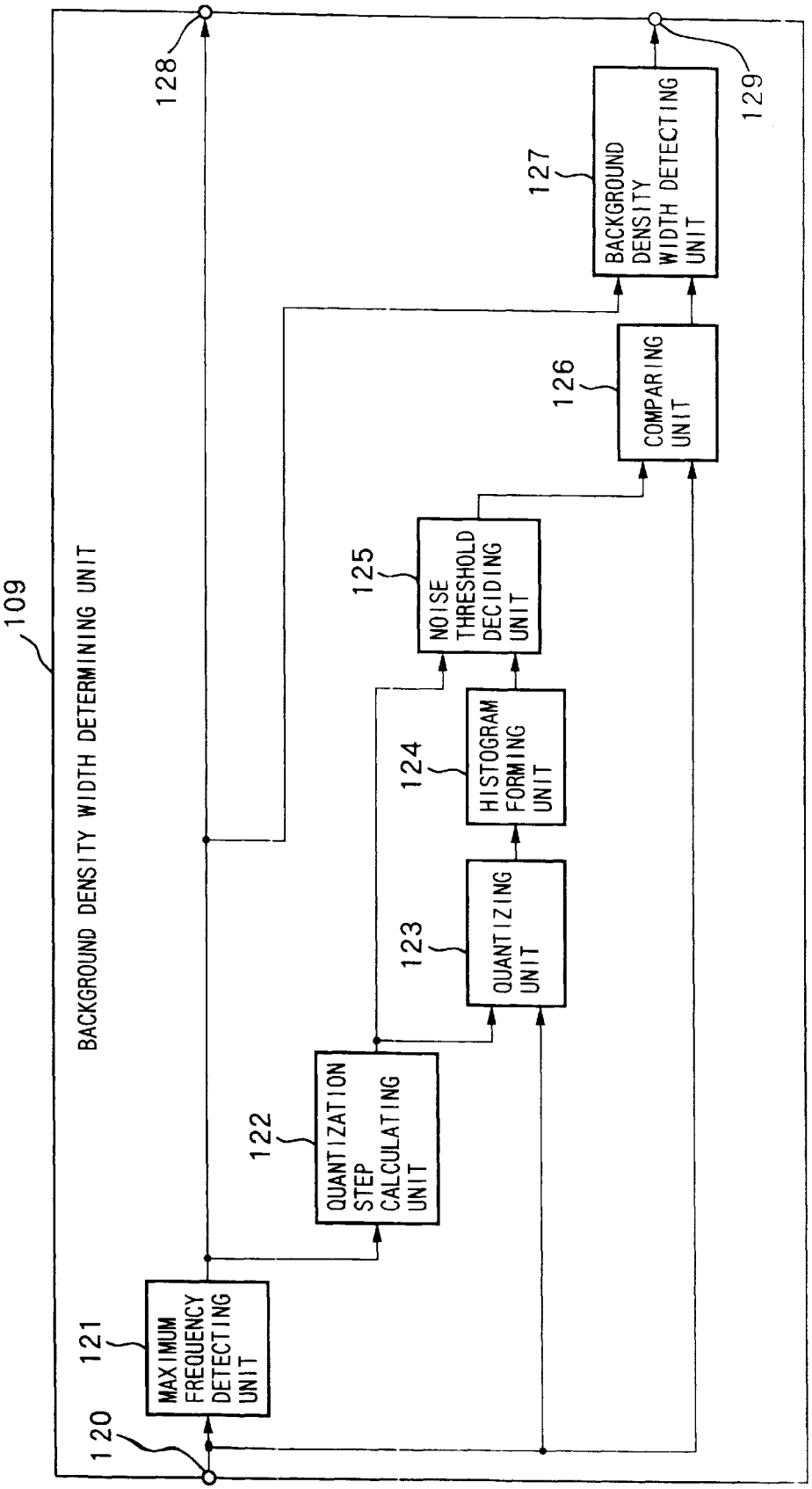
FIG. 6 is a block diagram showing the detailed arrangement of a background density width determining unit 109 in the second embodiment.

FIG. 6 is a block diagram showing the detailed arrangement of the background density width determining unit 109 in the second embodiment.

Referring to FIG. 6, reference numeral 120 denotes a terminal to which the respective output frequency values of the histogram output from the histogram forming unit 106 are input; and 121, a maximum frequency detecting unit for outputting the maximum output frequency value in the histogram and the pixel value exhibiting the maximum value.

Reference numeral 122 denotes a quantization step calculating unit 122 for deciding a quantization step q for quantizing a frequency distribution (histogram) on the basis of the maximum value detected by the maximum frequency detecting unit 121.

Reference numeral 123 denotes a quantizing unit for quantizing the histogram with the quantization step q calculated by the quantization step calculating unit 122; 124, a histogram forming unit which is constituted by 101 counters and designed to form a histogram of the output from the quantizing unit 123; and 125, a noise threshold deciding unit for deciding a frequency noise threshold for removing frequency noise on the basis of the output from the histogram forming unit 124 and the quantization step q calculated by the quantization step calculating unit 122.

Reference numeral 126 denotes a comparing unit for comparing the frequency noise threshold decided by the noise threshold deciding unit 125 with the histogram formed by the histogram forming unit 106; and 127, a background density width detecting unit for obtaining the width of the densities of pixels constituting the background from the maximum value detected by the maximum frequency detecting unit 121 and the output from the comparing unit 126.

Reference numeral 129 denotes a terminal from which the width of the densities of the pixels constituting the background, which is detected by the background density width detecting unit 127, is output to an external apparatus; and 128, a terminal from which the density (maximum value) of the background, detected by the maximum frequency detecting unit 121, is output to the external apparatus.

The processing executed by the background density width determining unit 109 will be described next with reference to FIG. 6.

After a histogram of all the pixels of input image data is formed, the CPU operates the maximum frequency detecting unit 121 to detect the pixel value exhibiting the maximum output frequency value in the histogram (i.e., the pixel value corresponding to the maximum counter value), and outputs a detected output frequency value m and the corresponding pixel value. This corresponding pixel value indicates the background density of the L* image data, and hence will be referred to as the background representative density bL. This background representative density bL is output from the terminal 128.

The detected maximum output frequency value m is input to the quantization step calculating unit 122. The quantization step calculating unit 122 decides the quantization step q for normalizing the histogram according to equation (1) described in the first embodiment.

The decided quantization step q is input to the quantizing unit 123. When the quantization step q is input, the quantizing unit 123 sequentially reads out output frequency values h(i) (i=0 to 255) formed by the histogram forming unit 106 in the order of increasing pixel values, and quantizes the readout values according to equation (2) described in the first embodiment, thereby obtaining quantization results r(i) (i=0 to 255).

The histogram forming unit 124 forms a histogram of outputs from the quantizing unit 123. The 101 counters correspond to the values of the respective quantization results r(i), and the contents of the corresponding counters are incremented by one. Assume that the contents of these counters are frequency value rh(k) (k=0 to 100).

When a histogram of all the quantization results r(i) is formed, the CPU operates the noise threshold deciding unit 125 to detect the value of a quantization result mr taking the maximum value and a value mt exhibiting the frequency value rh(k) with k being equal to or larger than mr and taking the first minimum value from the contents of the counters of the histogram forming unit 124 and the frequency values rh(k). The noise threshold deciding unit 125 then multiplies the minimum value mt by the quantization step q, and adds a predetermined value β to the product, thereby calculating a noise threshold noise_th.

The noise threshold noise_th calculated by the noise threshold deciding unit 125 is input to the comparing unit 126. The comparing unit 126 sequentially reads out the contents of the respective counters of the histogram forming unit 106 and compares them with the noise threshold noise_th. If the output frequency value h(i) is larger than the noise threshold noise_th, this output frequency value is output. Otherwise, "0" is output. The resultant data is then input to the background density width detecting unit 127.

The background density width detecting unit 127 calculates the width of the densities of the pixels constituting the background from the background representative density bL input from the maximum frequency detecting unit 121 and the values input from the comparing unit 126. This width is obtained by detecting the pixel values which are nearest to the background representative density bL and exhibit an output frequency of 0. These values are equivalent to the density width lower limit bt0 and the density width upper limit bt1 described in the first embodiment, and are detected by the same method as that in the first embodiment. The density width lower limit bt0 and the density width upper limit bt1 are output from the terminal 129.

The processing executed by the image processing apparatus in FIG. 5 will be described again.

The maximum frequency detecting unit 110 detects the pixel value exhibiting the maximum output frequency value in the histogram formed by the histogram forming unit 107 (i.e., the pixel value corresponding to the maximum counter value). The maximum frequency detecting unit 110 then outputs the maximum output frequency value m and the corresponding pixel value. This corresponding pixel value represents the background density of the a image data, and hence will be referred to as a background representative density ba. The background representative density ba is output from the terminal 114.

The maximum frequency detecting unit 111 detects the pixel value exhibiting the maximum output frequency value in the histogram formed by the histogram forming unit 108 (i.e., the pixel value corresponding to the maximum counter value). The maximum frequency detecting unit 111 then outputs the detected maximum output frequency value m and the corresponding pixel value. This corresponding pixel value represents the background density of the b* image data, and hence will be referred to as a background representative density bb. This background representative density bb is output from the terminal 115.

Figure 7:
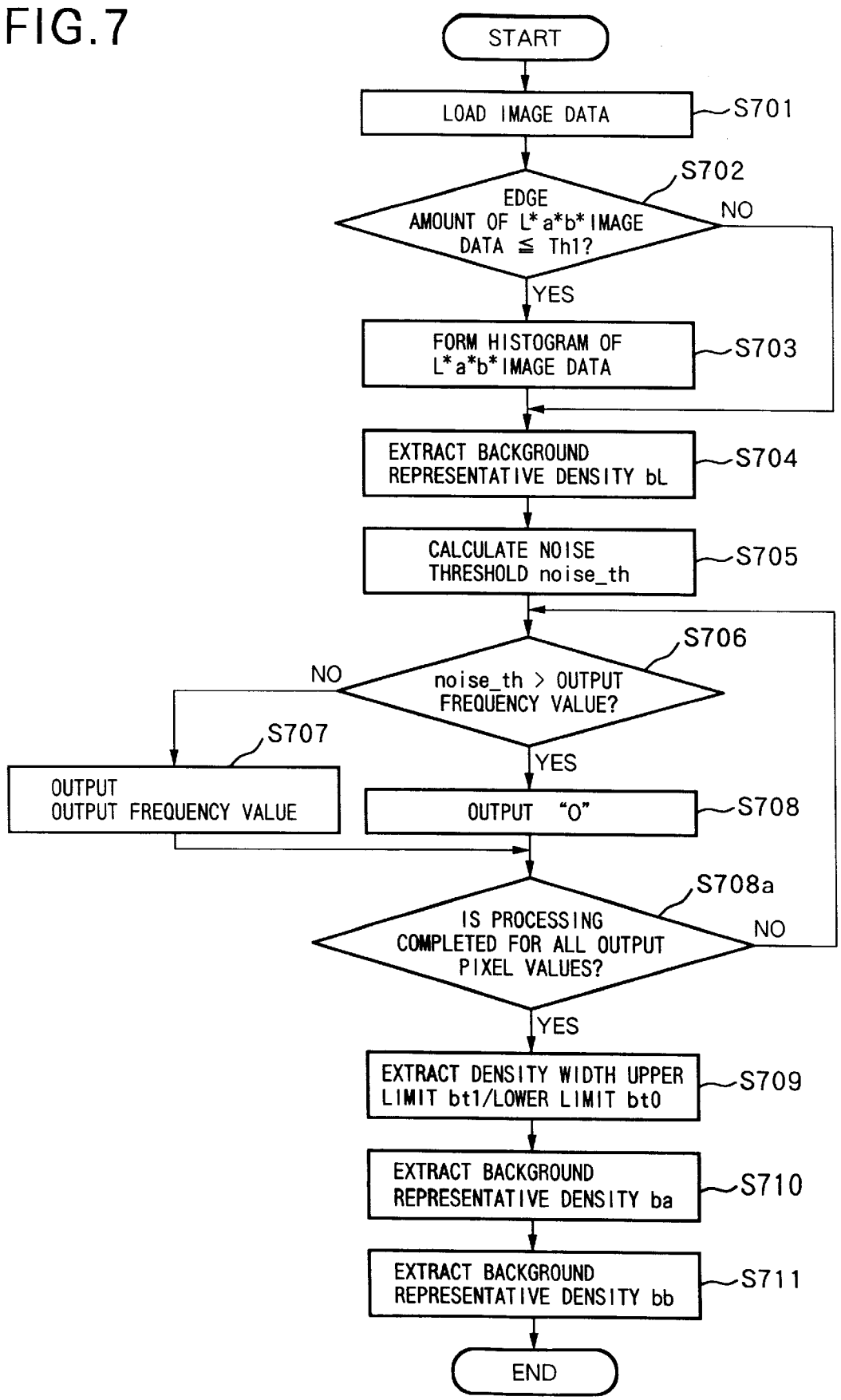
FIG. 7 is a flow chart showing the flow of the processing executed in the second embodiment.

FIG. 7 is a flow chart showing the flow of the processing executed in the second embodiment.

Prior to the execution of the processing, the CPU (not shown) clears the contents of the frame memory 103 and the counters of the histogram forming units 106 to 108 to 0.

In step S701, the CPU loads an original image, which is a color multi-level image expressed by R, G, and B color components, in accordance with an instruction from the user, causes the color converting unit 102 to convert the image data into the L*a*b* image data, and stores the data in the frame memory 103.

In step S702, after the L*a*b* image data corresponding to the original image is stored in the frame memory 103, the CPU reads out the L*a*b* image data from the frame memory 103 and outputs the data to the even pixel determining unit 104 and the latch 105. The even pixel determining unit 104 receives each input pixel and the L*a*b* image data of the pixels around the input pixel. The CPU calculates the edge amounts eL, ea, and eb of the respective pixels of the L*, a*, and b* image data stored in the frame memory 103. The CPU compares these edge amounts eL, ea, and eb with the threshold Th1. If all the amounts are equal to or smaller than the threshold Th1, it is determined that the input pixels are even pixels. Otherwise, it is determined that the input pixels are edge pixels. Only when the input pixels are even pixels, the flow advances to step S703 to form a histogram.

In step S703, the CPU outputs the L*, a*, and b* image data to the corresponding histogram forming units 106 to 108. The histogram forming units 106 to 108 then form histograms from all the pixels of the image data.

In step S704, the CPU operates the maximum frequency detecting unit 121 to extract the pixel value exhibiting the maximum output frequency value in the histogram of the L* image data as the background representative density bL. In step S705, the quantization step calculating unit 122 decides the quantization step q for normalizing the histogram, and outputs the decided quantization step q to the quantizing unit 123. The quantizing unit 123 quantizes the histogram formed by the histogram forming unit 106 on the basis of the quantization step q. The histogram forming unit 124 then forms a histogram of outputs from the quantizing unit 123. In step S705, the CPU operates the noise threshold deciding unit 125 to calculate the noise threshold noise_th from the quantized histogram. In step S706, the comparing unit 126 compares the noise threshold noise_th with each output frequency value of the histogram formed by the histogram forming unit 106. If the noise threshold noise_th is larger than the output frequency value (YES in step S706), the flow advances to step S708. If the noise threshold noise_th is equal to or smaller than the output frequency value (NO in step S706), the flow advances to step S707. In step S707, the comparing unit 126 outputs the compared pixel value to the terminal 129. In step S708, the comparing unit 126 outputs "0" to the terminal 129. In step S708a, the CPU checks whether the processing in step S706 is completed, and sequentially repeats steps S706 to 708 until the processing is completed.

In step S709, the background density width detecting unit 127 extracts the density width lower limit bt0 and the density width upper limit bt1 as values defining the width of the densities of the pixels constituting the background from the background representative density bL input from the maximum frequency detecting unit 121 and the values input from the comparing unit 126.

In step S710, the maximum frequency detecting unit 110 extracts the pixel value exhibiting the maximum output frequency value in the histogram formed by the histogram forming unit 107 as the background representative density ba of the a* image data. In step S711, the maximum frequency detecting unit 111 extracts the pixel value exhibiting the maximum output frequency value in the histogram formed by the histogram forming unit 108 as the background representative density bb of the b* image data.

An application of the image processing apparatus of the second embodiment will be described next. Assume that the above apparatus is applied to a printer apparatus like the one shown in FIG. 8. The operation and arrangement of this printer apparatus will be described below.

Figure 8:
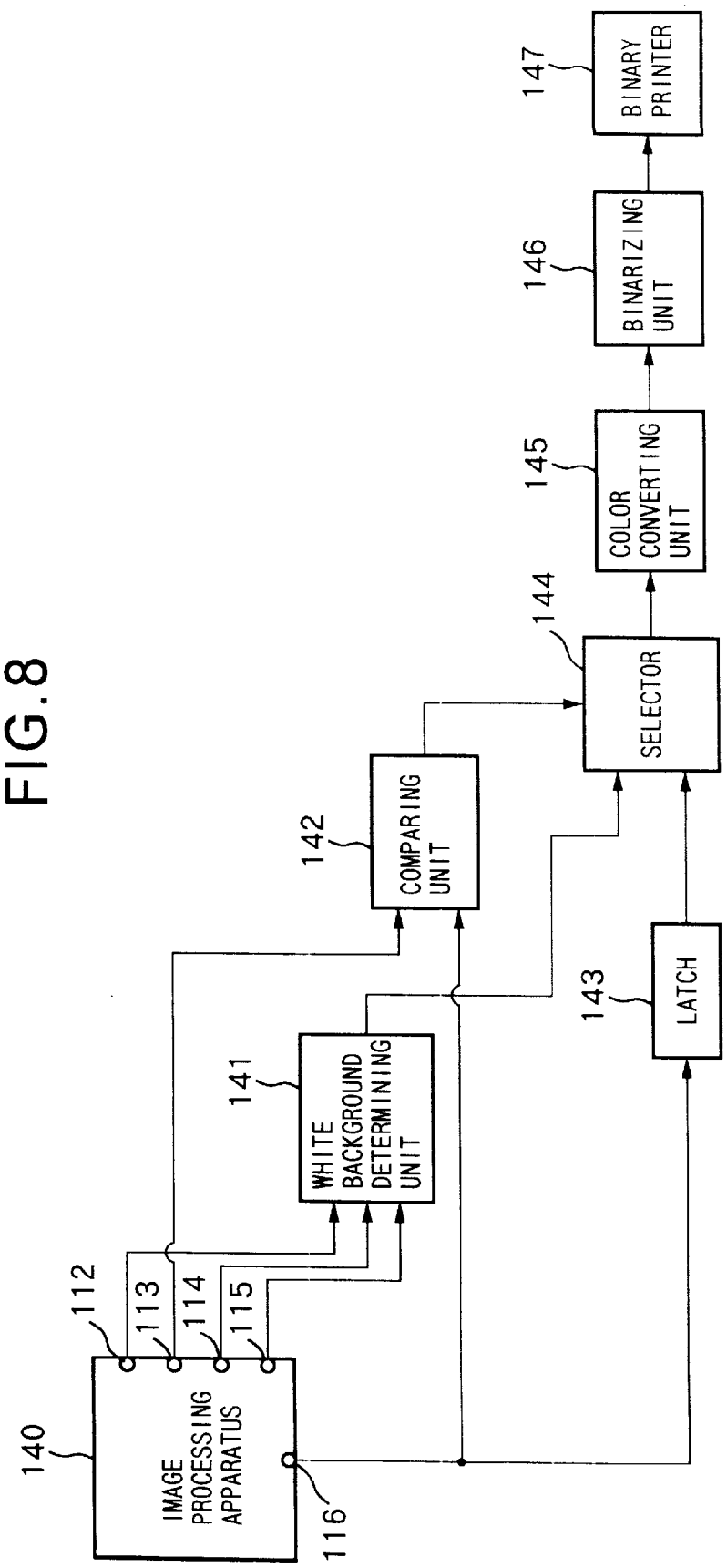
FIG. 8 is a block diagram showing the arrangement of a printer apparatus to which the image processing apparatus of the second embodiment is applied.

FIG. 8 is a block diagram showing the arrangement of the printer apparatus to which the image processing apparatus of the second embodiment is applied.

Referring to FIG. 8, reference numeral 140 denotes the image processing apparatus of the second embodiment shown in FIG. 5; and 141, a white background determining unit for receiving the background representative density bL of the L* image data from the terminal 112 of the image processing apparatus 140, the background representative density ba of the a* image data from the terminal 112 of the image processing apparatus 140, and the background representative density bb of the b* image data from the terminal 115 of the image processing apparatus 140, and checking whether the background is substantially white.

Reference numeral 142 denotes a comparing unit for comparing the density width lower limit bt0 and the density width upper limit bt1 output from the terminal 113 of the image processing apparatus 140 with the L*a*b* image data stored in the frame memory 103 and output from the terminal 116 of the image processing apparatus 140; 143, a latch for timing adjustment; and 144, a selector for selectively outputting the output from the latch 143 and the background representative densities bL, ba, and bb, respectively output from the terminals 112, 114, and 115 of the image processing apparatus 140, in accordance with the output from the comparing unit 142.

Reference numeral 145 denotes a color converting unit for converting the input L*a*b* image data into optimal values for Y, M, C, and K (black) inks used in the printer; 146, a binarizing unit for binarizing the YMCK image data by the error diffusion method; and 147, a binary printer for performing a binary printing operation using the Y, M, C, and K inks.

The processing executed in the arrangement shown in FIG. 8 will be described next.

The CPU loads image data from the frame memory 103 of the image processing apparatus 140 in the pixel order, and stores the data in the latch 143 through the terminal 116. At the same time, the comparing unit 142 compares each pixel value input through the terminal 116 with the density width lower limit bt0 and the density width upper limit bt1 input through the terminal 113. If the input pixel value falls within the range of the density width lower limit bt0 to the density width upper limit bt1, "1" is output. Otherwise, "0" is output.

The white background determining unit 141 receives the background representative densities bL, ba, and bb of the L*, a*, and b* image data through the terminals 112, 114, and 115, and calculates a color difference e according to equation (5):

$$e = \sqrt{((255 - bL)^2 + ba^2 + bb^2)} \tag{5}$$

The color difference e is compared with the threshold Th2. If the color difference e is equal to or smaller than the threshold Th2, the background representative densities bL are output as values of 255, 0, and 0, respectively. If the color difference e is larger than the threshold Th2, the input values are output without any change.

If the output from the comparing unit 142 is "1", the selector 144 selects and outputs the background representative densities bL, ba, and bb. If the output is "0", the selector 144 outputs the values from the latch 143. The color converting unit 145 converts the L*a*b* image data input from the selector 144 into YMCK image data, and outputs the image data. This image data is input to the binarizing unit 146 and binarized by the error diffusion method. The image data binarized by the binarizing unit 146 is printed on a recording medium by the binary printer 147.

When the above processing is completed for all the pixels in the frame memory 103, all the operations are terminated.

As described above, according to the second embodiment, the background representative density bL of the L* image data and the density width upper limit bt1 and the density width lower limit bt0 of the background are extracted on the basis of the histogram of the pixel values of the image data. All the pixel values within the range of the density width upper limit bt1 to the density width lower limit bt0 are output as the background representative densities bL, ba, and bb. With this processing, a constant, proper background color can be output. In addition, a histogram of the pixel values of the L* image data is quantized, and the noise threshold noise_th is calculated on the basis of the quantized histogram. By using the calculated noise threshold noise_th, output frequency noise output as a background density can be properly removed.

In addition, background density determination can be performed for a color image with a relatively small circuit size at a higher speed than in the prior art. Consequently, background noise can be properly removed. Furthermore, the precision of background density determination can be improved by extracting even pixels of the L*, a*, and b* image data. Since a constant background density can be set by eliminating the influences of noise, the print quality of a binary image can be improved. Moreover, since a printing operation on the background area can be suppressed by comparison with the background representative density bL, a high-quality printed output can be obtained.

<Third Embodiment>

In the third embodiment, a program for detecting the presence of different colors in a given area on the basis of a luminance image is stored in a recording medium such as a ROM, and the processing to be described below is performed by executing the program.

Figure 9:
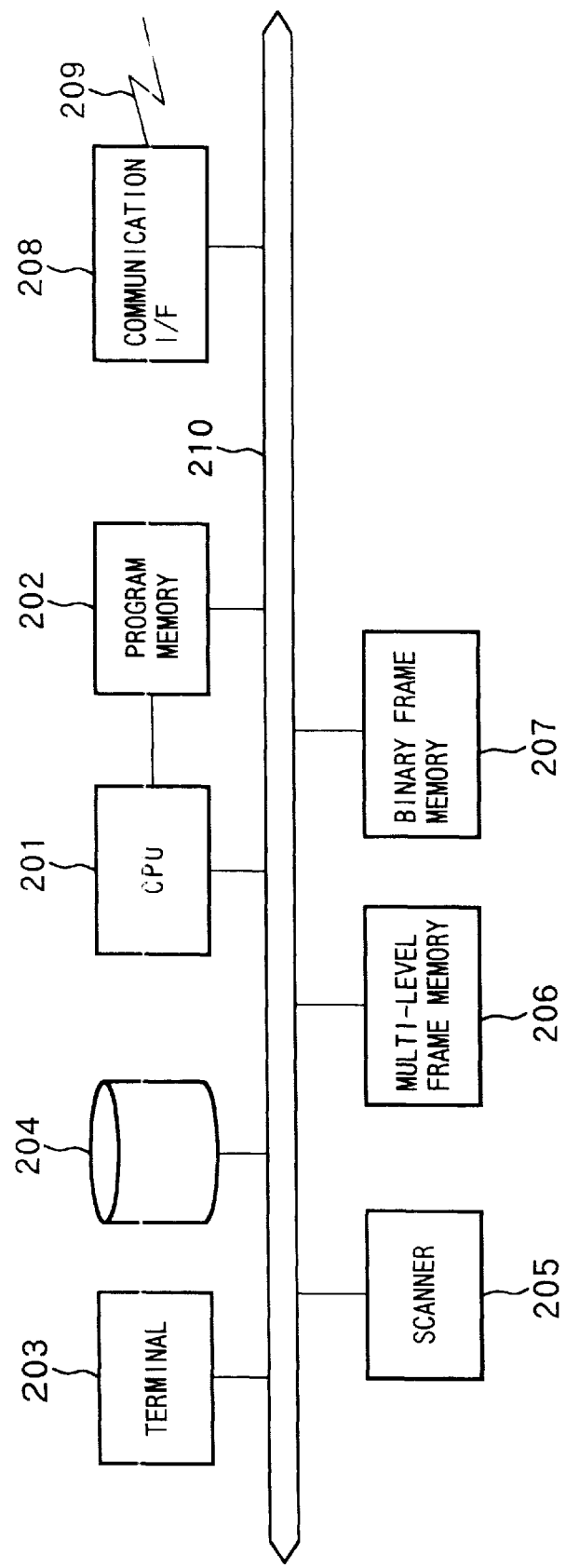
FIG. 9 is a block diagram showing the arrangement of an image processing apparatus according to the third embodiment of the present invention.

FIG. 9 is a block diagram showing the arrangement of an image processing apparatus according to the third embodiment.

Referring to FIG. 9, reference numeral 201 denotes a CPU which operates according to the execution programs for executing the processing (see the flow charts of FIGS. 10 to 21) to be described in the third embodiment, and controls the respective constituent elements of the apparatus; 202, a program memory storing the execution programs and ensuring the storage capacity required for the execution of each execution program; 203, a terminal for allowing the user to input various instructions such as an instruction to execute each execution program; 204, a storage unit constituted by a magnetic disk or the like; 205, a color image scanner for reading an original image (for reading an original image constituted by color multi-level image data (each of R, G, and B data consisting of 8 bits) in this case); and 206, a multi-level frame memory for storing color multi-level image data by the amount corresponding to the original image in the RGB form.

Reference numeral 207 denotes a binary frame memory for storing binary image data obtained by binarizing the color multi-level image data by the amount corresponding to the original image; 208, a communication interface (communication I/F) for transmitting encoded data in accordance with a communication protocol; 209, a communication line constituted by a telephone line or LAN; and 210, a bus for connecting the respective constituent elements of the apparatus to transmit/receive various data such as image data and control signals.

The processing executed in the third embodiment will be described below with reference to the flow charts of FIGS. 10 to 21.

In the third embodiment, the CPU causes the color image scanner 205 to read an original image in accordance with an instruction from the user. The CPU then binarizes the image data obtained by the reading operation, and divides the area of the resultant binary image data into areas. The CPU determines the attributes of the respective areas divided by image area separation processing, and decides, on the basis of the determined attributes, the number of quantization levels with which the respective areas included in the binary image data are quantized. In addition, the CPU generates structured data of the respective areas on the basis of the decided number of quantization levels, and stores the generated structured data in the storage unit 204. An example of the above processing will be described below.

Note that the structured data is the data obtained by properly encoding the binary image data corresponding to the respective areas on the basis of their attributes.

When the apparatus is started, an original image set on the color image scanner 205 is read, and the resultant image data is loaded through the terminal 203. A background representative density bg_value, density width lower limit bt0, and density width upper limit bt1 of the image data are then calculated on the basis of the loaded image data. The above processing will be described first with reference to the flow charts of FIGS. 10 to 12.

Figure 10:
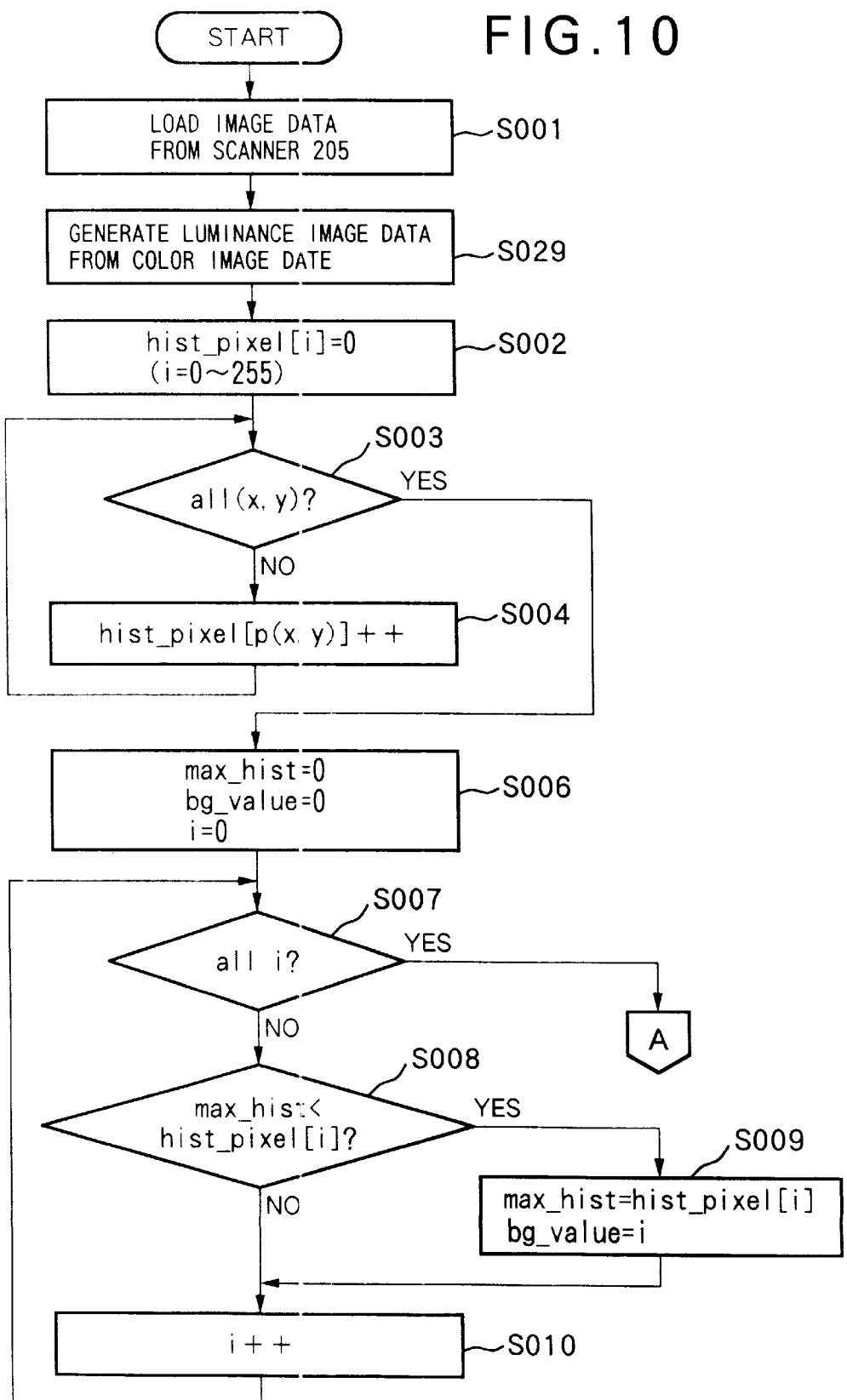
FIG. 10 is a flow chart showing the flow of the processing executed in the third embodiment to calculate a background representative density bg_value, density width lower limit bt0, and density width upper limit bt1 of image data.
Figure 11:
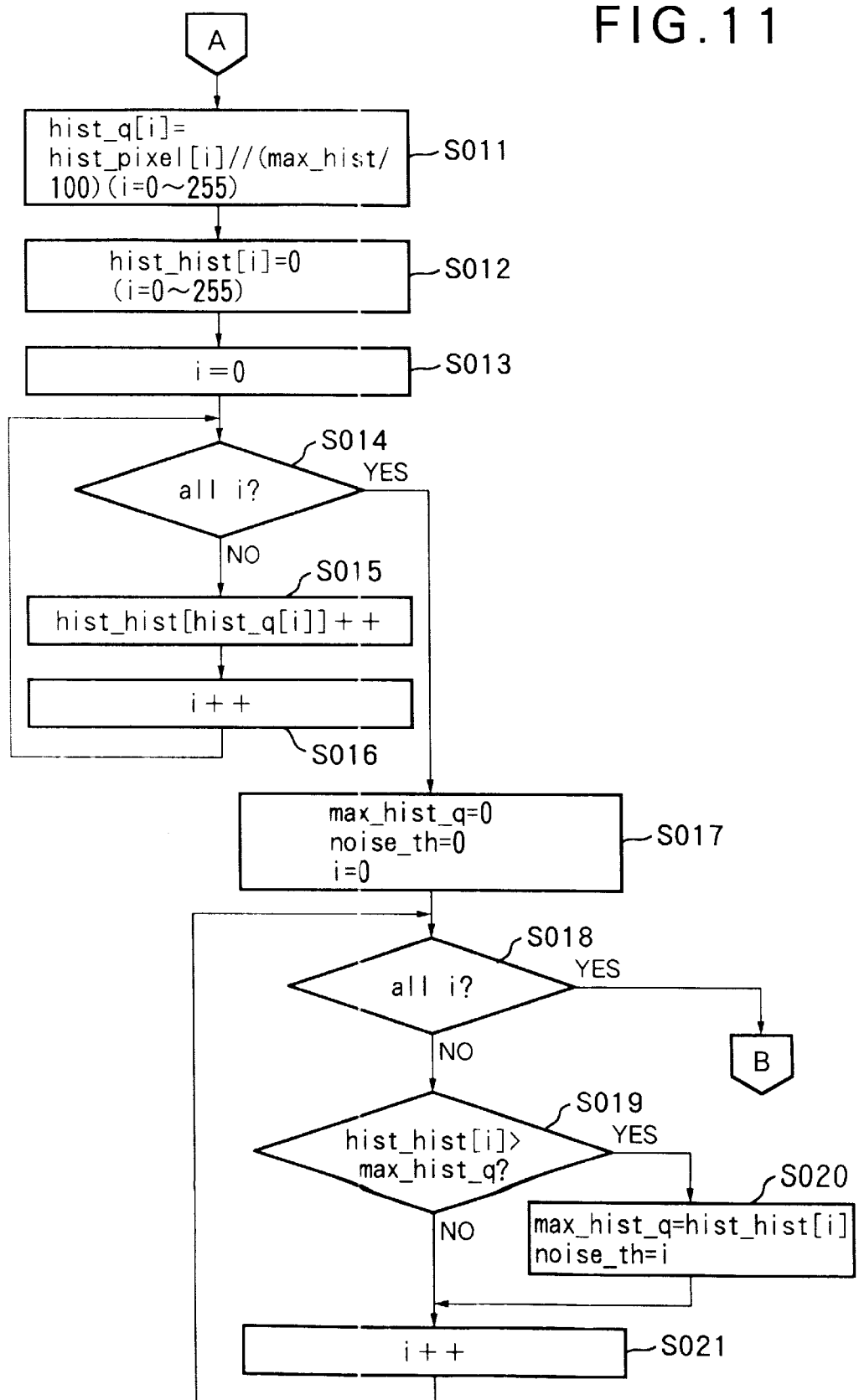
FIG. 11 is a flow chart showing the flow of the processing executed in the third embodiment to calculate the background representative density bg_value, density width lower limit bt0, and density width upper limit bt1 of the image data.
Figure 12:
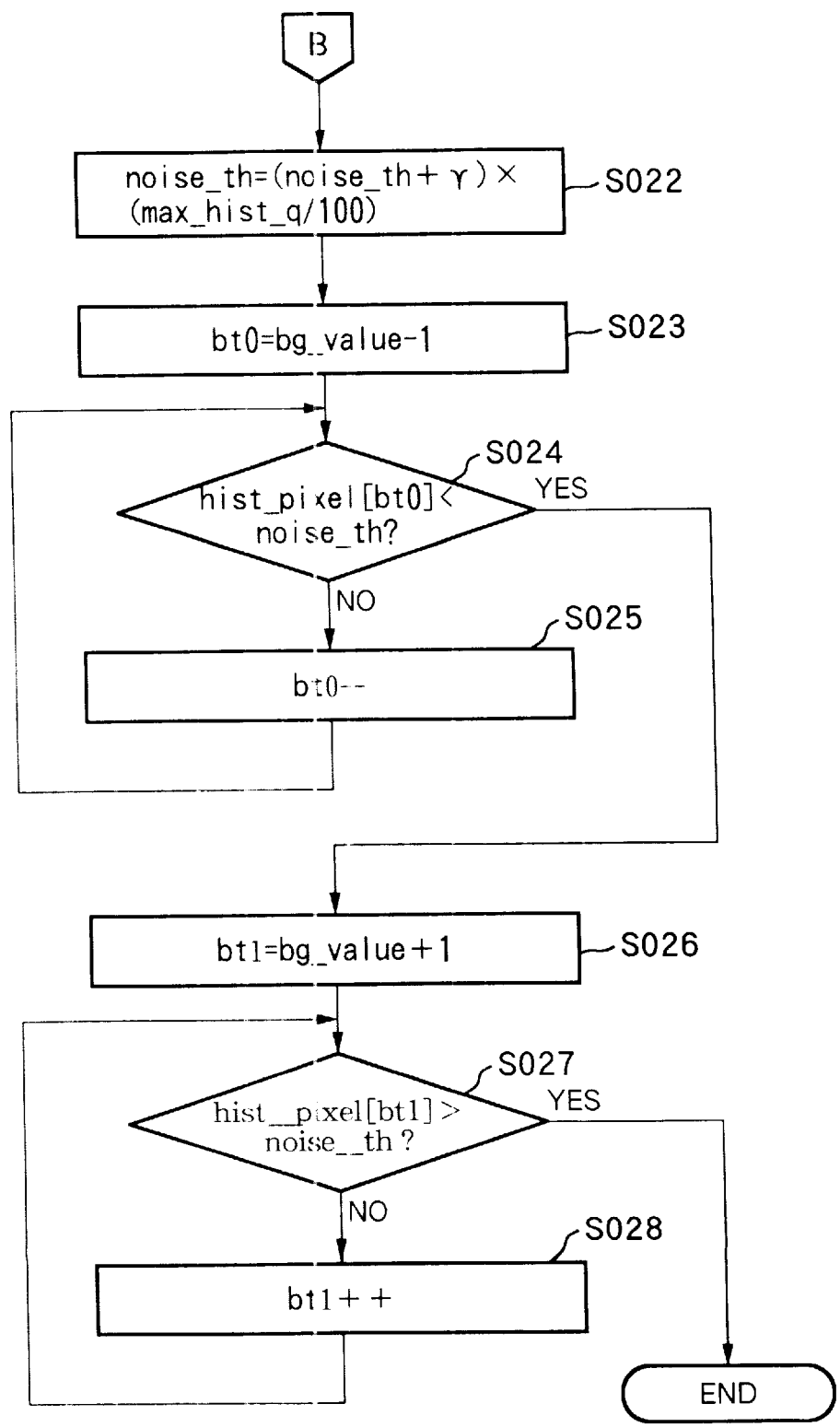
FIG. 12 is a flow chart showing the flow of the processing executed in the third embodiment to calculate the background representative density bg_value, density width lower limit bt0, and density width upper limit bt1 of the image data.

FIGS. 10 to 12 are the flow charts showing the flow of the processing executed in the third embodiment to calculate the background representative density bg_value, density width lower limit bt0, and density width upper limit bt1 of the image data.

Referring to FIG. 10, in step S001, the CPU 201 loads image data through the color image scanner 205 and stores the data in the multi-level frame memory 206. In step S029, the CPU 201 generates Y image data p(x, y) representing the luminance of the YCbCr image data from the color image data stored in the multi-level frame memory 206, and stores the Y image data in the program memory 202. In step S002, the CPU 201 resets the counters for counting the pixel values of the respective pixel data p(x, y) of the luminance image data developed in the program memory 202 to 0. Note that the counters are constituted by 256 counters for frequency values hist_pixel[i] (i=0 to 255). For example, the pixel data with a pixel value i is counted as the hist_pixel[i]. The count values of the respective counters represent the output frequency values of the respective pixel values.

In step S003, the CPU 201 sequentially loads the pixel data p(x, y) of the luminance image data from the program memory 202, and checks whether the pixel values of all the pixel data p(x, y) are loaded. In step S004, the contents of the counters for frequency values hist_pixel [p(x, y)] corresponding to the pixel values of the pixel data p(x, y) which are sequentially loaded are incremented by one until the pixel values of all the pixel data p(x, y) are loaded.

When the pixel values of the respective pixel data p(x, y) are completely loaded, the flow advances to step S006. Note that when the pixel values of the respective pixel data p(x, y) are completely loaded, a histogram of the output frequency values of the pixel values of the image data is formed from the output frequency values of the respective pixel values represented by the frequency values hist_pixel[i]. In step S006, a variable max_hist to be compared with the output frequency value of each pixel value in the formed histogram, the background representative density bg_value decided on the basis of the comparison result, and the contents of a loop counter i for counting the number of pixels compared are reset to 0.

In step S007, the CPU 201 loads the frequency values hist_pixel[i] of the respective pixel values from the formed histogram, and checks whether all the frequency values hist_pixel[i] are loaded. In step S008, each of the frequency values hist_pixel[i] which are sequentially loaded is compared with the variable max_hist until all the frequency values hist_pixel[i] are loaded. If the frequency value hist_pixel[i] is larger than the variable max_hist (YES in step S008), the flow advances to step S009. In step S009, the CPU 201 substitutes the frequency value hist pixel[i] for the variable max hist, and substitutes the contents of the loop counter i for the background representative density bg_value. If the frequency value hist_pixel[i] is equal to or smaller than the variable max_hist (NO in step S008), the flow advances to step S010.

In step S010, the contents of the loop counter i are incremented by one. When comparison with all the frequency values hist_pixel[i] is completed, i.e., the contents of the loop counter i become 255, the flow advances to step S011.

Referring to FIG. 11, in step S011, after a quantization step max_hist/100 for normalizing the histogram is calculated, a quantization frequency value hist_q[i] is calculated according to equation (6):

$$hist\_q[i] = hist\_pixel[i] // (max\_hist/100) \quad (6)$$

Note that the symbol "//" indicates that the decimal part of the quotient is rounded to the nearest integer.

In step S012, the contents of counters hist_hist[i] for counting the respective quantization frequency values hist_q[i] are reset to 0. In step S013, the contents of the loop counter i for counting the number of the loaded quantization frequency values hist_q[i] are reset to 0.

In step S014, the CPU 201 sequentially loads the quantization frequency values hist_q[i], and checks whether all the quantization frequency values hist_q[i] are loaded. In step S015, the output values of the sequentially loaded quantization frequency values hist_q[i] are counted by counters hist_hist[hist_q[i]]. In step S016, the contents of the loop counter i are incremented by one.

When all the quantization frequency values hist_q[i] are completely loaded, the flow advances to step S017. When all the quantization frequency values hist_q[i] are completely loaded, a histogram of the quantization frequency values hist_q[i] is formed from the values indicated by the counters hist_hist[i]. In step S017, a variable max_hist_q to be compared with each quantization frequency hist_hist[i] in the formed histogram, a noise threshold noise_th decided on the basis of the comparison result, and the contents of the loop counter i for counting the number of the quantization frequency values hist_pixel[i] compared are reset to 0.

In step S108, the CPU 201 loads the quantization frequency values hist_hist[i] from the formed histogram, and checks whether all the quantization frequency values hist_hist[i] are loaded. In step S109, each of the quantization frequency values hist_hist[i] which are sequentially loaded is compared with the variable max_hist_q until all the quantization frequency values hist_hist[i] are loaded. If the quantization frequency value hist_hist[i] is larger than the variable max_hist_q (YES in step S019), the flow advances to step S020. In step S020, the CPU 201 substitutes the quantization frequency value hist_hist[i] for the variable max_hist_q, and substitutes the contents of the loop counter i for the noise threshold noise_th. In contrast to this, if the quantization frequency value hist_hist[i] is equal to or smaller than the variable max_hist_q (NO in step S019), the flow advances to step S021.

In step S021, the contents of the loop counter i are incremented by one. When comparison with all the quantization frequency values hist_hist[i] is completed, i.e., the contents of the loop counter i become 255, the flow advances to step S022.

Referring to FIG. 12, in step S022, a new noise threshold noise_th is calculated according to equation (7):

$$noise\_th = (noise\_th + \gamma) \times (max\_hist\_q/100) \quad (7)$$

In step S023, the density width lower limit bt0 is calculated by subtracting "1" from the background representative density bg_value. In step S024, each frequency value hist_pixel[bt0] is sequentially compared with the new noise threshold noise_th. The density width lower limit bt0 is decremented one by one in step S025 until it is determined in step S024 that the frequency value hist_pixel[i] is smaller than the noise threshold noise_th.

When the frequency value hist_pixel[i] becomes smaller than the noise threshold noise_th, the density width upper limit bt1 is calculated by subtracting "1" from the background representative density bg_value in step S026. Note that the density width lower limit obtained when the frequency value hist_pixel[bt0] becomes smaller than the noise threshold noise_th is set as the density width lower limit bt0.

In step S027, each frequency value hist_pixel[bt1] is sequentially compared with the new noise threshold noise_th. In step S028, the density width upper limit bt1 is incremented one by one until the frequency value hist_pixel[bt1] becomes smaller than the noise threshold noise_th. When the frequency value hist_pixel[bt1] becomes smaller than the noise threshold noise_th, the processing is terminated. Note that the density width upper limit obtained when the frequency value hist_pixel[bt1] becomes smaller than the noise threshold noise_th is set as the density width upper limit bt1.

With the processing described with reference to the flow charts of FIGS. 10 to 12, the background representative density bg_value, density width lower limit bt0, and density width upper limit bt1 of the image data are calculated.

The processing of binarizing image data to perform image area separation processing for the image data will be described next with reference to the flow chart of FIG. 13.

Figure 13:
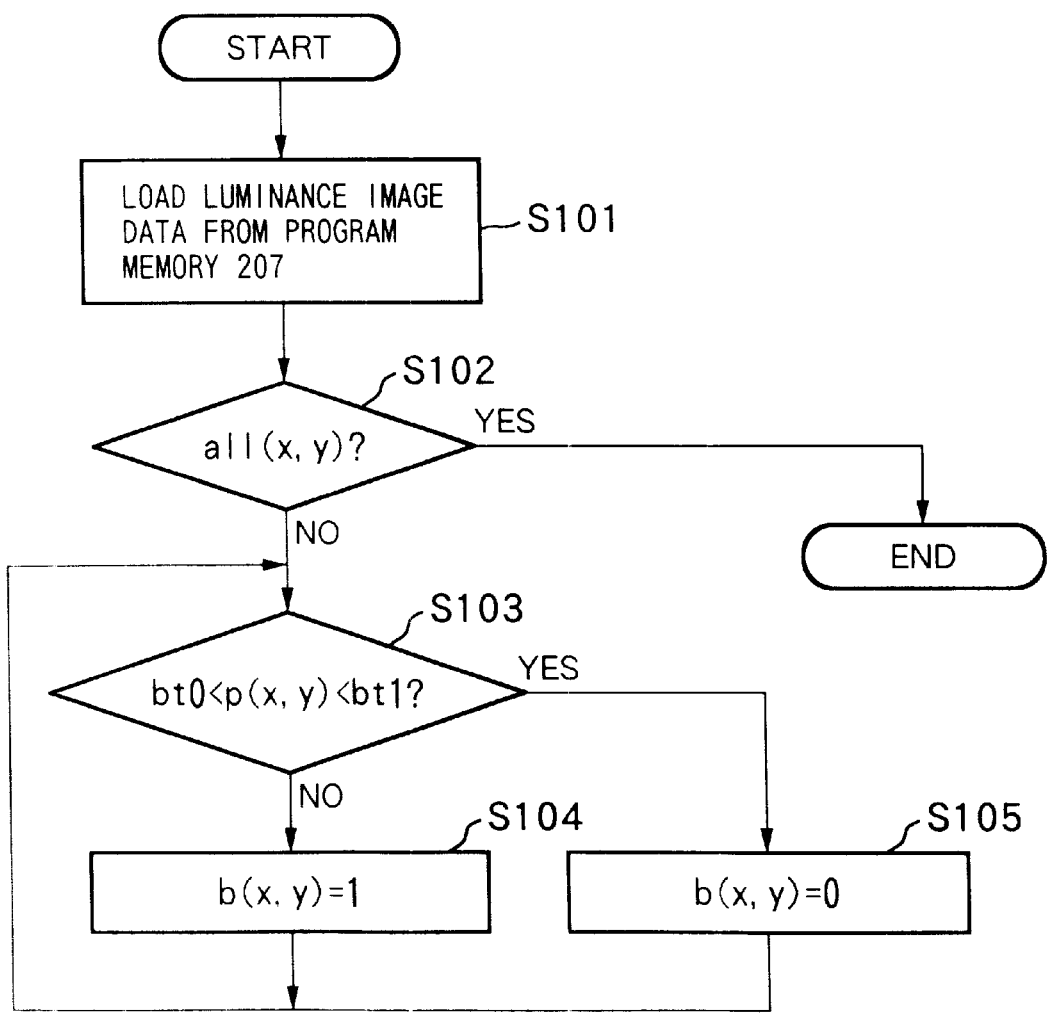
FIG. 13 is a flow chart showing the flow of the processing executed in the third embodiment to binarize image data.

FIG. 13 is a flow chart showing the flow of the processing executed in the third embodiment to binarize image data.

In step S101, the CPU sequentially loads the pixel data p(x, y) of the luminance image data developed in the program memory 202. In step S102, the CPU checks whether the processing executed in step S103 (to be described later) is completed for all the pixel data p(x, y). In step S103, all the pixel data p(x, y) are binarized into binary image data b(x, y). In this binarization method, it is checked whether the pixel value of each of the pixel data p(x, y) which are sequentially loaded is larger than the density width lower limit bt0 and smaller than the density width upper limit bt1.

If the pixel data p(x, y) is larger than the density width lower limit bt0 and smaller than the density width upper limit bt1, the flow advances to step S105 to write the binary image data b(x, y) of the pixel data p(x, y) as "0" in the corresponding area of the binary frame memory 207. In contrast to this, if the pixel data p(x, y) is equal to or smaller than the density width lower limit bt0 and equal to or larger than the density width upper limit bt1, the flow advances to step S104 to write the binary image data b(x, y) of the pixel data p(x, y) as "1" in the corresponding area of the binary frame memory 207.

When all the pixel data p(x, y) in the program memory 202 are binarized, the processing is terminated.

With the above processing described with reference to the flow chart of FIG. 13, the binary image data b(x, y) obtained by binarizing the respective pixel data p(x, y) of the image data stored in the multi-level frame memory 206 are stored in the binary frame memory 207.

Subsequently, the binary image data stored in the binary frame memory 207 is subjected to area division, and the attributes of the divided areas are determined by image area separation processing. The number of quantization levels with which the respective areas included in the binary image data are quantized is determined on the basis of the determined attributes. This processing will be described next with reference to the flow charts of FIGS. 14 to 17.

FIGS. 14 to 17 are the flow charts showing the flow of the processing executed in the third embodiment to decide the number of quantization levels with which the respective areas included in the binary image data are quantized.

Figure 14:
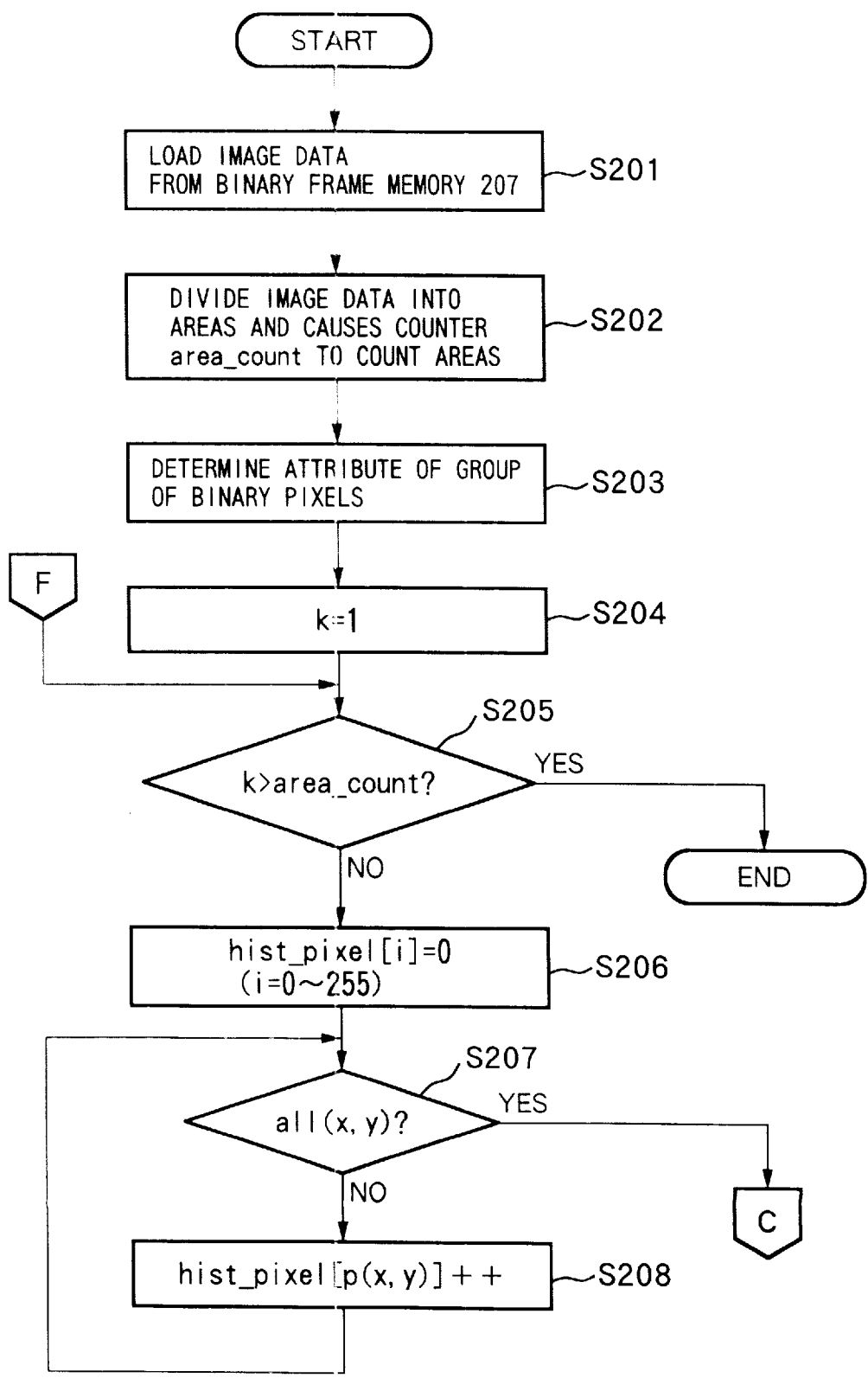
FIG. 14 is a flow chart showing the flow of the processing executed in the third embodiment to decide the number of quantization levels for quantizing each area included in binary image data.

Referring to FIG. 14, in step S201, the CPU loads binary image data from the binary frame memory 207. In step S202, the CPU divides the loaded binary image data in units of areas having similar attributes, and causes a counter area_count to count the number of areas divided. In addition, the CPU obtains the position coordinates and sizes of the respective areas. In step S203, image area separation processing is performed for the respective counted areas to determine the attributes of each area, e.g, "image (photograph)", "graphic pattern", and "character", on the basis of the density, shape, and layout of groups of binary image data "1" included in each area. In this case, image area separation is performed by using, for example, the image area separation method disclosed in Japanese Patent Application No. 6-167748.

More specifically, this processing is performed as follows.

First of all, with regard to binary data, if groups of "1s" continue at a predetermined period, since the possibility that the corresponding area is a character string is high, the area is determined as a "character" area.

With regard to areas other than "character" areas, since the possibility that a group of data with a relatively high density of "1s" is a "photograph" area is high, each corresponding area is determined as an "image (photograph)" area.

Of the remaining areas, areas each having a relatively low density of "1s" and a predetermined shape is determined as "graphic pattern" areas.

In step S204 and the subsequent steps, the CPU performs the processing of deciding the number of quantization levels required for image expression in each counted area.

In step S204, the value of a loop counter k is set to "1". Every time the processing of deciding the number of quantization levels is completed for each area, the loop counter k is incremented by one. This count value corresponds to the value of the area counted by the counter area_count. In step S205, the CPU checks whether the value of the loop counter k is larger than that of the counter area_count. If the value of the loop counter k is equal to or smaller than that of the counter area_count (NO in step S205), the flow advances to step S206. If the value of the loop counter k is larger than that of the counter area_count (YES in step S205), since it indicates that the processing of deciding the number of quantization levels is completed for all the counted areas, the processing terminated.

In step S206, the counters for counting the pixels values of the pixel data p(x, y) in the area corresponding to the value of the loop counter k, input from the program memory 202, are set to 0. Note that the counters are constituted by 256 counters for the frequency values hist_pixel[i] (i=0 to 255). For example, the pixel data with the pixel value i is counted as the hist_pixel[i]. The count values of the respective counters represent the output frequency values of the respective pixel values.

In step S207, the CPU sequentially loads the pixel data p(x, y) of the area corresponding to the value of the loop counter k from the program memory 202, and checks whether the pixel values of all the pixel data p(x, y) are loaded. In step S208, the contents of the counters for the frequency values hist_pixel[p(x,y)] corresponding to the pixel values of the pixel data p(x, y) which are sequentially loaded are incremented by one until the pixel values of all the pixel data p(x, y) are loaded. When all the pixel values are loaded, the flow advances to step S209. When all the pixel values are loaded, a histogram of the output frequency values of the pixel values of the pixel data is formed on the basis of the output frequency values of the respective pixel values indicated by the frequency values hist_pixel[i].

Figure 15:
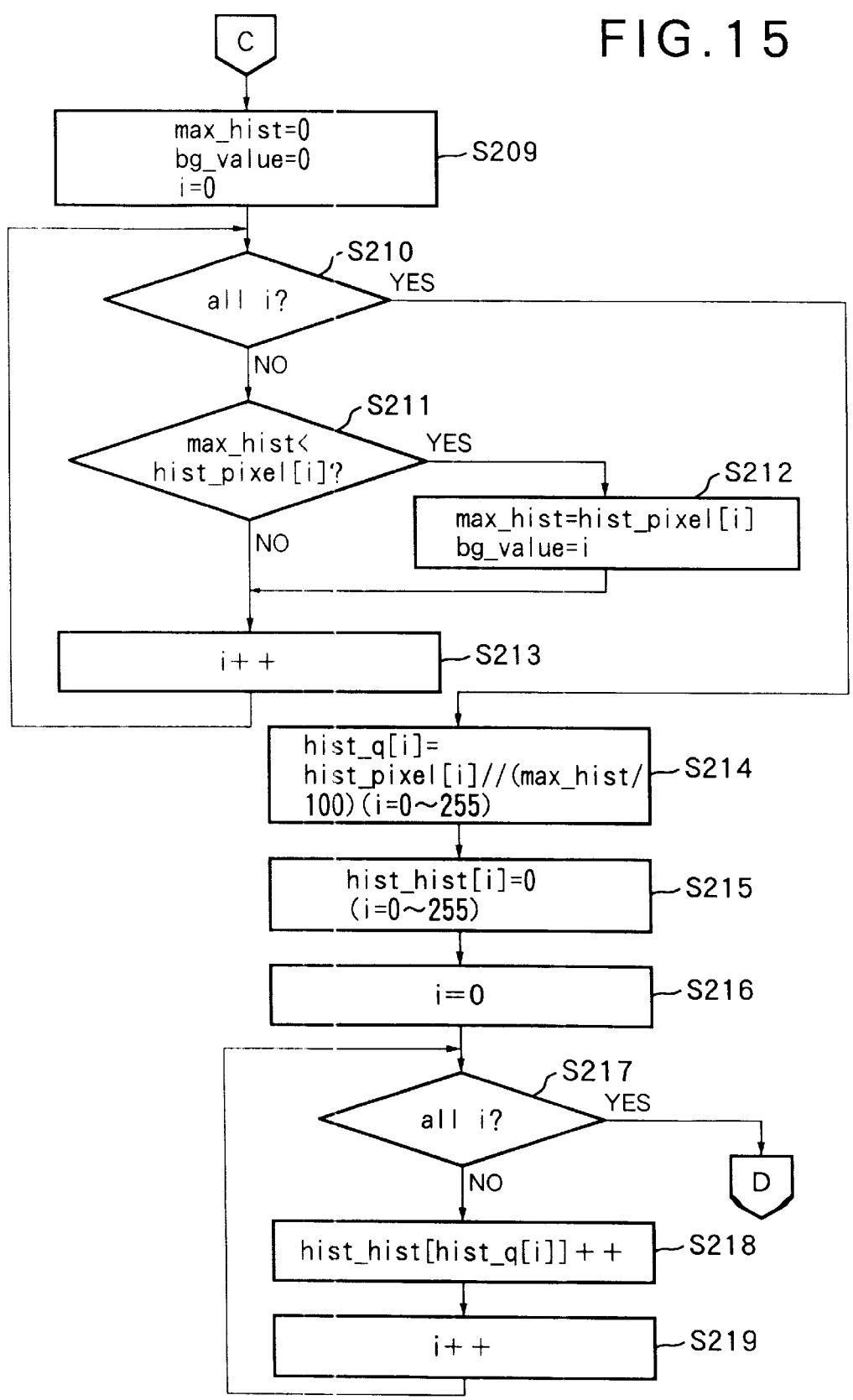
FIG. 15 is a flow chart showing the flow of the processing executed in the third embodiment to decide the number of quantization levels for quantizing each area included in the binary image data.

Referring to FIG. 15, in step S209, the variable max_hist to be compared with the output frequency of each pixel value in the formed histogram, the background representative density bg_value decided on the basis of the comparison result, and the contents of the loop counter i for counting the number of pixel values compared are reset to 0.

In step S210, the CPU loads the frequency values hist_pixel[i] of the respective pixel values from the formed histogram, and checks whether all the frequency values hist_pixel[i] are loaded. In step S211, each of the frequency values hist_pixel[i] which are sequentially loaded is compared with the variable max_hist until all the frequency values hist_pixel[i] are loaded. If the frequency value hist_pixel[i] is larger than the variable max_hist (YES in step S211), the flow advances to step S212. In step S212, the CPU substitutes the frequency value hist_pixel[i] for the variable max_hist, and substitutes the contents of the loop counter i for the background representative density bg_value. In contrast to this, if the frequency value hist_pixel[i] is equal to or smaller than the variable max_hist (NO in step S211), the flow advances to step S213.

In step S213, the contents of the loop counter i are incremented by one. When comparison with all the frequency values hist_pixel[i] is completed, i.e., the contents of the loop counter i become 255, the flow advances to step S214.

In step S214, after the quantization step max_hist/100 for normalizing the histogram is calculated, the quantization frequency value hist_q[i] is calculated according to equation (6).

In step S215, the contents of the counters hist_hist[i] for counting the values of the respective quantization frequency values hist_q[i] are reset to 0. In step S216, the contents of the loop counter i for counting the number of quantization frequency values hist_q[i] loaded are reset to 0.

In step S217, the CPU sequentially loads the quantization frequency values hist_q[i], and checks whether all the quantization frequency values hist_q[i] are loaded. In step S218, the output values of the quantization frequency values hist_q[i], which are sequentially loaded, are counted by the counters hist_hist[hist_q[i]] until all the quantization frequency values hist_q[i] are loaded. In step S219, the contents of the loop counter i are incremented by one.

When all the quantization frequency values hist_q[i] are loaded, the flow advances to step S220. Note that when all the quantization frequency values hist_q[i] are loaded, a histogram of the quantization frequency values hist_q[i] is formed on the basis of the values indicated by the counters hist hist[i] (i=0 to 100).

Figure 16:
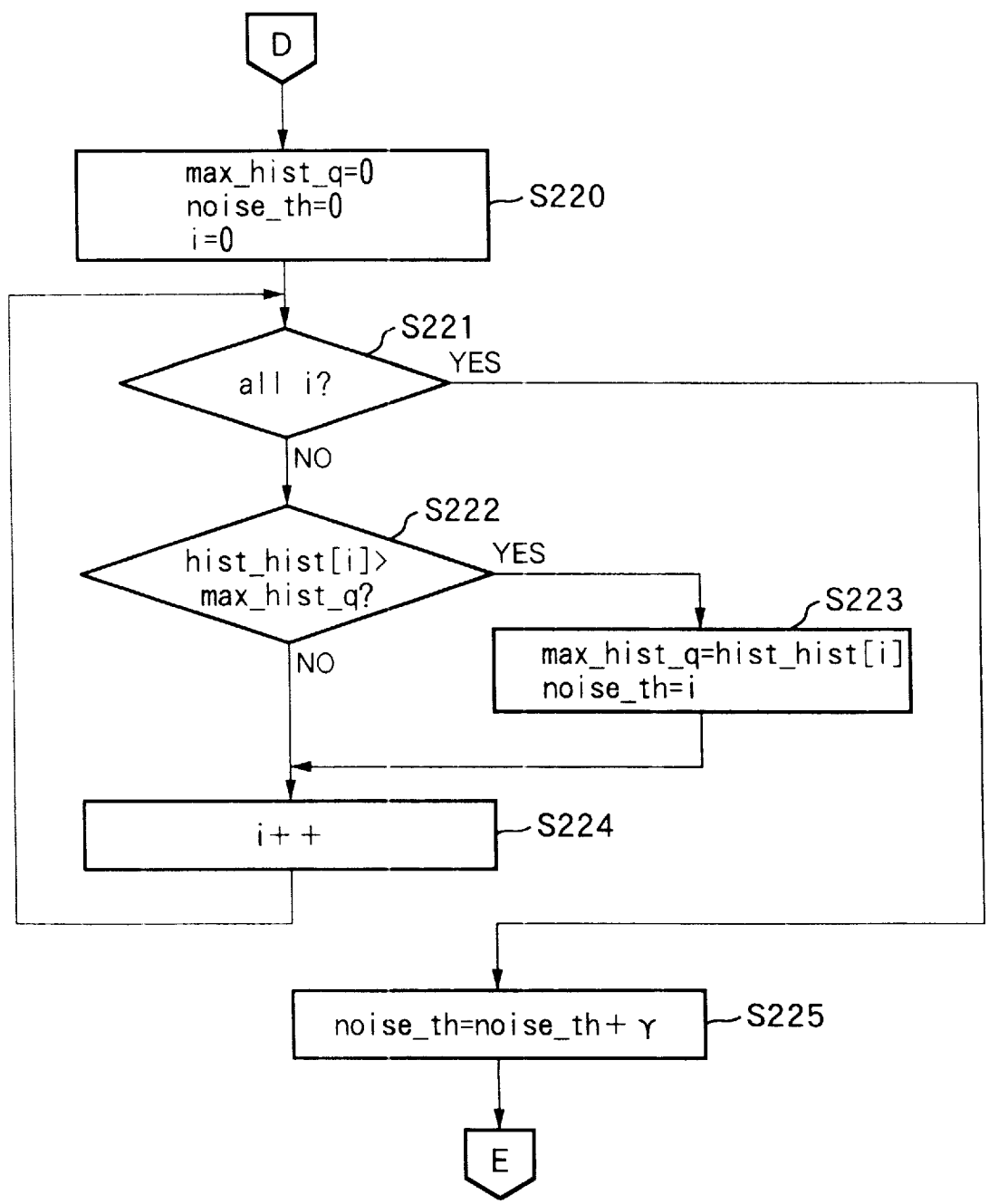
FIG. 16 is a flow chart showing the flow of the processing executed in the third embodiment to decide the number of quantization levels for quantizing each area included in the binary image data.

Referring to FIG. 16, in step S220, the variable max_hist_q to be compared with the quantization frequency values hist_hist[i] in the formed histogram, the noise threshold noise_th decided on the basis of the comparison result, and the contents of the loop counter i for counting the number of quantization frequency values hist_hist[i] compared are reset to 0.

In step S221, the CPU loads the values of the counters hist_hist[i] from the formed histogram, and checks whether the values of all the counters hist_hist[i] are loaded. In step S222, each of the values of the counters hist_hist[i] which are sequentially loaded is compared with the variable max_hist_q until the values of all the counters hist_hist[i] are loaded. If the value of the counters hist_hist[i] is larger than the variable max_hist_q (YES in step S222), the flow advances to step S223. In step S223, the CPU substitutes the frequency value hist_hist[i] for the variable max_hist_q, and substitutes the contents of the loop counter i for the noise threshold noise_th. In contrast to this, if the quantization frequency value hist_hist[i] is equal to or smaller than the variable max_hist_q (NO in step S222), the flow advances to step S224.

In step S224, the contents of the loop counter i are incremented by one. When comparison with all the quantization frequency values hist_hist[i] is completed, i.e., the contents of the loop counter i become 100, the flow advances to step S225.

In step S225, a new noise threshold noise_th is calculated by adding γ to the noise threshold noise_th.

Figure 17:
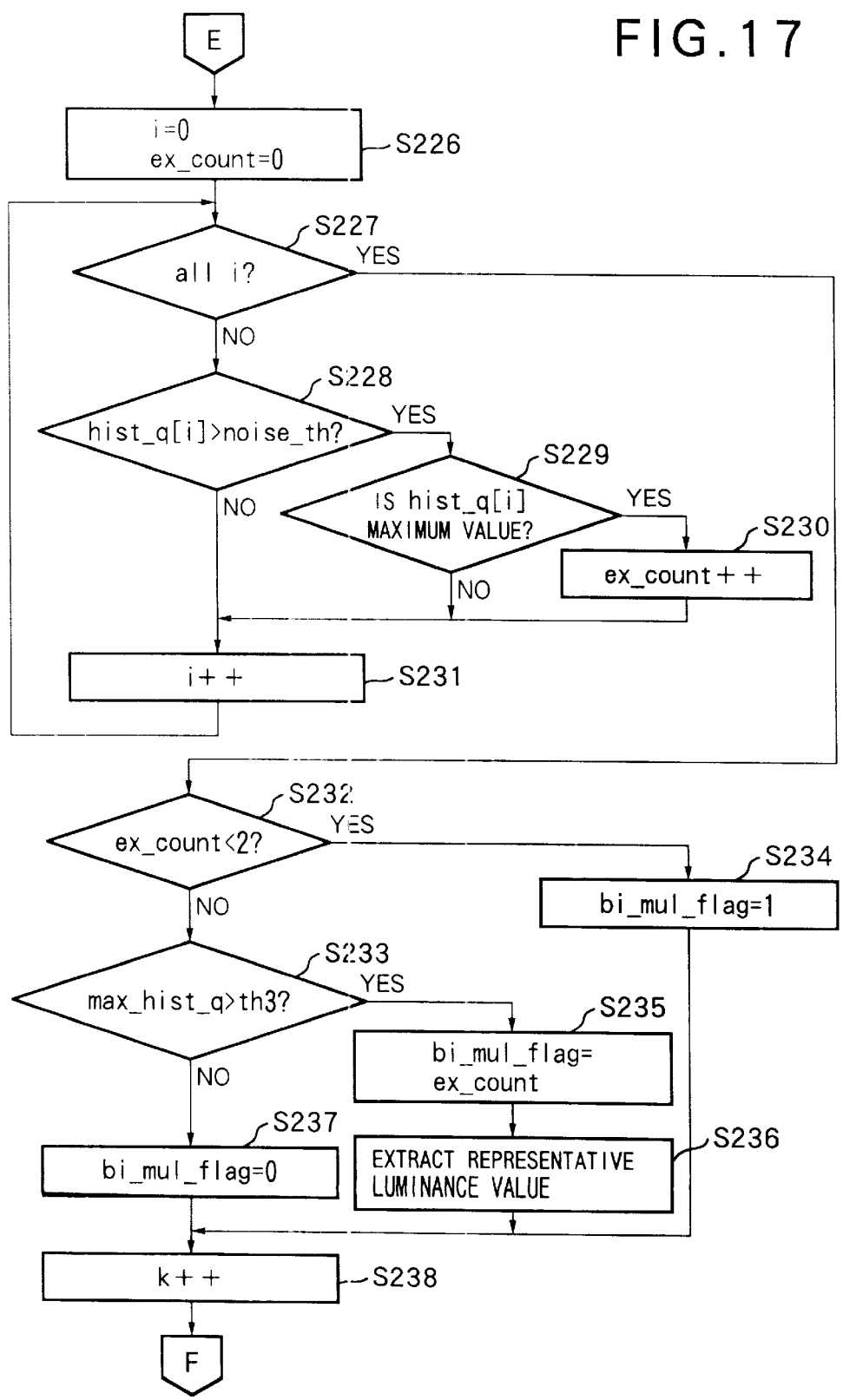
FIG. 17 is a flow chart showing the flow of the processing executed in the third embodiment to decide the number of quantization levels for quantizing each area included in the binary image data.

Referring to FIG. 17, in step S226, each quantization frequency value hist_q[i] in the formed histogram is compared with the new noise threshold noise_th, and the contents of the loop counter i for counting the number of quantization frequency values hist_q[i] compared and the contents of a variable ex_count representing the number of maximum quantization frequency values hist_q[i] present in the histogram are reset to 0.

In step S227, the CPU loads the quantization frequency values hist_q[i] from the formed histogram, and checks whether all the quantization frequency values hist_q[i] are loaded. In step S228, each of the quantization frequency values hist_q[i], which are sequentially loaded, is compared with the new noise threshold noise_th until all the quantization frequency values hist_q[i] are loaded. If the quantization frequency value hist_q[i] is larger than the new noise threshold noise_th (YES in step S228), the flow advances to step S229. In step S229, the CPU checks whether the quantization frequency value hist_q[i] is the maximum value. If the value is the maximum value (YES in step S229), the flow advances to step S230. Otherwise (NO in step S229), the flow advances to step S231. In step S230, the variable ex_count is incremented by one, and the flow advances to step S231. In contrast to this, if the quantization frequency value hist_q[i] is equal to or smaller than the noise threshold noise_th (NO in step S228), the flow advances to step S231.

In step S231, the contents of the loop counter i are incremented by one. When comparison with all the quantization frequency values hist_q[i] is completed, i.e., the contents of the loop counter i become 255, the flow advances to step S232.

In step S232, the CPU checks whether the variable ex_count is equal to or larger than "2". If the variable ex_count is smaller than "2" (YES in step S232), the flow advances to step S234. In step S234, the contents of a bi_mul_flag indicating the attribute of the image in the area is set to "1". The flow then advances to step S238. If the variable ex_count is smaller than "2", the CPU determines that the image in the area is a monochrome character image. If the variable ex_count is equal to or larger than "2", the CPU determines that the image in the area is an image having a plurality of colors.

If the variable ex_count is equal to or larger than "2" (NO in step S232), the flow advances to step S233. In step S233, the CPU checks whether the variable max_hist_q is larger than a threshold Th3. If the variable max_hist_q is larger than the threshold Th3 (YES in step S233), the flow advances to step S235. In step S235, the CPU determines that the image has the density indicated by the variable ex_count, and substitutes the contents of the variable ex_count for the bi_mul_flag indicating the attribute of the image in the area. The flow then advances to step S236. If the variable max_hist_q is equal to or smaller than the threshold Th3, the CPU determines that the image in the area is a continuous-tone image. If the variable max_hist_q is larger than the threshold Th3, the CPU determines that the image in the area is a multi-level image having a plurality of colors.

In step S236, the luminances of the colors constituting the area are extracted on the basis of the value indicated by the contents of the bi_mul_flag. The number of colors present in the area corresponds to the value indicated by the contents of the bi_mul_flag. A luminance pm [g] (g=1 to bi_mul_flag) (referred to as a representative luminance) exhibiting the maximum number indicated by the contents of the bi_mul_flag is obtained on the basis of the quantization frequency values hist_q[i]. With this operation, the number of quantization levels required for image expression in the area and the luminances of colors required for image expression are extracted, and the processing of deciding the number of quantization levels is completed for the area. Thereafter, the flow advances to step S238.

If the variable max_hist_q is equal to or smaller than the threshold Th3 (NO in step S233), the contents of the bi_mul_flag indicating the attribute of the image in the area are set to "0", and the flow advances to step S238.

In step S238, the contents of the loop counter k are incremented by one. When the processing of deciding the number of quantization levels required for image expression is performed for all the areas, i.e., the contents of the loop counter k coincide with the value of the counter area_count, all the processing operations are terminated.

With the processing described with reference to FIGS. 14 to 17, the binary image data stored in the binary frame memory 207 is subjected to area division, and the attributes of the divided areas are determined by image area separation processing. The number of quantization levels with which the respective areas included in the binary image are quantized is determined on the basis of the determined attributes.

Subsequently, structured data in the respective areas included in the binary image data are generated on the basis of the attributes of the areas included in the binary image data and the corresponding number of quantization levels. This processing will be described next with reference to the flow charts of FIGS. 18 to 21.

FIGS. 18 to 21 are the flow charts showing the flow of the processing executed in the third embodiment to generate structured data in the respective areas included in binary image data.

Figure 18:
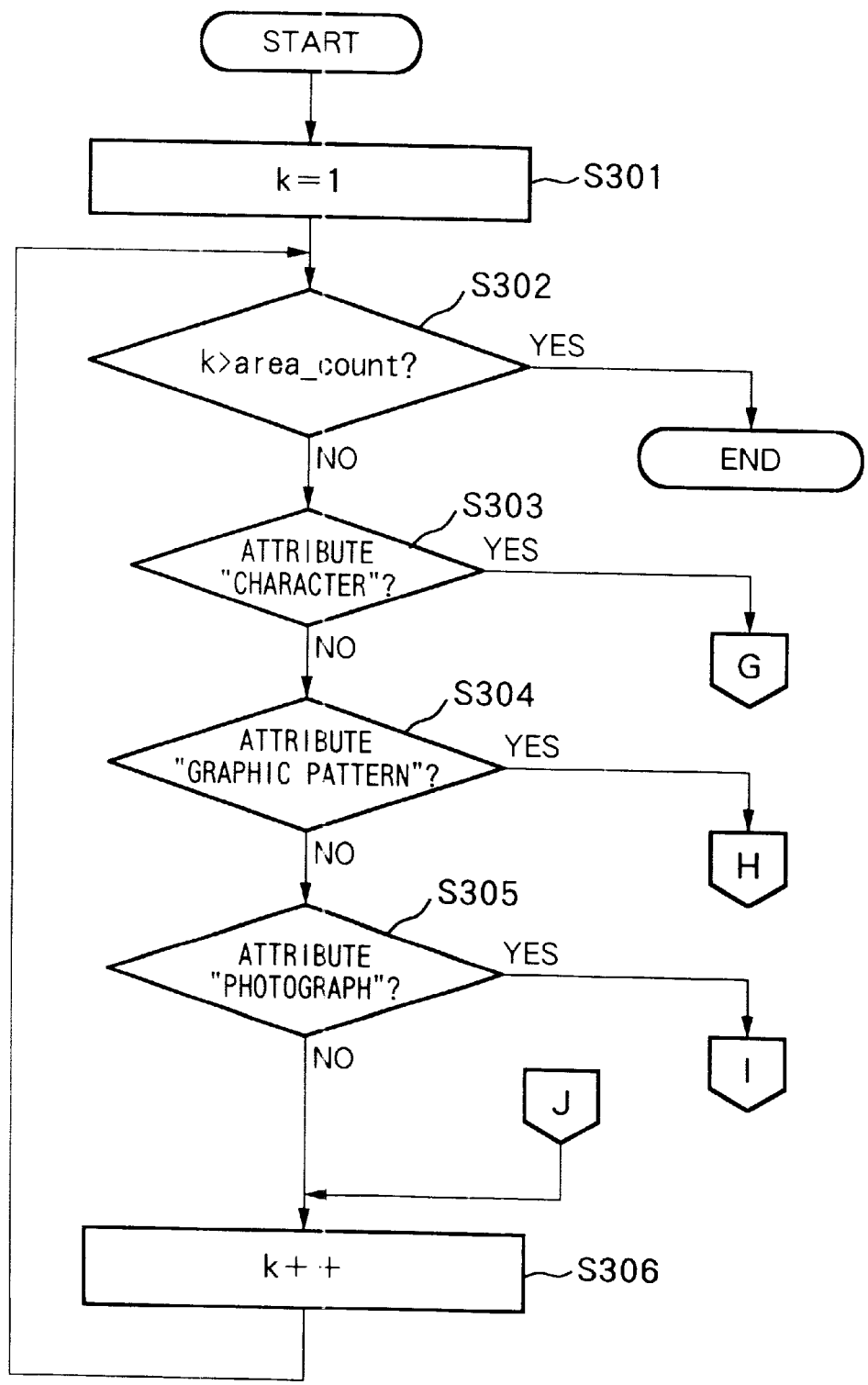
FIG. 18 is a flow chart showing the flow of the processing executed in the third embodiment to generate structured data of each area included in binary image data.

Referring to FIG. 18, in step S301, the value of the loop counter k is set to "1". Every time the processing of generating structured data for each area is completed, the loop counter k is incremented by one. This count value corresponds to the value of the area counted by the counter area_count. In step S302, the CPU checks whether the value of the loop counter k is larger than that of the counter area_count. If the value of the loop counter k is equal to or smaller than that of the counter area_count (NO in step S302), the flow advances to step S303. If the value of the loop counter k is larger than that of the counter area_count (YES in step S302), since it indicates that the processing of generating structured data is performed for all the counted areas, the processing is terminated.

In step S303, the CPU checks whether the attribute obtained by image area separation processing for the area corresponding to the value of the loop counter k is a "character". If the attribute of the area is a "character" (YES in step S303), the processing in steps S307 to S312 (to be described later) is performed. If the attribute of the area is not a "character" (NO in step S303), the flow advances to step S304.

The processing to be executed when the attribute of an area is a "character" will be described below with reference to the flow chart of FIG. 19.

Figure 19:
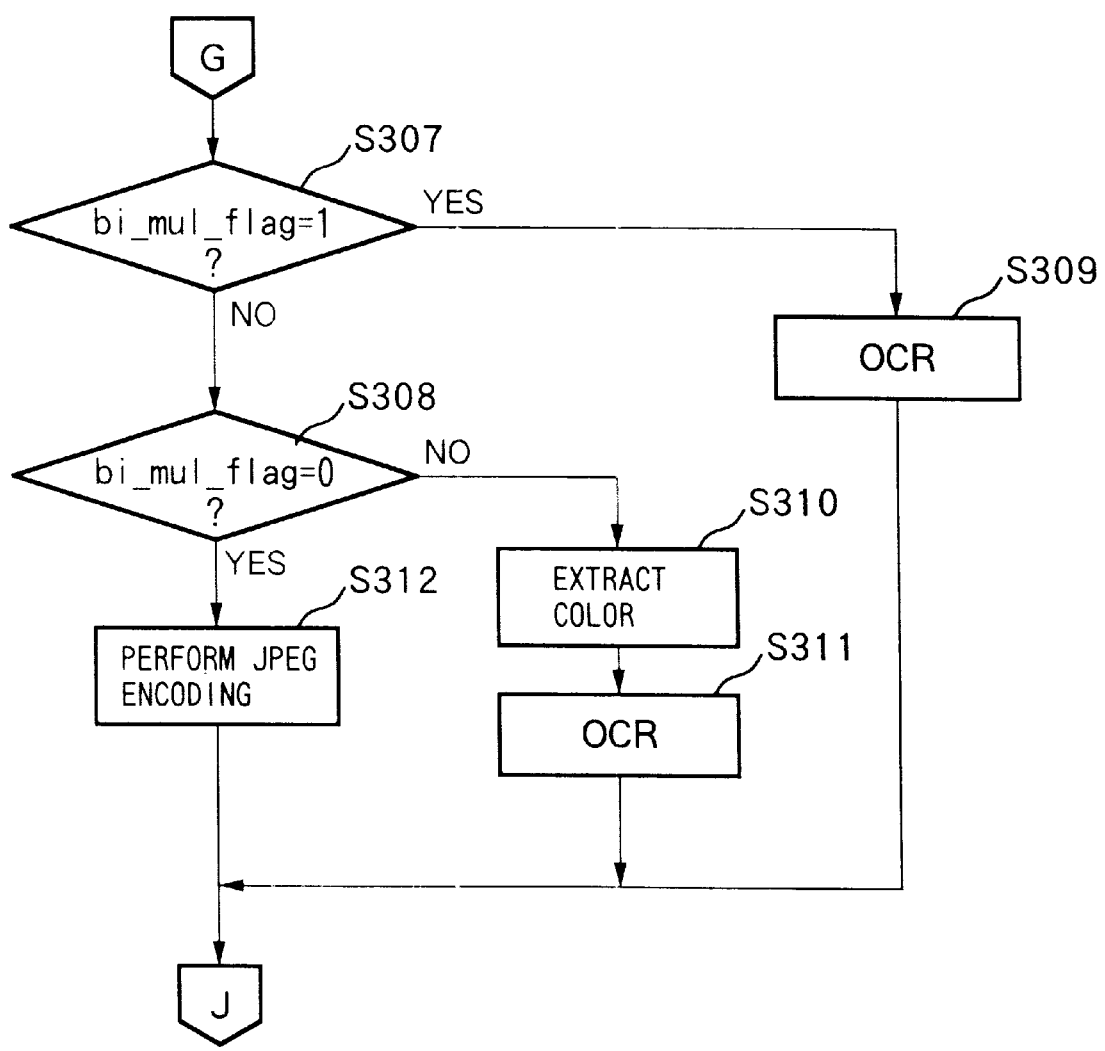
FIG. 19 is a flow chart showing the flow of the processing to be executed in the third embodiment when the attribute of an area is a "character"

FIG. 19 is a flow chart showing the flow of the processing executed in the third embodiment when the attribute of an area is a "character".

In step S307, the CPU checks whether the bi__mul__flag of the area whose attribute is a "character" is "1". If the bi__mul__flag of the area is "1" (YES in step S307), it indicates that the area is a monochrome character area. In this case, the flow advances to step S309 to perform OCR with respect to the area whose attribute is a "character". Thereafter, the flow advances to step S306. If the bi__mul__ flag is not "1" (NO in step S307), the flow advances to step S308.

If the bi__mul__flag of the area is "1", it is determined that the area is constituted by a monochrome "character". If the bi__mul__flag is "0", it is determined that the area is constituted by a continuous-tone image. If the bi__mul__flag is neither "1" nor "0", it is determined that the area is constituted by a "character" with a plurality of colors. Each character string obtained by OCR is stored in a predetermined area of the storage unit 204, together with the corresponding character code, the coordinates, and the area size, in accordance with the format of a structured document constituted by structured data.

In step S308, the CPU checks whether the bi__mul__flag of the area whose attribute is a "character" is "0". If the bi__mul__flag is not "0" (NO in step S308), the flow advances to step S310. In step S310, a bit plane image for each representative luminance is generated from the luminance image in the program memory 202 on the basis of the number of quantization levels and the representative pm [g] for the area, which are obtained in step S236. Representative colors are extracted as follows. First of all, three buffers are prepared in correspondence with R, G, and B values. A pixel counter cp is then reset. Color image data at the same position as that of the pixel value of a bit plane image is read out from the multi-level frame memory 206. If the pixel value p(x, y) of the bit plane image to be processed is "1", the R, G, and B values of the readout color image data are respectively added to the R, G, and B values stored in the buffers, and the resultant data are stored in the buffers again. In addition, the contents of the pixel counter cp are incremented by one. When processing for all the pixels in the area is completed, the contents of each buffer are divided by the value of the pixel counter cp to obtain the average R, G, and B values. These values are regarded as the extracted colors. This processing is performed for each representative luminance. When color extraction for all the representative luminances is completed, the quantization decision processing for the area is terminated. Thereafter, the flow advances to step S311.

In step S311, OCR is performed with respect to the area whose attribute is a "character" for each representative luminance. Thereafter, the flow advances to step S306. If the bi__mul__flag is "0" (YES in step S308), the flow advances to step S312. Each character string obtained by OCR in step S311 is stored in a predetermined area of the storage unit 204, together with the color of each character string, the corresponding character code, the coordinates, and the area size, in accordance with the format of a structured document constituted by structured data.

In step S312, JPEG encoding is performed for the area whose attribute is a "character", and the encoded data and its coordinates and area size are stored in a predetermined area of the storage unit 204 in accordance with the format of a structured document constituting structured data. When JPEG encoding for the area is completed, the flow advances to step S306.

The flow returns to the flow chart of FIG. 18.

In step S304, the CPU checks whether the attribute of the area corresponding to the value of the loop counter k after the image separation processing is a "graphic pattern". If the attribute of the area is a "graphic pattern" (YES in step S304), the processing in steps S313 to S318 (to be described later) is performed. If the attribute of the area is not a "graphic pattern" (NO in step S304), the flow advances to step S305.

The processing to be executed when the attribute of an area is "graphic pattern" will be described below with reference to the flow chart of FIG. 20.

Figure 20:
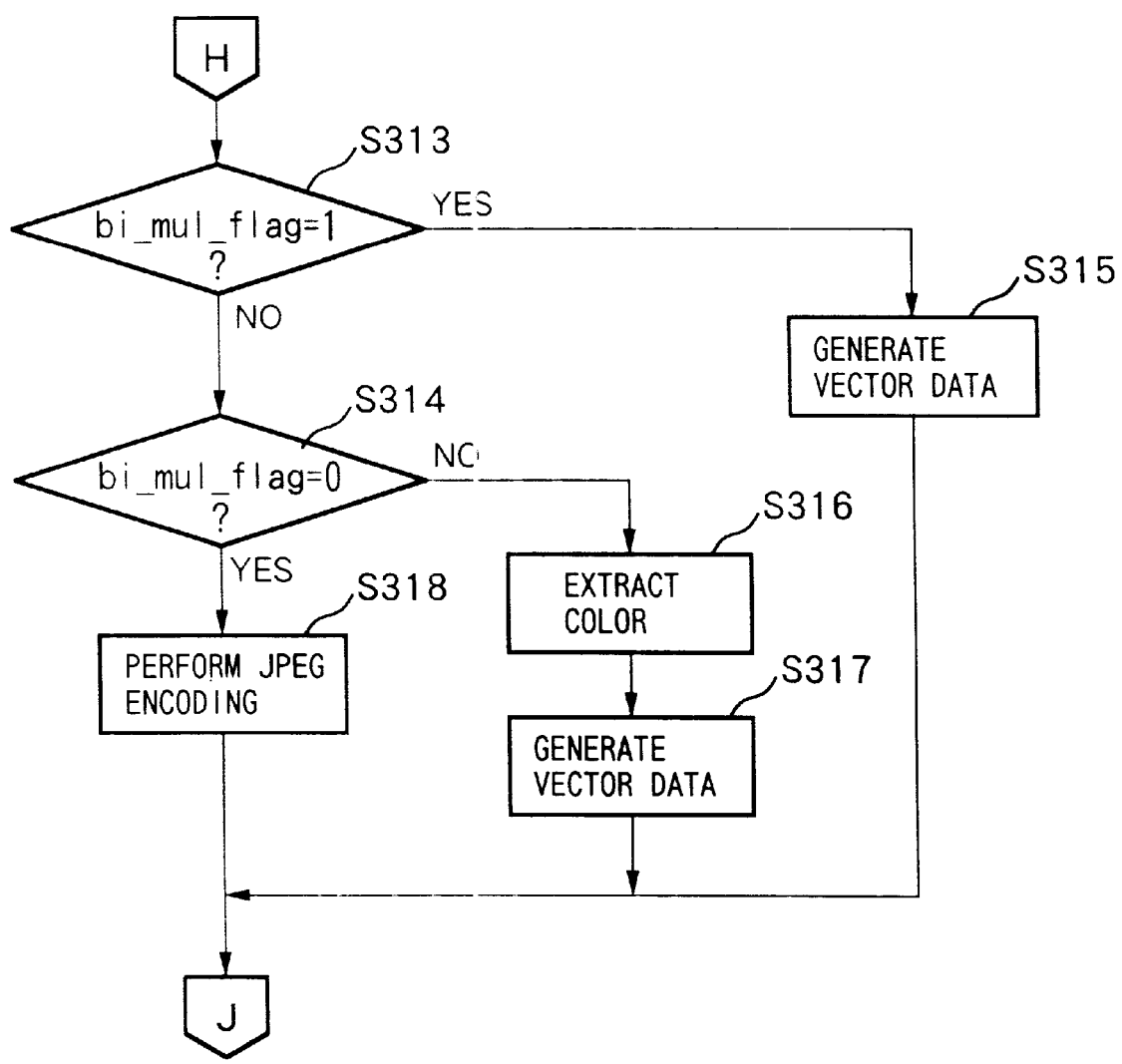
FIG. 20 is a flow chart showing the flow of the processing to be executed in the third embodiment when the attribute of the area is a "graphic pattern"

FIG. 20 is a flow chart showing the flow of the processing executed in the third embodiment when the attribute of an area is a "graphic pattern".

In step S313, the CPU checks whether the bi__mul__flag of the area whose attribute is a "graphic pattern" is "1". If the bi__mul__flag of the area is "1" (YES in step S313), the flow advances to step S315 to perform vector generation by outline extraction with respect to the area whose attribute is a "graphic pattern". Thereafter, the flow advances to step S306. If the bi__mul__flag is not "1" (NO in step S313), the flow advances to step S314.

If the bi__mul__flag is "1", it is determined that the area is constituted by a monochrome "graphic pattern". If the bi__mul__flag is "0", it is determined that the area is constituted by a continuous-tone image as a "graphic pattern". If the bi__mul__flag is neither "1" nor "0", it is determined that the area is constituted by a "graphic pattern" with a plurality of colors. The vector data obtained by vector generation is stored in a predetermined area of the storage unit 204, together with the coordinates and the area size, in accordance with the format of a structured document constituted by structured data.

In step S314, the CPU checks whether the bi__mul__flag of the area whose attribute is a "graphic pattern" is "0". If the bi__mul__flag is not "0" (NO in step S314), the flow advances to step S316. In step S316, a bit plane image for each representative luminance is generated from the number of quantization levels for the area and each representative luminance, which are obtained in step S236. In step S317, vector generation for each representative luminance is performed by outline extraction with respect to the area whose attribute is a "graphic pattern". Thereafter, the flow advances to step S306. If the bi__mul__flag is "0" (YES in step S314), the flow advances to step S318. Note that the vector data obtained by vector generation in step S317 is stored in a predetermined area of the storage unit 204, together with the coordinates of each color and the area size, in accordance with the format of a structured document constituted by structured data.

In step S318, JPEG encoding is performed with respect to the area whose attribute is a "graphic pattern", and the encoded data and its coordinates and area size are written in a predetermined area of the storage unit 204 in accordance with the format of a structured document constituting structured data. When JPEG encoding is completed, the flow advances to step S306.

The flow returns to the flow chart of FIG. 18.

In step S305, the CPU checks whether the attribute of the area corresponding to the value of the loop counter k after image area separation processing is a "photograph". If the attribute of the area is a "photograph" (YES in step S305), the processing in steps S319 to S234 (to be described later) is performed. If the attribute of the area is not a "photograph" (NO in step S305), the flow advances to step S306.

The processing to be executed when the attribute of an area is a "photograph" will be described below with reference to the flow chart of FIG. 21.

Figure 21:
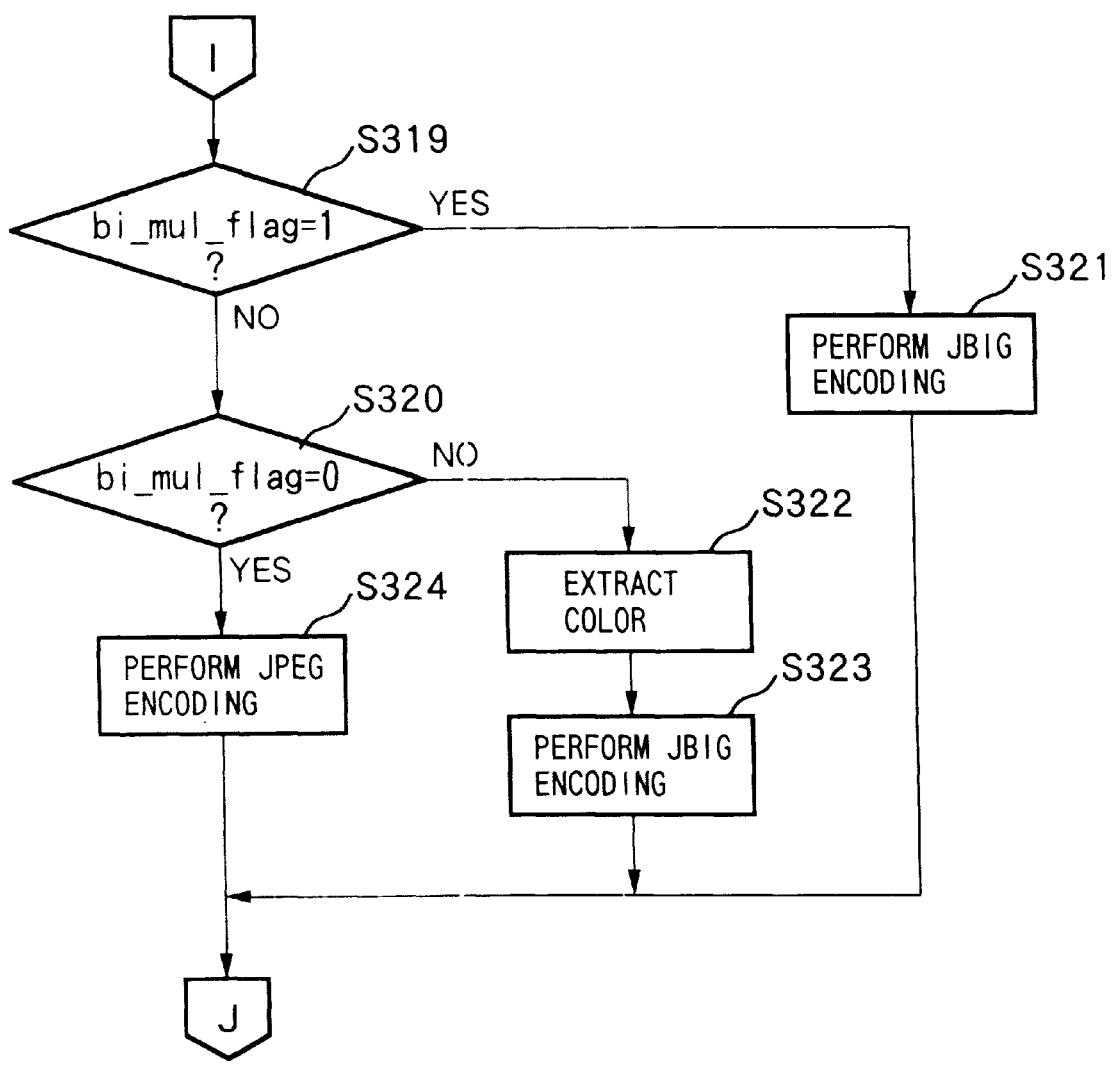
FIG. 21 is a flow chart showing the flow of the processing to be executed in the third embodiment when the attribute of the area is a "photograph"

FIG. 21 is a flow chart showing the flow of the processing to be executed in the third embodiment when the attribute of the area is a "photograph".

In step S319, the CPU checks whether the bi_mul_flag of the area whose attribute is a "photograph" is "1". If the bi_mul_flag of the area is "1" (YES in step S319), the flow advances to step S320 to perform JBIG encoding with respect to the area whose attribute is a "photograph". Thereafter, the flow advances to step S306. If the bi_mul_flag of the area is not "1" (NO in step S319), the flow advances to step S320.

If the bi_mul_flag of the area is "1", it is determined that the area is constituted by a monochrome "photograph". If the bi_mul_flag of the area is "0", it is determined that the area is constituted by a continuous-tone image as a "photograph". If the bi_mul_flag is neither "1" nor "0", it is determined that the area is constituted by a "photograph" with a plurality of colors. Note that the encoded data obtained by JBIG encoding is stored in a predetermined area of the storage unit 204, together with the coordinates and the area size, in accordance with the format of a structured document constituted by structured data.

In step S320, the CPU checks whether the bi_mul_flag of the area whose attribute is a "photograph" is "0". If the bi_mul_flag of the area is not "0" (NO in step S320), the flow advances to step S321. In step S321, a bit plane image for each color is generated from the colors constituting the area and the quantization frequency value hist_q[i] of each color, which are obtained in step S236. In step S323, JBIG encoding is performed with respect to the area whose attribute is a "photograph" for each color. Thereafter, the flow advances to step S306. If the bi_mul_flag of the area is "0" (YES in step S320), the flow advances to step S324. Note that the encoded data obtained by JBIG encoding in FIG. 323 is stored in a predetermined area of the storage unit 204, together with the coordinates of each color and the area size, in accordance with the format of a structured document constituted by structured data.

In step S324, JPEG encoding is performed for the area whose attribute is a "photograph", and the color of the encoded data, the obtained vector data, and its coordinates and area size are stored in a predetermined area of the storage unit 204 in accordance with the format of a structure document constituted by structured data. After JPEG encoding for the area is completed, the flow advances to step S306.

The flow returns to the flow chart of FIG. 18 again.

In step S306, the contents of the loop counter k are incremented by one. When the processing of generating structured data for all the areas is completed, i.e., the contents of the loop counter k coincide with the value of the counter area_count, all the processing operations are terminated.

With the processing described with reference to the flow charts of FIGS. 18 to 21, structured data for each area included in binary image data is generated on the basis of the attribute of each area included in the binary image and the corresponding number of quantization levels.

In the third embodiment, the structured data is stored in the storage unit 204. However, this data may be transmitted to the communication line 209 through the communication I/F 208.

As described above, according to the third embodiment, the background representative density bg_value, the density width upper limit bt1, and the density width lower limit bt0 are extracted on the basis of a histogram of the pixel values of image data, and all the pixel values within the range of the density width upper limit bt1 to the density width lower limit bt0 are output as the background representative densities bg_value, thereby outputting a constant, proper background density.

In addition, the histogram of the pixel values is quantized. The noise threshold noise_th is calculated on the basis of the quantized histogram. By using the calculated noise threshold noise_th, noise can be properly removed from each output frequency output as a background density.

Proper area determination can be performed with respect to a color image at high speed with a relatively small circuit size. By eliminating the influences of noise in image data, graphic pattern/photograph determination can be accurately performed. Even if there is no difference in luminance between a background and a character, the character can be reliably detected. Optimal image area separation processing can be performed by generating a program for performing processing in consideration of noise unique to a scanner.

A proper number of quantization levels with which quantization required for reproduction of an image of each area is performed can be decided. Since a character or graphic pattern of a specified color can be properly determined as well as a monochrome graphic pattern or a multi-level image, the precision in generating structured data can be improved.

Note that the arrangement of each of the image processing apparatuses of the first to third embodiments is not limited to the one realized by hardware, and may be partly or fully realized by software, e.g., programs.

The processing described above in the present invention is executed by using data in the CIE1976 L*a*b* space, which is a uniform color space, as color multi-level image data. However, the present invention is not limited to this. For example, data in the RGB colorimetric system, the YCbCr colorimetric system, or the YIQ colorimetric system may be used. In addition, the number of input bits and formation of a histogram using the input bits are not limited to those described above. For example, a frequency distribution of data obtained by quantization may be formed.

The methods of performing image area separation processing and quantization are not limited to those described above, and other methods may be used. According to the above description, each area has a rectangular shape. However, the present invention is not limited to this, and each area may have an arbitrary shape defined by a contour line or the like.

In the above arrangement, the frame memory is used. However, the present invention is not limited to this, and a line buffer or the like may be used.

According to the above description, JPEG encoding is performed as multi-level encoding. However, the present invention is not limited to this, and other methods, e.g., DPCM encoding and vector quantization encoding, may be used. As binary encoding, JBIG encoding is used. However, the present invention is not limited to this, and any other binary encoding such as MMR encoding or LZW encoding may be used. Furthermore, although vector data is used to express a shape, other encoding methods of expressing a shape, e.g., chain encoding, may be used.

Note that the present invention may be applied to either a system constituted by a plurality of devices (e.g., a host computer, an interface device, and a reader, a printer), or an apparatus consisting of a single device (e.g., a copying machine or a facsimile apparatus).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiment may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer and receives the program code read out from the storage medium.

Figure 22:
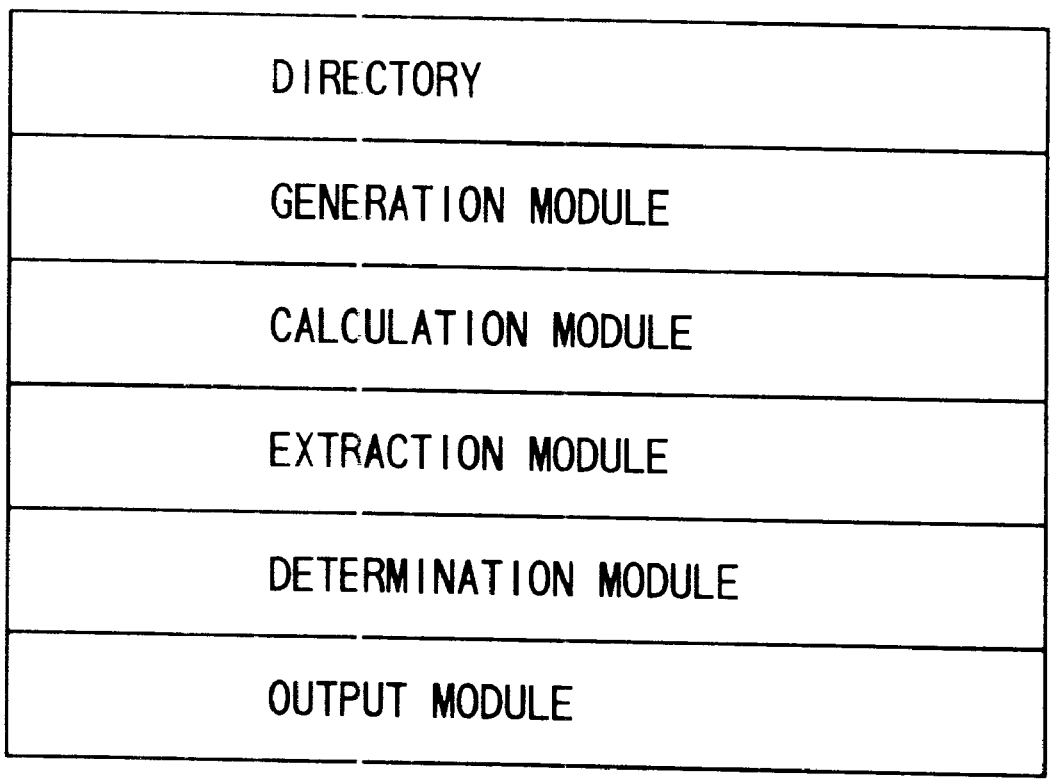
FIG. 22 is a view showing the memory map structure of a storage medium in which programs corresponding to the flows of the processing executed in the present invention are stored.

When the present invention is applied to the storage medium, the storage medium stores program codes corresponding to the above-mentioned flow charts. As will be briefly described below, the respective modules shown in an example of the memory map in FIG. 22 are stored in the storage medium.

More specifically, the program codes of at least a "formation module", "calculation module", "extraction module", "determination module", and "output module" need only be stored in the storage medium.

Note that the "formation module" forms the distribution of the output frequencies of the densities of image data. The "calculation module" calculates a threshold on the basis of the formed distribution. The "extraction module" extracts the density exhibiting the maximum output frequency value in the formed distribution. The "determination module" determines a density area exhibiting output frequency values equal to or larger than the threshold and including the density exhibiting the maximum output frequency value. The "output module" uniformly outputs the densities of image data having densities in the density area as densities exhibiting the maximum output frequency values.

As described above, according to each embodiment of the present invention, there can be provided an image processing apparatus and method which can properly remove noise in the background of image data of an original image read by a scanner or the like, and improve the quality of an output image based on the image data.

In addition, there can be provided an image processing apparatus and method which improve the precision of image area separation processing of separating image data into areas in units of attributes by properly removing noise in the background of the image data.

Furthermore, there can be provided an image processing apparatus and method which properly remove noise in the background of image data, determines a proper background density on the basis of the image data from which the noise is removed, and output the determined density as a background density, thereby improving the image data encoding efficiency.

<Fourth Embodiment>

Figure 23:
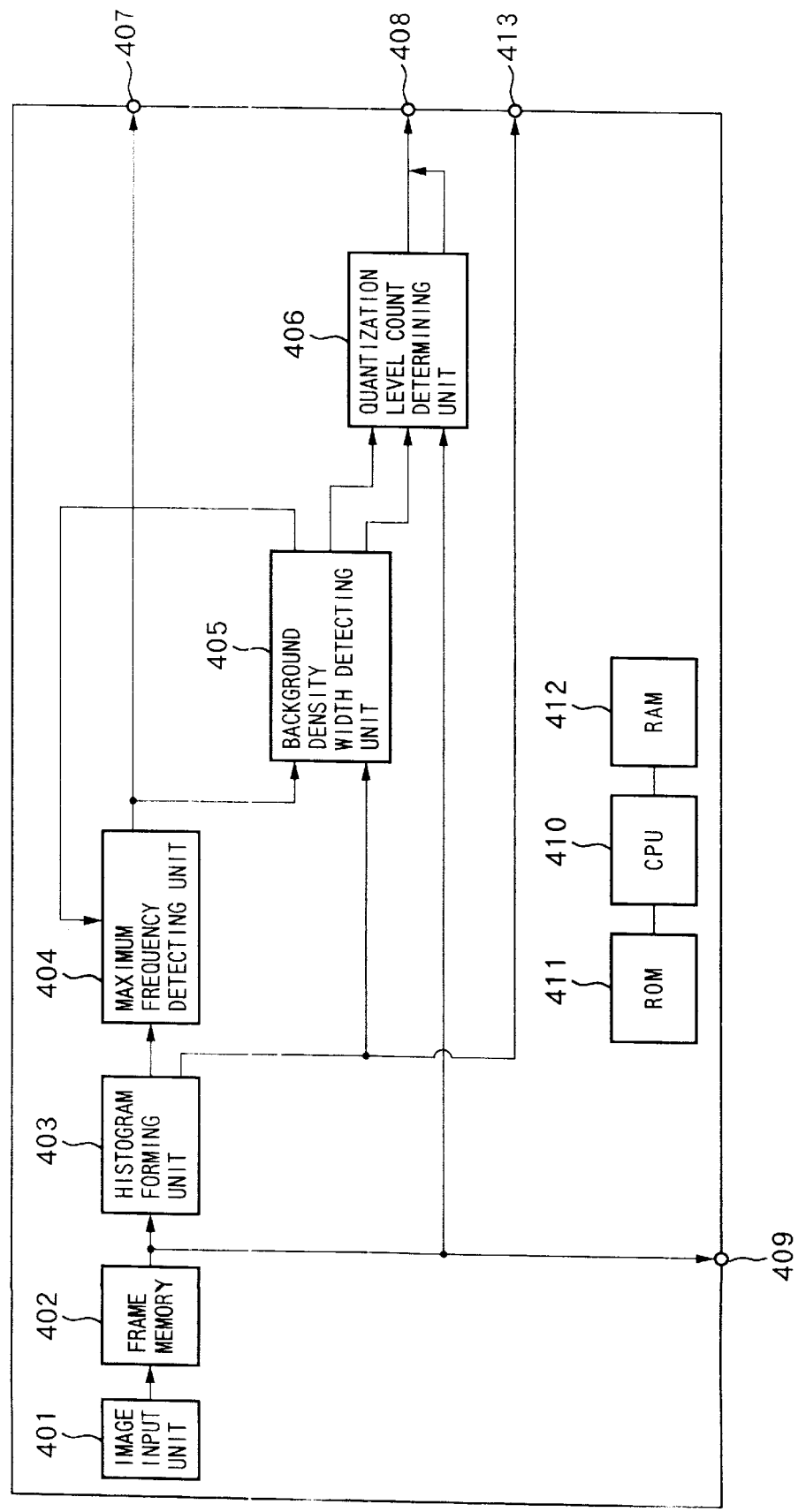
FIG. 23 is a block diagram showing the arrangement of an image processing apparatus according to the fourth embodiment of the present invention.

FIG. 23 is a block diagram showing the arrangement of an image processing apparatus according to the fourth embodiment.

Referring to FIG. 23, reference numeral 401 denotes an image input unit for inputting an original image. The image input unit 1 is constituted by an image scanner and the like. The following description is based on the assumption that a monochrome multi-level image (8 bits/pixel) is input as an original image. Reference numeral 402 denotes a frame memory for storing image data of an original image which is obtained by the image input unit 401.

Reference numeral 403 denotes a histogram forming unit for forming a histogram of the pixel values of the loaded image data (multi-level image data of 8 bits/pixel).

The histogram forming unit 403 is constituted by 256 counters. The respective counters correspond to the pixel values of the loaded image data (multi-level image data of 8 bits/pixel). Every time multi-level image data is input, the counters corresponding to the pixel values of the data are incremented by one.

Reference numeral 404 denotes a maximum frequency detecting unit for outputting the maximum occurrence frequency value in a histogram and the pixel value having this maximum value.

Reference numeral 405 denotes a background density width detecting unit for obtaining the width of the densities of pixels constituting the background on the basis of a predetermined threshold Th1 for removing noise from the frequency values in the histogram formed by the histogram forming unit 403 and the maximum value detected by the maximum frequency detecting unit 404; and 406, a quantization level count determining unit 406 for determining the number of quantization levels, required to properly quantize the image data in the frame memory 402, and a foreground color representative density on the basis of the width of the densities of the pixels constituting the background, which is output from the background density width detecting unit 405.

Reference numeral 407 denotes a terminal from which the background density (maximum value) detected by the maximum frequency detecting unit 404 is output to an external apparatus; 408, a terminal from which the number of quantization levels required to express the original image, and the foreground color representative density (to be described later) are output to the external apparatus; 409, a terminal from which the contents of the frame memory 402 are output to the external apparatus; and 413, a terminal from which the contents of the histogram forming unit 403 are output to the external apparatus.

Reference numeral 410 denotes a CPU for controlling each constituent element of the apparatus; 411, a ROM which stores programs required to control the apparatus; and 412, a RAM which ensures a memory area required to operate a program.

The processing executed by the image processing apparatus will be described next with reference to FIG. 23.

Prior to the execution of the processing, the CPU 410 clears the contents of the frame memory 402 and the counters of the histogram forming unit 403 to 0.

Subsequently, the CPU 410 loads original image data which is monochrome multi-level image (8 bits/pixel) from the image input unit 401 and stores the image data in the frame memory 402 in accordance with an instruction from the user. After image data corresponding to the original image is stored in the frame memory 402, the CPU 410 reads out the image data from the frame memory 402 and outputs it to the histogram forming unit 403. The 256 counters of the histogram forming unit 403 correspond to the respective pixel values of the input image data. Every time 1-pixel image data is input, the contents of the counter corresponding to the pixel value are incremented by one.

After a histogram is formed from all the pixels of the input image data, the CPU 410 operates the maximum frequency detecting unit 404 to detect the pixel value having the maximum occurrence frequency value in the histogram (the pixel value corresponding to the maximum counter value). The CPU 410 then outputs a detected maximum occurrence frequency value m and the corresponding pixel value. This pixel value represents a background density, which will be referred to as a background representative density b. The background representative density b is output from the terminal 407.

Figure 24:
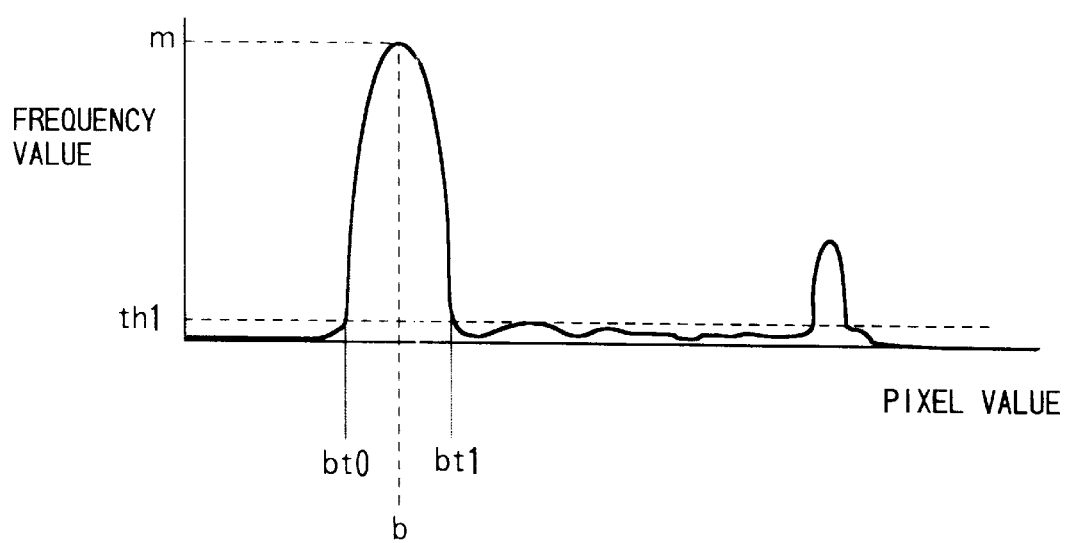
FIG. 24 is a graph for explaining how a background density width is extracted in the fourth embodiment.

The background density width detecting unit 405 calculates the width of the densities of pixels constituting the background from the background representative density b input from the maximum frequency detecting unit 404, the predetermined threshold Th1, and the histogram formed by the histogram forming unit 403. This width is obtained by detecting the pixel values which are nearest to the background representative density b and exhibit an occurrence frequency value equal to the predetermined threshold Th1. The process of detecting these pixel values will be described with reference to FIG. 24. FIG. 24 shows the relationship between the pixel values of image data of a given original image and the occurrence frequency values. The abscissa represents the pixel values; and the ordinate, the occurrence frequency values.

First of all, the occurrence frequency values are checked from the background representative density b to the smaller pixel values to obtain a value bt0 when the occurrence frequency coincides with the predetermined threshold 1. This value is the lower limit of the density width and hence will be referred to as the density width lower limit. Similarly, the occurrence frequency values are checked from the background representative density b to the larger pixel values to obtain a value bt1 when the occurrence frequency value coincides with the threshold 1. This value is the upper limit of the density width and hence will be referred to as the density width upper limit.

The detailed arrangement of the background density width detecting unit 405 will be described below with reference to FIG. 25.

Figure 25:
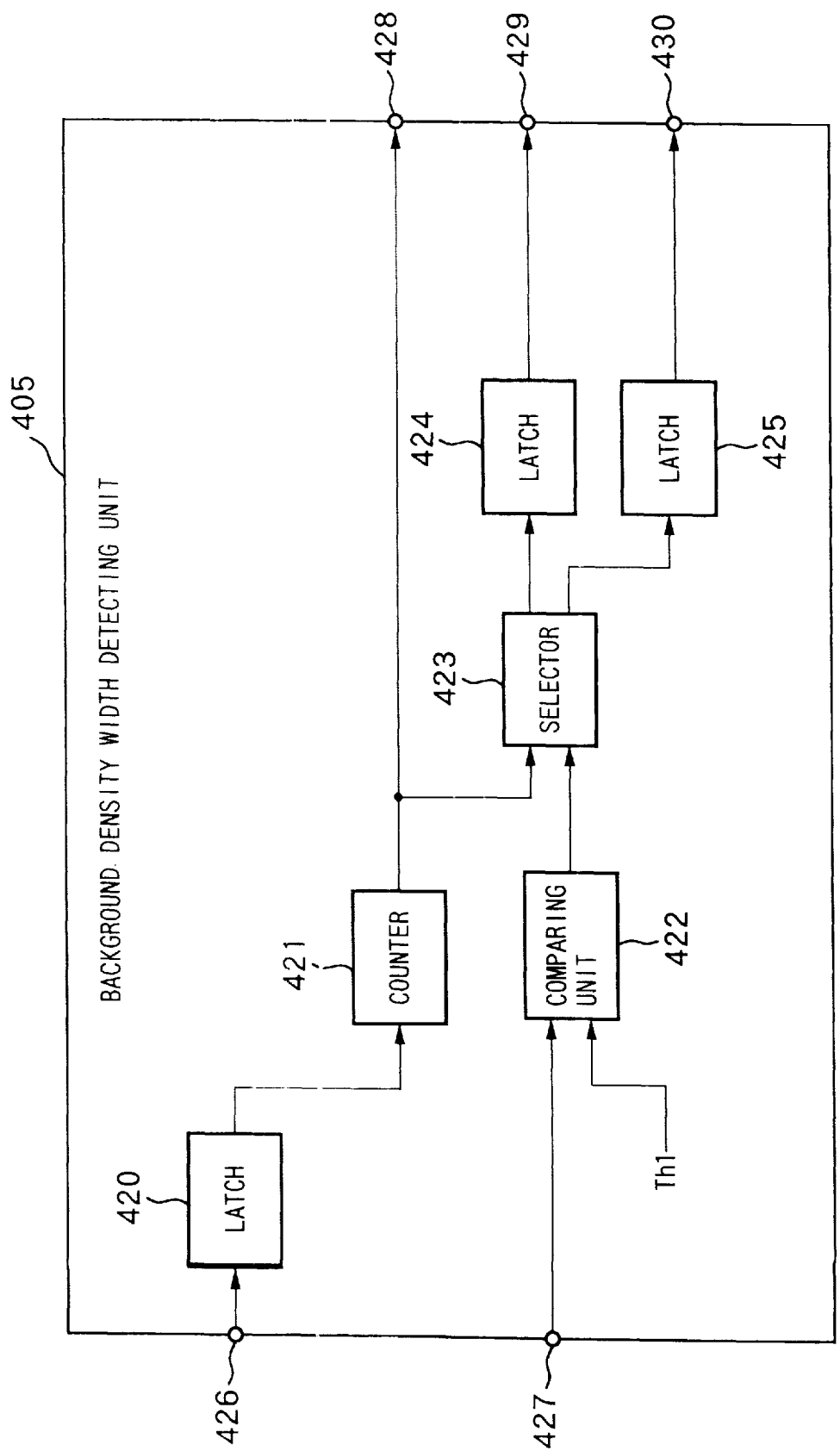
FIG. 25 is a block diagram showing the detailed arrangement of a background density width detecting unit 405 in the fourth embodiment.

FIG. 25 is a block diagram showing the detailed arrangement of the background density width detecting unit 405 in the fourth embodiment.

Referring to FIG. 25, reference numeral 426 denotes a terminal through which the background representative density b is input from the maximum frequency detecting unit 404; 420, a latch for holding the background representative density b; 421, a counter whose contents are incremented/decremented in accordance with a mode selected, in accordance with an instruction from the CPU 410, from a count-up mode of counting up the contents of the counter 421 and a count-down mode of counting down the contents of the counter 421; and 428, a terminal from which the contents of the counter 421 are output to the histogram forming unit 403 to read out the occurrence frequency value corresponding to the pixel value, in the histogram formed by the histogram forming unit 403, which corresponds to the output value.

Reference numeral 427 denotes a terminal through which the occurrence frequency value corresponding to the pixel value, in the histogram formed by the histogram forming unit 403, which corresponds to the value output from the counter 421 is loaded; and 422, a comparing unit for comparing the occurrence frequency value loaded through the terminal 427 with the predetermined threshold Th1. If the loaded occurrence frequency value is larger than the predetermined threshold Th1, "0" is output. Otherwise, "1" is output. Reference numeral 423 denotes a selector for holding the contents of the counter 421 in a latch 424 or 425 in accordance with the mode that the CPU 410 designates with respect to the counter 421. The latches 424 and 425 hold outputs from the selector 423. Reference numerals 429 and 430 denote terminals from which the outputs from the latches 424 and 425 are output to an external apparatus.

Note that the predetermined threshold Th1 is used to remove frequency noise from a histogram.

The processing executed by the background density width detecting unit 405 will be described next with reference to FIG. 25.

The CPU 410 loads the background representative density b through the terminal 426 and holds it in the latch 420. The CPU 410 then resets the comparing unit 422 to 0, and sets, in the counter 421, a value corresponding to the pixel value obtained by subtracting "1" from the background representative density b in the latch 420. The CPU 410 sets the count-down mode.

When the count-down mode is set, the contents of the counter 421 are input to the histogram forming unit 403 through the terminal 428. The occurrence frequency value of the pixel value, in the histogram, which corresponds to the input value is read out from the histogram forming unit 403. The readout occurrence frequency value is input to the comparing unit 422 through the terminal 427. The comparing unit 422 compares the input occurrence frequency value with the threshold Th1. If the occurrence frequency value is larger than the threshold Th1, "0" is output. Otherwise, "1" is output.

Every time "0" is output from the comparing unit 422, the contents of the counter 421 are decremented by one, and the output frequency value of the pixel value, in the histogram, which corresponds to the decremented value is read out from the histogram forming unit 403. Every time an occurrence frequency value is read out, the comparing unit 422 compares the readout occurrence frequency value with the threshold Th1.

When "1" is output from the comparing unit 422, the selector 423 stores the contents of the counter 421 in the latch 425, and at the same time, the count-down operation of the counter 421 in the count-down mode is terminated.

When the count-down operation of the counter 421 is terminated, the CPU 410 resets the comparing unit 422 to 0, and sets, in the counter 421, a value corresponding to the pixel value obtained by adding "1" to the background representative density b in the latch 420. The CPU 410 sets the count-up mode.

When the count-up mode is set, the contents of the counter 421 are input to the histogram forming unit 403 through the terminal 428. The occurrence frequency value of the pixel value, in the histogram, which corresponds to the input value is read out from the histogram forming unit 403. The readout occurrence frequency value is input to the comparing unit 422 through the terminal 427. The comparing unit 422 compares the input occurrence frequency value with the threshold Th1. If the occurrence frequency value is larger than the threshold Th1, "0" is output. Otherwise, "1" is output.

Every time "0" is output from the comparing unit 422, the contents of the counter 421 are incremented by one, and the output frequency value of the pixel value, in the histogram, which corresponds to the incremented value is read out from the histogram forming unit 403. Every time an occurrence frequency value is read out, the comparing unit 422 compares the readout occurrence frequency value with the threshold Th1.

When "1" is output from the comparing unit 422, the selector 423 stores the contents of the counter 421 in the latch 424, and at the same time, the count-up operation of the counter 421 in the count-up mode is terminated.

The values held in the latches 424 and 425 in the above manner are respectively used as the density width upper limit bt1 and the density width lower limit bt0. The density width upper limit bt1 and the density width lower limit bt0 are output to the quantization level count determining unit 406 through the terminals 429 and 430, respectively.

The operation of the apparatus shown in FIG. 23 will be described again.

When the density width upper limit bt1 and the density width lower limit bt0 are detected by the background density width detecting unit 405, the quantization level count determining unit 406 receives the density width lower limit bt0 and the density width upper limit bt1, detected by the background density width detecting unit 405, and the pixel values of the image data stored in the frame memory 402, and determines the number of quantization levels for proper quantization of the image data and a foreground color representative density.

The detailed arrangement of the quantization level count determining unit 406 will be described below with reference to FIG. 26.

Figure 26:
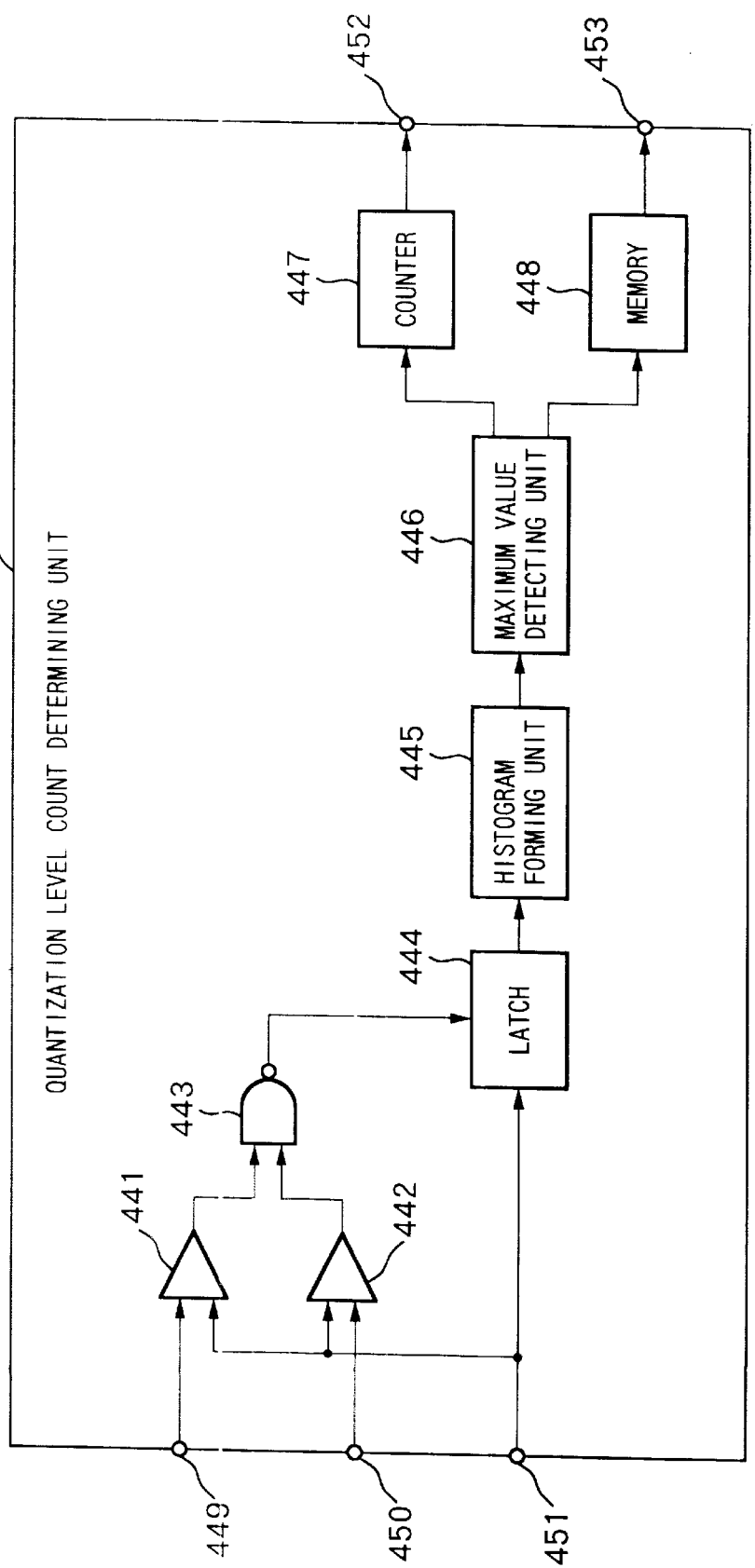
FIG. 26 is a block diagram showing the detailed arrangement of a quantization level count determining unit 406 in the fourth embodiment.

FIG. 26 is a block diagram showing the detailed arrangement of the quantization level count determining unit 406 in the fourth embodiment.

Reference numeral 441 denotes a comparing unit for comparing the density width upper limit bt1 input through a terminal 449 with the pixel value input through a terminal 451. If the pixel value is larger than the density width upper limit bt1, "0" is output. Otherwise, "1" is output. Reference numeral 442 denotes a comparing unit for comparing the density width lower limit bt0 input through a terminal 450 with the pixel value input through the terminal 451. If the pixel value is larger than the density width lower limit bt0, "1" is output. Otherwise, "0" is output. Reference numeral 443 denotes a NAND circuit for calculating the NAND of the values output from the comparing units 441 and 442; and 444, a latch for latching the pixel value input through the terminal 451. Only when the NAND circuit 443 outputs "1", the latch 444 outputs the latched pixel value.

Reference numeral 445 denotes a histogram forming unit which is constituted by 256 counters and designed to form a histogram of the occurrence frequency values of the pixel values output from the latch 444; 446, a maximum value detecting unit for detecting the maximum occurrence frequency values and the pixel values exhibiting the maximum values from the histogram formed by the histogram forming unit 445; 447, a counter for counting the maximum values detected by the maximum value detecting unit 446; 448, a memory for storing the pixel values exhibiting the maximum values; 449, a terminal through which the density width upper limit bt1 is loaded through the terminal 429 in FIG. 25; 450, a terminal through which the density width lower limit bt0 is loaded through the terminal 430 in FIG. 25; 451, a terminal through which the pixel values of the image data stored in the frame memory 402 are loaded; 452, a terminal from which the contents of the counter 447 are output; and 453, a terminal from which the contents of the memory 448 are output.

The processing executed by the quantization level count determining unit 406 will be described next with reference to FIG. 26.

The CPU 410 loads the density width upper limit bt1 and the density width lower limit bt0 through the terminals 449 and 450, respectively. The CPU 410 then loads the pixel values of the image data from the frame memory 402 in the storing order, and outputs the pixel values to the comparing units 441 and 442 and the latch 444.

The comparing unit 441 compares each input pixel value with the density width upper limit bt1. The comparing unit 442 compares each input pixel value with the density width lower limit bt0. The comparing units 441 and 442 outputs the comparison results to the NAND circuit 443. The NAND circuit 443 calculates the NAND of the input values. According to the above description, if the input pixel value falls within the range of the density width upper limit bt1 to the density width lower limit bt0, the NAND circuit 443 outputs "0". Otherwise, the NAND circuit 443 outputs "1". If the output from the NAND circuit 443 is "1", the latch 444 outputs the input pixel value to the histogram forming unit 445. If the output is "0", the latch 444 does not output the pixel value.

When the output from the latch 444 is input to the histogram forming unit 445, since one of the 256 counters of the histogram forming unit 445 corresponds to the input pixel value, the contents of the counter corresponding to the pixel value are incremented by one.

After a histogram is formed by the histogram forming unit 445 on the basis of all the pixel values of the image data stored in the frame memory 402, the image input unit 401 starts the maximum value detecting unit 446 and resets the contents of the counter 447 to 0. Subsequently, the contents of the 256 counters of the histogram forming unit 445, which indicate the occurrence frequency values of the respective pixel values, are sequentially read out in the order of increasing pixel values to detect the pixel values exhibiting the maximum frequency values.

Figure 27:
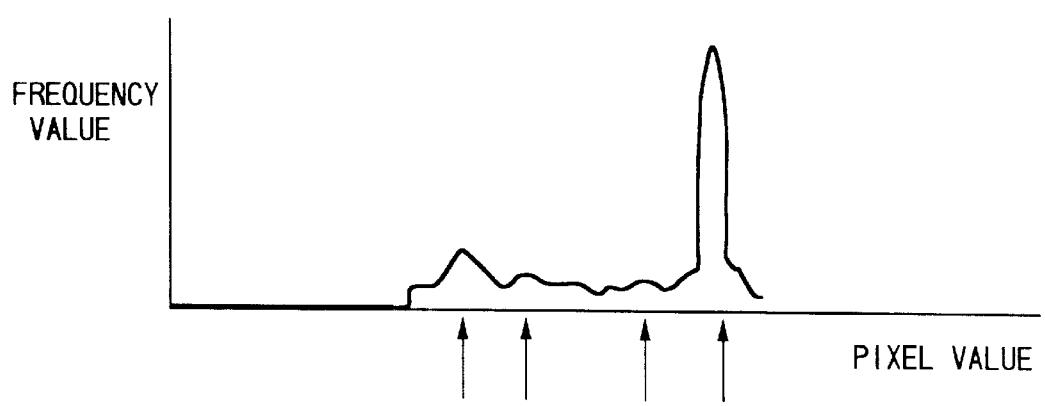
FIG. 27 is a graph for explaining how foreground color representative densities are extracted in the fourth embodiment.

Assume that the histogram formed by the histogram forming unit 445 is the one shown in FIG. 27. Referring to FIG. 27, the pixel values indicated by the arrows are the pixel values exhibiting the maximum occurrence frequency values. Every time the maximum frequency value is detected, the contents of the counter 447 are incremented by one, and each pixel value exhibiting the maximum value is sequentially stored in the memory 448. In this case, the number of maximum values is four, and hence "4" is stored in the counter 447.

The pixel values exhibiting the maximum values and stored in the memory 448 represent the representative densities of image portion other than the background of the original image. These values will be referred to as foreground color representative densities. The value obtained by adding "1" to the contents of the counter 447 indicates the number n (n is a positive integer) of quantization levels required to express an image. This value and the foreground color representative densities are output from the terminal 408 to the external apparatus through the terminals 452 and 453.

In the above manner, the background representative density b of the original image, the number n of quantization levels required for proper quantization of the image data, and the foreground color representative densities are output.

The processing executed in the fourth embodiment will be described next with reference to the flow chart of FIG. 28.

Figure 28:
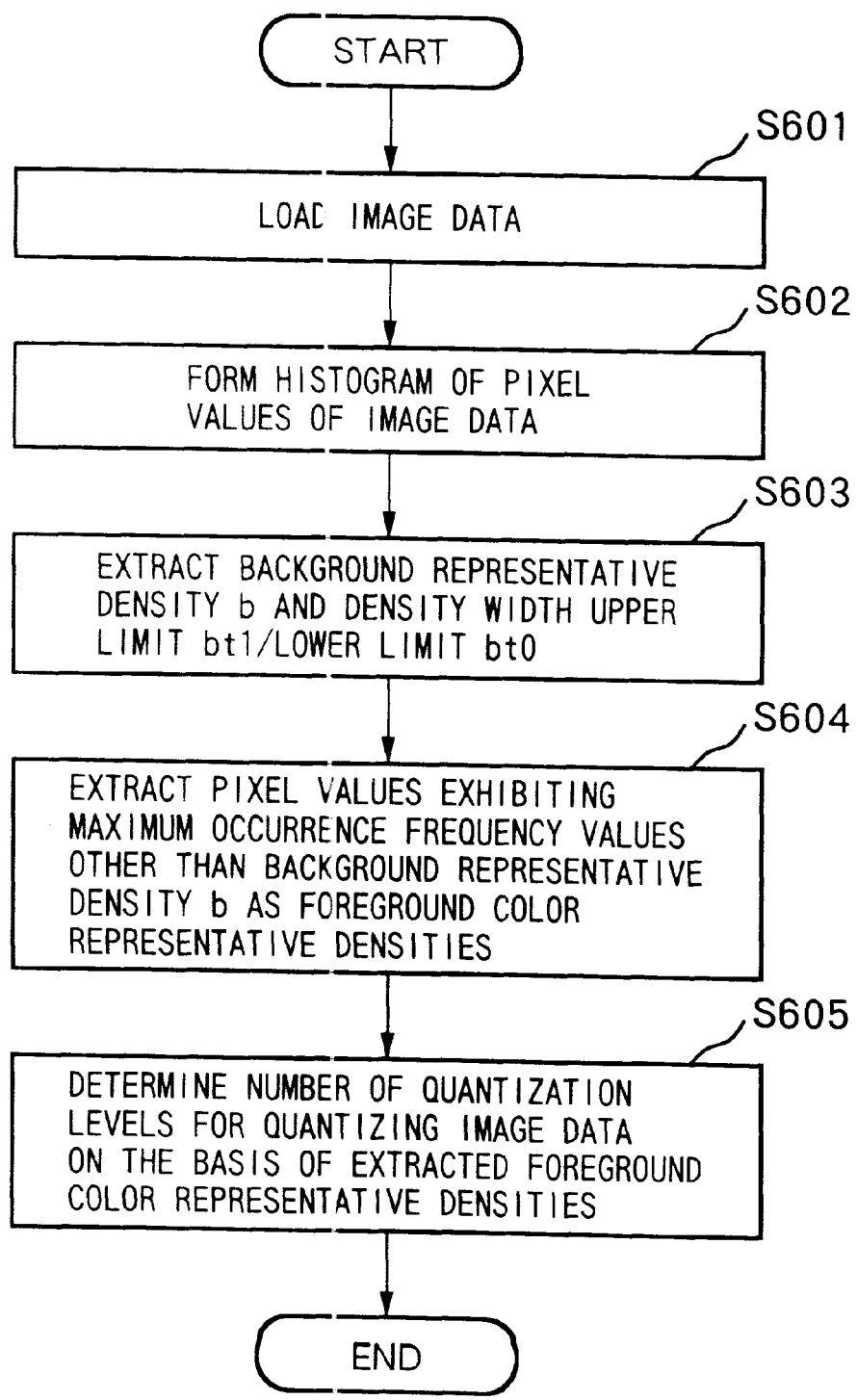
FIG. 28 is a flow chart showing the flow of the processing executed in the fourth embodiment.

FIG. 28 is a flow chart showing the flow of the processing executed in the fourth embodiment.

Prior to the execution of the processing, the CPU 410 clears the contents of the frame memory 402 and the counters of the histogram forming unit 403 to 0.

In step S601, the CPU 410 loads original image data, which is monochrome multi-level image data (8 bits/pixel), from the image input unit 401 and stores the image data in the frame memory 402. In step S602, after the image data corresponding to the original image is stored in the frame memory 402, the CPU 410 reads out the image data from the frame memory 402 and inputs it to the histogram forming unit 403, thereby forming a histogram from all the pixels of the input image data.

In step S603, the CPU 410 operates the maximum frequency detecting unit 440 to extract the pixel value exhibiting the maximum occurrence frequency value in the histogram as the background representative density b. In addition, the background density width detecting unit 405 extracts the density width lower limit bt0 and the density width upper limit bt1 as values defining the width of the densities of pixels constituting the background on the basis of the background representative density b from the maximum frequency detecting unit 404, the predetermined threshold Th1, and the histogram formed by the histogram forming unit 403.

In step S604, the quantization level count determining unit 406 extracts pixel values exhibiting the maximum occurrence frequency values, other than the background representative density, as foreground color representative densities from the histogram. In step S605, the number of quantization levels required to quantize the image data is determined on the basis of the extracted foreground color representative densities.

An application of the above image processing apparatus of the fourth embodiment will be described next. Assume that the above apparatus is applied to an image transmission apparatus like the one shown in FIG. 29. The operation and arrangement of this apparatus will be described below.

Figure 29:
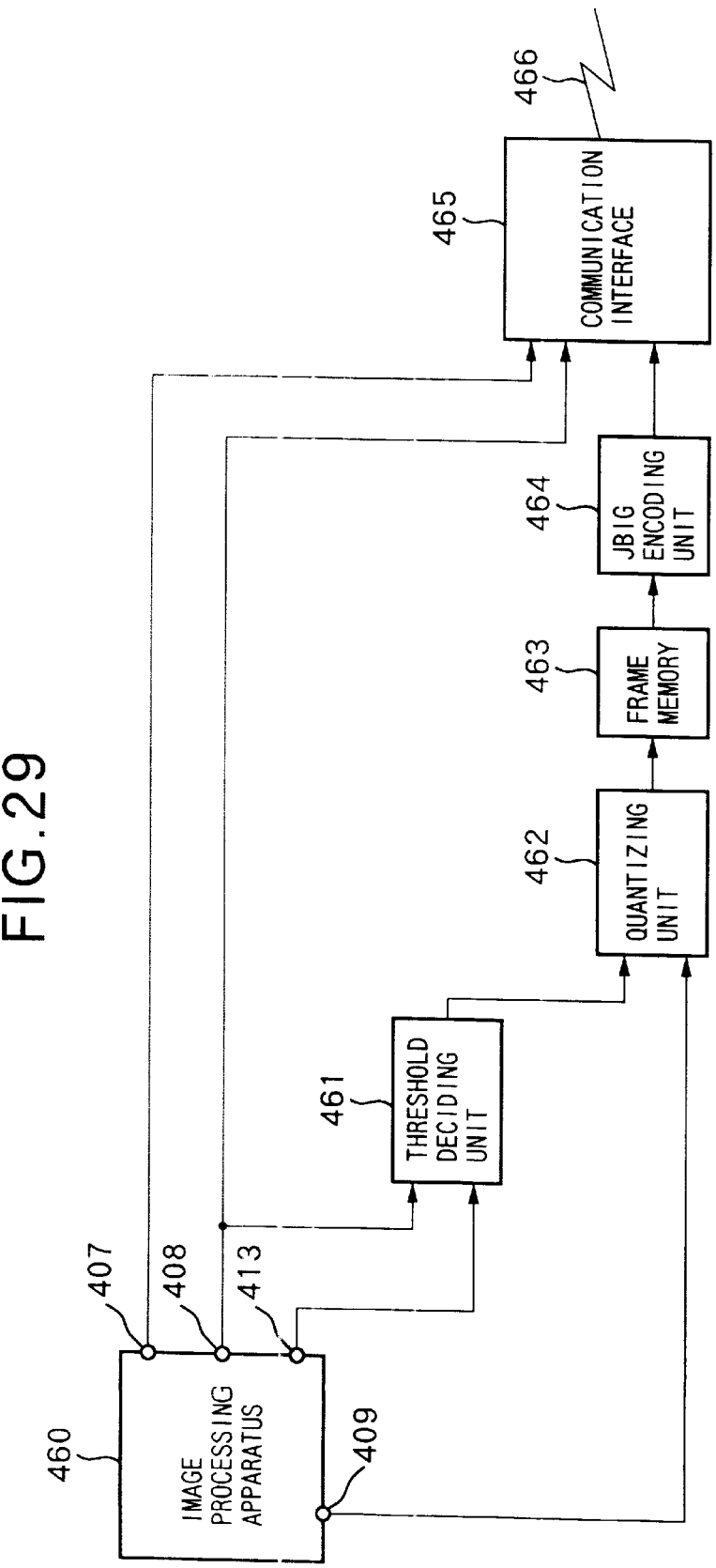
FIG. 29 is a block diagram showing the arrangement of an image transmission apparatus to which the image processing apparatus of the fourth embodiment is applied.

FIG. 29 is a block diagram showing the arrangement of the image transmission apparatus to which the image processing apparatus of the fourth embodiment is applied.

Referring to FIG. 29, reference numeral 460 denotes an image processing apparatus of the fourth embodiment in FIG. 23; 461, a threshold deciding unit for receiving the background representative density b output from the terminal 407, together with the number n of quantization levels, the foreground color representative densities, and the histogram which are output from the terminal 408, and deciding a threshold for quantization of the image data; and 462, a quantizing unit for quantizing the image data output from the terminal 409 in accordance with the threshold output from the threshold deciding unit 461.

Reference numeral 463 denotes a frame memory for storing the image data quantized by the quantizing unit 462. If, for example, the number of quantization levels is n, the frame memory 463 stores the base-n image data in n bit planes. Reference numeral 464 denotes a JBIG encoding unit for performing JBIG encoding, which is a binary encoding method, with respect to the quantized image data stored in the frame memory 463; 465, a communication interface for transmitting the JBIG encoded data generated by the JBIG encoding unit 464 in accordance with a communication protocol; and 466, a communication line constituted by a telephone line or LAN.

The processing executed by the apparatus in FIG. 29 will be briefly described next.

Figure 30:
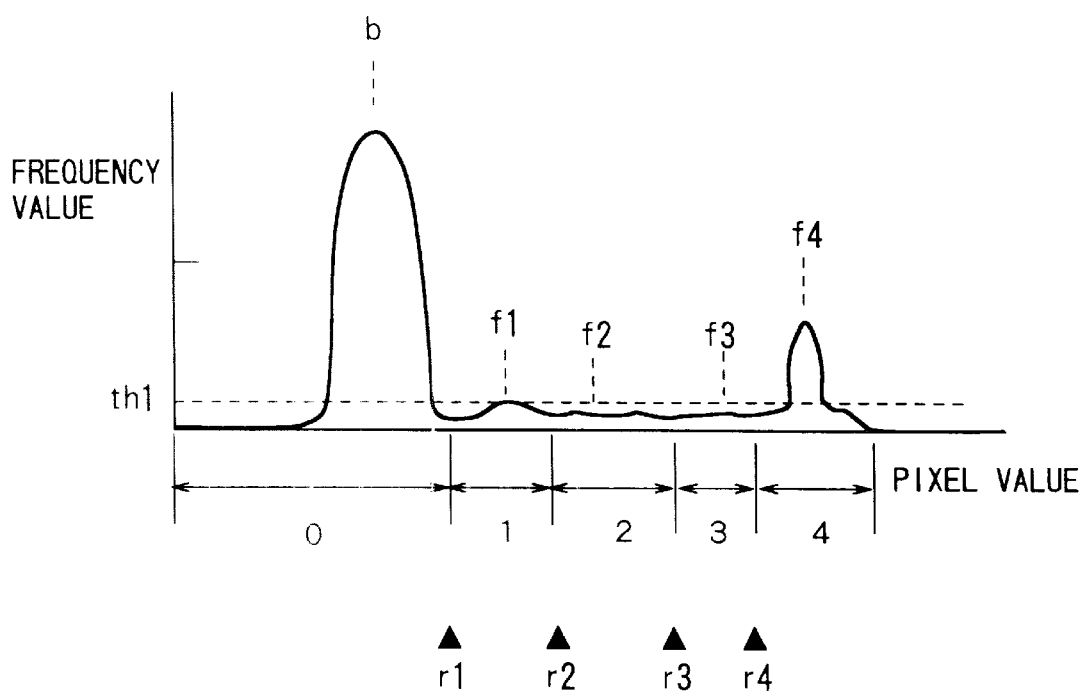
FIG. 30 is a graph for explaining how the number of quantization levels is decided in the fourth embodiment.

The threshold deciding unit 461 loads the number n of quantization levels and the respective foreground color representative densities from the counter 447 of the image processing apparatus 460 and the memory 448 through the terminal 408, and also loads the histogram through the terminal 413. The threshold deciding unit 461 then decides thresholds for quantization on the basis of the respective foreground color representative densities. The process of deciding these thresholds will be described with reference to FIG. 30. Assume that foreground color representative densities f1 to f4 in FIG. 30 are decided with respect to the histogram in FIG. 24. The pixel values corresponding to the occurrence frequencies which are located on both sides of each of the foreground color representative densities at frequency maximums and exhibit a slope of 0 are decided as thresholds. In this case, thresholds r1 to r4 are decided as thresholds for quantization.

Subsequently, the quantizing unit 462 quantizes the pixel values of the image data stored in the frame memory 402 by using the thresholds decided by the threshold deciding unit 461. If, for example, the thresholds r1 to r4 in FIG. 30 are used, image data having a pixel value smaller than the threshold r1 is quantized into "0". Image data having a pixel value equal to or larger than the threshold r1 and smaller than the threshold r2 is quantized into "1". Image data having a pixel value equal to or larger than the threshold r2 and smaller than the threshold r3 is quantized into "2". Image data having a pixel value equal to or larger than the threshold r3 and smaller than the threshold r4 is quantized into "3". Image data having a pixel value equal to or larger than the threshold r4 is quantized into "4". The quantization results obtained by the quantizing unit 462 are then stored in the frame memory 463.

When quantization of the image data stored in the frame memory 402 is completed, the number n of quantization levels output from the terminal 408 is output to the communication line 466 through the communication interface 465. Subsequently, the background representative density b and the foreground color representative densities (f1 to f4 in this case) are output to the communication line 466 through the communication interface 465 in the order of decreasing pixel values. In addition, the JBIG encoding unit 464 performs JBIG encoding with respect to the pixel values of the quantized image data stored in the frame memory 463 in units of bit planes, and outputs the resultant data to the communication line 466 through the communication interface 465. When all the image data in the frame memory 402 are encoded and transmitted, all the processing operations are terminated.

As described above, according to the fourth embodiment, the background representative density b, the density width upper limit bt1, and the density width lower limit bt0 are extracted on the basis of the histogram of the occurrence frequency values of the pixel values of the image data. All the pixel values within the range of the density width upper limit bt1 to the density width lower limit bt0 are output as the background representative densities b. With this processing, a constant, proper background density can be output.

In addition, a group of pixel values exhibiting occurrence frequency values equal to or larger than the threshold Th1, including pixel values exhibiting the maximum occurrence frequency values, other than the maximum value representing the background representative density b, in the histogram are determined as an image other than the background which is present in the original image. A group of pixels falling in a predetermined range and expressing the determined image are uniformly output as pixel values (foreground color representative densities) exhibiting the maximum occurrence frequency values within the predetermined range, thereby outputting an image with constant, proper pixel values.

Since the number of quantization levels for quantization of the original image and thresholds are determined on the basis of the group of pixels in the predetermined range, including the foreground color representative densities expressing the determined image, and the number of pixel values, the number of quantization levels required to properly quantize the original image can be decided.

Determination of the number of quantization levels can be properly formed with respect to a monochrome image at high speed with a relatively small circuit size, and a foreground such as characters can be efficiently extracted without being influenced by background noise. In addition, when this embodiment is applied to an encoding method, since a constant background density can be set by eliminating the influences of background noise, the encoding efficiency can be improved. Furthermore, since image data is output after being quantized to the minimum necessary degree, the data can be encoded with a small number of planes, realizing efficient encoding.

<Fifth Embodiment>

In the fourth embodiment, the image processing apparatus described above determines the density width of the background of a monochrome multi-level image as an original image and a proper background density, and also determines the proper number of quantization levels for quantizing the original image. In contrast to this, an image processing apparatus according to the fourth embodiment determines the density width of the background of a color multi-level image as an original image and a proper background density, and also determines the proper number of quantization levels for quantizing the original image.

Figure 31:
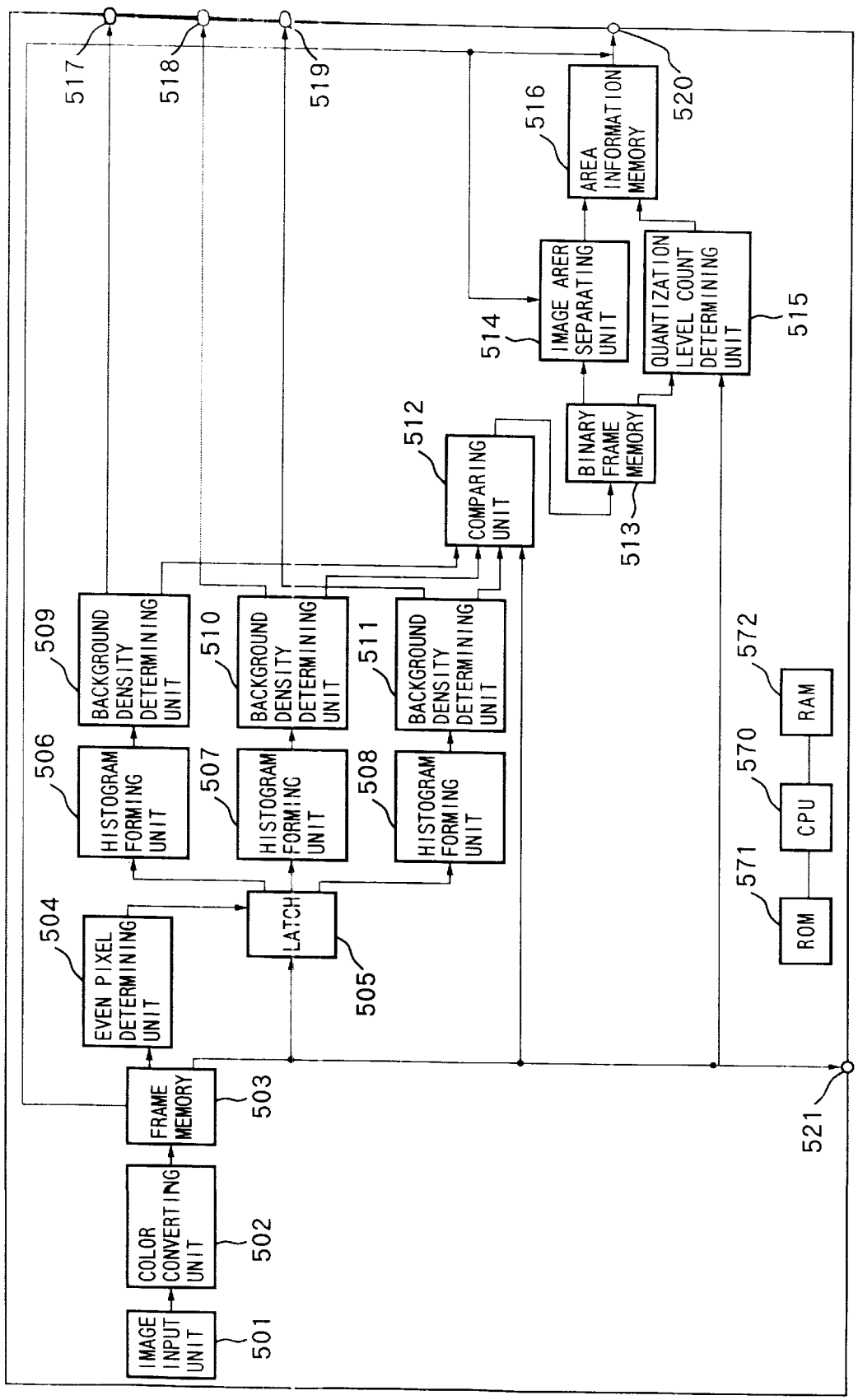
FIG. 31 is a block diagram showing the arrangement of an image processing apparatus according to the fifth embodiment of the present invention.

FIG. 31 is a block diagram showing the arrangement of the image processing apparatus of the fifth embodiment.

Referring to FIG. 31, reference numeral 501 denotes an image input unit for inputting an original image. The image input unit 501 is constituted by a color image scanner or the like. In this case, a color multi-level image is input as an original image, which will be described as image data exhibiting a precision of 8 bits per pixel for each of R, G, and B colors. Reference numeral 502 denotes a color converting unit for converting the original image into CIE1976 L*a*b* image data (each component consisting of 8 bits); and 503, a frame memory for storing the L*a*b* image data of the original image which is obtained by the color converting unit 502.

Reference numeral 504 denotes an even pixel determining unit for determining, on the basis of the L* image data representing the luminance of CIE1976 L*a*b* image data, whether the input pixels are even pixels; and 505, a latch for deciding whether to output its contents in accordance with a control signal.

Reference numerals 506 to 508 denote histogram forming units for forming histograms of the loaded pixel values of the L*, a*, and b* image data.

Each of the histogram forming units 506 to 508 is constituted by 256 counters. The respective counters correspond to the pixel values of the loaded image data. Every time 1-pixel image data is input, the counter corresponding to the pixel value is incremented by one.

The histogram forming unit 506 formes a histogram of the L* image data. The histogram forming unit 507 forms a histogram of the a* image data. The histogram forming unit 508 forms a histogram of the b* image data.

Reference numeral 509 denotes a background density width determining unit for deciding a background representative density bL, a density width lower limit btL0, and a density width upper limit btL1 of the L* image data of the pixels constituting the b* image data on the basis of the histogram of the L* image data; 510, a background density determining unit for deciding a background representative density ba, density width lower limit bta0, and density width upper limit bta1 of the a* image data of the pixels constituting the background on the basis of the histogram of the a* image data; and 511, a background density determining unit for deciding a background representative density bb, density width lower limit btb0, and density width upper limit btb1 of the b* image data of the pixels constituting the background on the basis of the histogram of the b* image data.

Note that each of the background density determining units 509 to 511 is constituted by the maximum frequency detecting unit 404 and the background density width detecting unit 405 in the fourth embodiment in FIG. 23. Since these units have been described in detail in the fourth embodiment, a detailed description thereof will be omitted.

Reference numeral 512 denotes a comparing unit for receiving the pixel values of the L*a*b* image data stored in the frame memory 503, comparing the respective pixel values with the density width lower limit btL0, the density width upper limit btL1, the density width lower limit bta0, the density width upper limit bta1, the density width lower limit btb0, and the density width upper limit btb1 corresponding to the L*, a*, and b* image data, and binarizing the L*a*b* image data on the basis of the comparison results; 513, a binary frame memory for storing the L*a*b* image data binarized by the comparing unit 512; and 514, an image area separating unit for performing image area separation processing by using the same image area separation method as in the third embodiment.

Reference numeral 515 denotes a quantization level count determining unit for determining the number of quantization levels required to quantize the image data in the frame memory 513; 516, an area information memory for storing information about the areas detected by the image area separating unit 514 and the quantization level count determining unit 515; 517 to 519, terminals from which the background representative densities bL, ba, and bb of the L*, a*, and b* image data are output to an external apparatus; 520, a terminal from which the contents of the area information memory 516 are output to the external apparatus; and 521, a terminal from which the contents of the frame memory 503 are output to the external apparatus.

Reference numeral 570 denotes a CPU for controlling the respective constituent elements of the apparatus; 571, a ROM which stores programs required to control the apparatus; 572, a RAM for ensuring a memory area required to operate a program.

The processing executed by the image processing apparatus will be described next with reference to FIG. 31.

Prior to the execution of the processing, the CPU 570 clears the contents of the frame memory 503 and the counters of the histogram forming units 506 to 508 to 0.

Subsequently, the CPU 570 loads original image data, which is RGB color multi-level image data, from the image input unit 501, causes the color converting unit 502 to convert the image data into the L*a*b* image data, and stores the data in the frame memory 503 in accordance with an instruction from the user.

After the L*a*b* image data corresponding to the original image is stored in the frame memory 503, the CPU 570 reads out the L*a*b* image data from the frame memory 503 and inputs the data to the even pixel determining unit 504 and the latch 505.

The even pixel determining unit 504 receives each input pixel and the L*a*b* image data of the pixels around the input pixel. Letting L(x, y), a(x, y), and b(x, y) be the coordinates of the L*, a*, and b* image data stored in the frame memory 503, edge amounts eL, ea, and eb of the L*a*b* image data are calculated according to equations (4) above.

These edge amounts eL, ea, and eb are compared with a threshold Th2. If all the edge amounts are equal to or smaller than the threshold Th2, "1" is output. Otherwise, "0" is output.

When "0" is output from the even pixel determining unit 504, i.e., when there is an edge in any color component, the latch 505 does not output the stored L*, a*, and b* image data, and the histogram forming units 506 to 508 perform no processing. When "1" is output from the even pixel determining unit 504, i.e., when the pixels are even pixels, the latch 505 outputs the stored L*, a*, and b* image data to the corresponding histogram forming units 506 to 508.

The histogram forming unit 506 forms a histogram of the L* image data. Similarly, the histogram forming unit 507 forms a histogram of the a* image data. The histogram forming unit 508 forms a histogram of the b* image data.

When even pixel detection and histogram processing for all the pixels in the frame memory 503 are completed, the background density determining units 509 to 511 are started.

The background density determining unit 509 determines the background representative density bL, density width lower limit btL0, and density width upper limit btL1 of the L* image data on the basis of the histogram of the L* image data. Similarly, the background density determining unit 510 determines the background representative density ba, density width lower limit bta0, and density width upper limit bta1 of the a* image data on the basis of the histogram of the a* image data. The background density determining unit 511 determines the background representative density bb, density width lower limit btb0, and density width upper limit btb1 of the b* image data on the basis of the histogram of the b* image data. The determined background representative densities bL, ba, and bb of the L*, a*, and b* image data are output to the external apparatus through the terminals 517 top 519. In addition, the determined density width lower limits btL0, bta0, and btb0 and density width upper limits btL1, bta1, and btb1 of the L*, a*, and b* image data are output to the comparing unit 512.

The comparing unit 512 compares image data pL, pa, and pb, which are the L*, a*, and b* image data stored in the frame memory 503, with the density width lower limits and density width upper limits of the L*, a*, and b* image data input from the comparing unit 512. If density width lower limit btL0<pL<density width upper limit btL1; density width lower limit bta0<pa<density width upper limit bta1; and density width lower limit btb0<pb<density width upper limit btb1, the comparing unit 512 outputs "0". Otherwise, the comparing unit 512 outputs "1". With this comparison, the L*a*b* image data is binarized. The binarized L*a*b* image data is stored in the binary frame memory 513.

When all the L*a*b* image data in the frame memory 503 is compared by the comparing unit 512, and the binarized L*a*b* image data is stored in the binary frame memory 513, the CPU 570 starts the image area separating unit 514.

The image area separating unit 514 divides the binarized L*a*b* image data loaded from the binary frame memory 513 into areas, and determines the attributes of the divided areas by image area separation processing. The determined attributes of the areas and information about the positions and the like of the areas are stored in the area information memory 516.

When the image separation processing is completed, and the attributes and information of all the areas included in the L*a*b* image data are stored in the area information memory 516, the CPU 570 starts the quantization level count determining unit 515. The CPU 570 sequentially inputs the L*a*b* image data corresponding to the respective areas from the frame memory 503 to the quantization level count determining unit 515 to determine the number of quantization levels for quantizing the respective areas on the basis of the attributes and information of the respective areas which are stored in the area information memory 516.

The detailed arrangement of the quantization level count determining unit 515 will be described below with reference to FIG. 32.

Figure 32:
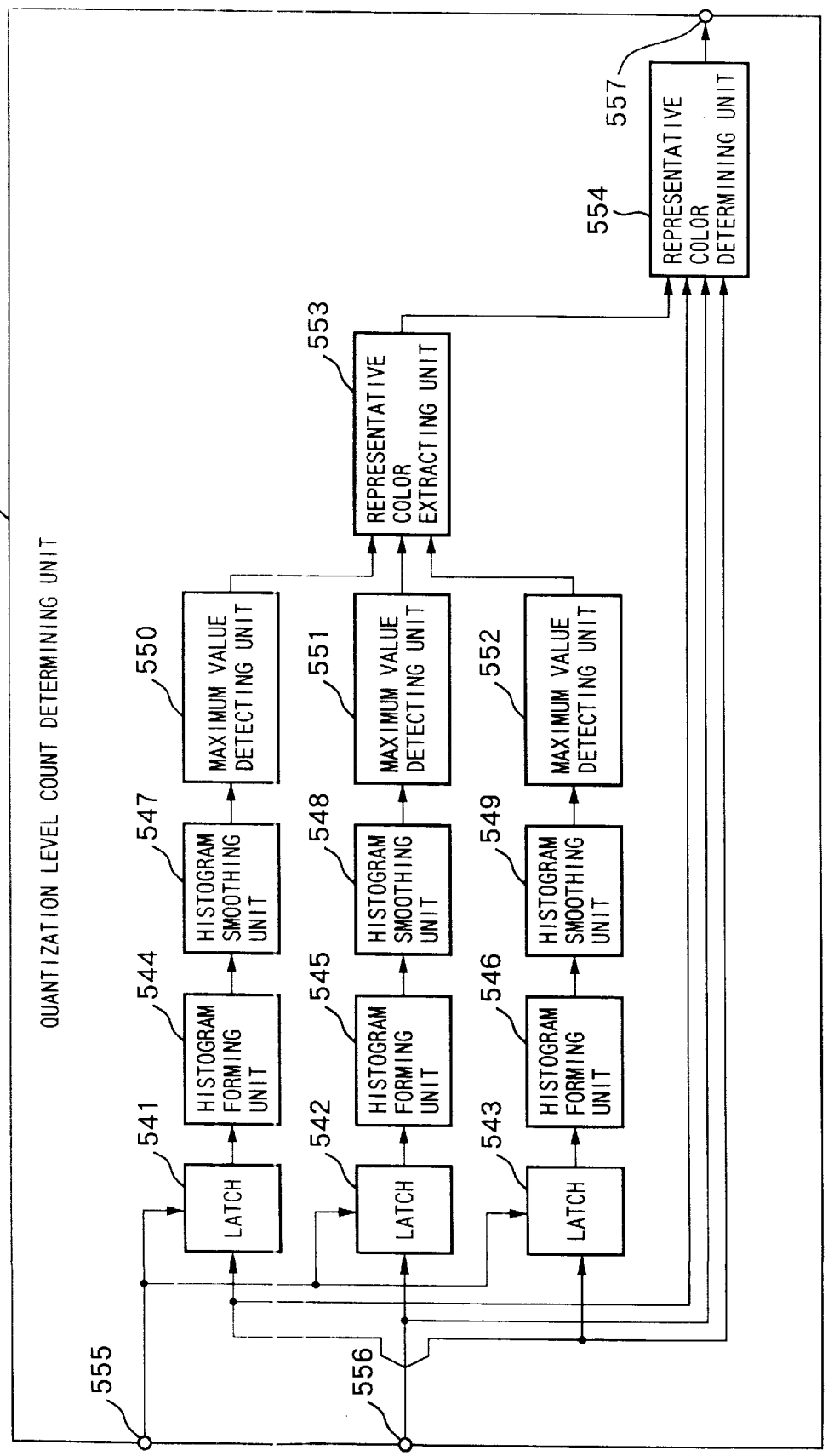
FIG. 32 is a block diagram showing the detailed arrangement of a quantization level count determining unit 515 in the fifth embodiment.

FIG. 32 is a block diagram showing the detailed arrangement of the quantization level count determining unit 515 in the fifth embodiment.

Reference numeral 556 denotes a terminal through which the L*a*b* image data corresponding to the respective areas are sequentially loaded from the frame memory 503 on the basis of the attributes and information of the respective areas which are stored in the area information memory 516; 555, a terminal through which the binarized L*a*b* image data is loaded from the binary frame memory 513 in synchronism with the L*a*b* image data loaded from the frame memory 503; and 541 to 543, latches for outputting the held contents when the binarized L*a*b* image data input through the terminal 555, serving as a control signal, is "1", and outputting no data when the control signal is "0". Note that the latches 541 to 543 respectively hold the L* image data, the a* image data, and the b* image data.

Reference numerals 544 to 546 denote histogram forming units for forming histograms of the pixel values of the L*, a*, and b* image data, respectively.

Note that each of the histogram forming units 544 to 546 is constituted by 256 counters, and the respective counters correspond to the pixel values of loaded image data. Every time 1-pixel image data is input, the counter corresponding to the pixel value is incremented by one.

The histogram forming units 544, 545, and 546 respectively form histograms of the L*, a*, and b* image data.

Reference numerals 547 to 549 denote histogram smoothing units for smoothing the histograms formed by the histogram forming units 544 to 546; and 550 to 552, maximum value detecting units for detecting pixel values exhibiting the maximum occurrence frequency values in the histograms smoothed by the histogram smoothing units 547 to 549.

Reference numeral 553 denotes a representative color extracting unit for extracting a combination of colors which are likely to constitute the corresponding area from the pixel values exhibiting the maximum occurrence frequency values detected by the maximum value detecting units 550 to 552; and 554, a representative color determining unit for determining the colors actually present in the area on the basis of the combination of colors extracted by the representative color extracting unit 553. The representative color determining unit 554 includes a counter for counting the occurrence frequency value of the color exhibiting the minimum color difference obtained from the combination of colors extracted by the representative color extracting unit 553. Reference numeral 557 denotes a terminal from which the number of colors present in the area and the color data are output to the external apparatus.

The processing executed by the quantization level count determining unit 515 will be described next with reference to FIG. 32.

In accordance with the attribute and information of each area which are stored in the area information memory 516, the CPU 570 loads the L*a*b* image data corresponding to each area from the frame memory 503 through the terminal 556, together with the binarized L*a*b* image data (corresponding to the area) from the binary frame memory 513 through the terminal 555. The L*, a*, and b* image data loaded through the terminal 556 are respectively stored in the latches 541 to 543.

When the binarized L*a*b* image data loaded through the terminal 555 is "1", the latches 541 to 543 respectively output their contents to the histogram forming units 544 to 546. If the L*a*b* image data is "0", the latches 541 to 543 output no data. The histogram forming units 544 to 546 do not process the L*a*b* image data.

The histogram forming units 544 to 546 form histograms of the respective L*a*b* image data. The 256 counters of each unit correspond to the pixel values of the input image data. The contents of the counters corresponding to the pixel values are incremented by one.

When histograms are formed by using all the pixels of the input image data, the CPU 570 starts the histogram smoothing units 547 to 549. On the basis of occurrence frequency values hist[i] (i=0 to 255) of the respective pixel values of the histograms of the L*a*b* image data, which are formed by the histogram forming units 544 to 546, and a predetermined smoothing width sw, the histogram smoothing units 547 to 549 smooth the occurrence frequency values hist[i] according to equation (8), and form L*a*b* image data histograms constituted by smoothed occurrence frequency values hist_sm[i] (i=0 to 255):

$$hist - sm[i] = \frac{1}{2sw+1} \sum_{j=i-sw}^{i+sw} hist[i] \qquad (8)$$

Using the same method as that used by the maximum value detecting unit 446 in the fourth embodiment in FIG. 26, the maximum value detecting units 550 to 552 respectively detect pixel values, of the L*, a*, and b* image data, which exhibit the maximum occurrence frequency values from the histograms of the L*, a*, and b* image data which are constituted by the occurrence frequency values hist_sm[i] smoothed by the histogram smoothing units 547 to 549. The detected pixel values, of the L*, a*, and b* image data, which exhibit the maximum occurrence frequency values are input to the representative color extracting unit 553.

The representative color extracting unit 553 stores the numbers of maximum occurrence frequency values of the L*, a*, and b* image data and the pixel values exhibiting the maximum values. Letting mL be the number of maximum values in the L* image data, fl[i] (i=1 to mL) be the respective maximum values, ma be the number of maximum values in the a* image data, fa[i] (i=1 to ma) be the respective maximum values, mb be the number of maximum values in the b* image data, and fl[i] (i=1 to mb) be the respective maximum values, the number mc of color data which are likely to be present in the area is given by:

$$mc = mL \times ma \times mb \qquad (9)$$

A combination of all the colors represented by equation (9) is extracted and output to the representative color determining unit 554, together with the number mc of data.

When a combination of colors is extracted, the CPU 570 resets the counter for counting the occurrence frequency value of the combination of colors output to the representative color determining unit 554 to 0. The CPU 570 loads the L*a*b* image data corresponding to the area from the frame memory 503 into the representative color determining unit 554 again in accordance with the attribute and information of the area which are stored in the area information memory 516. With respect to the loaded L*a*b* image data, the CPU 570 determines the color differences of the combination of colors extracted by the representative color extracting unit 553, and increments the contents of the counter corresponding to the minimum color difference by one.

When color difference determination for the combinations of colors extracted by the representative color extracting unit 553 is completed with respect to all the pixel values of the L*a*b* image data stored in the frame memory 503, and all the colors exhibiting the minimum color differences are counted, the contents of the counter corresponding to each color are compared with a threshold Th3. If the counter value corresponding to a given color is equal to or larger than the threshold Th3, it indicates that the color is indispensable for expressing the pixels in the area. For this reason, the number of such colors is counted, the counted number is set as the number n of quantization levels for quantization of the image. In addition, the colors corresponding to the counter values equal to or larger than the threshold Th3 are used as foreground color representative colors and output to the external apparatus through the terminal 557, together with the number n of quantization levels. The number n of quantization levels and the foreground color representative colors are stored in the area information memory 516, together with the attribute and information of the corresponding area.

In the above manner, the background representative densities bL, ba, and bb of the L*, a*, and b* image data, the number n of levels of quantization required to properly quantize the L*a*b* image data, and the foreground color representative colors are output.

The processing executed in the fifth embodiment will be described next with reference to the flow chart of FIG. 33.

Figure 33:
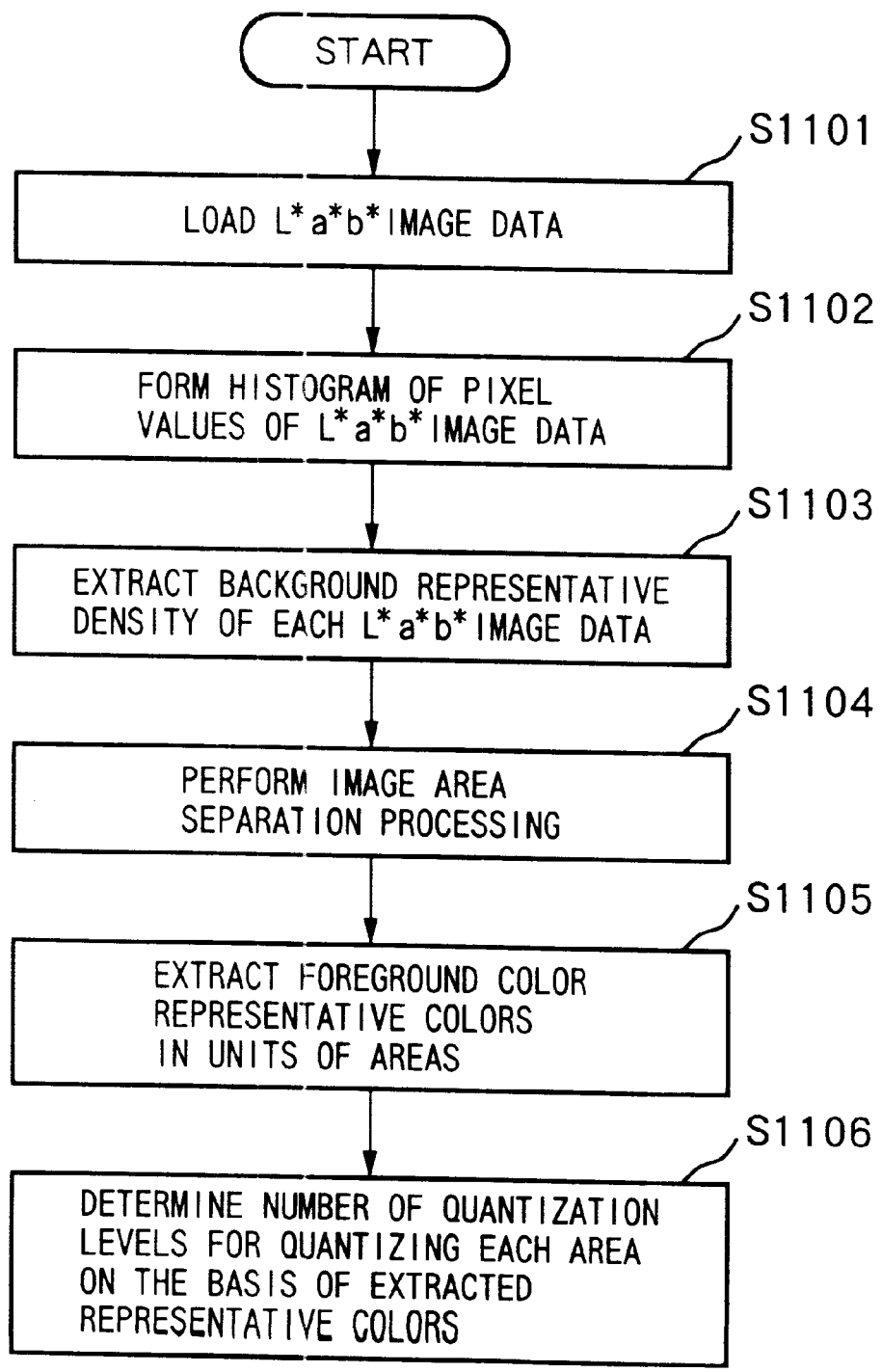
FIG. 33 is a flow chart showing the flow of the processing executed in the fifth embodiment.

FIG. 33 is a flow chart showing the flow of the processing executed in the fifth embodiment.

Prior to the execution of the processing, the CPU 570 clears the contents of the frame memory 503 and the counters of the histogram forming units 506 and 508 to 0.

In step S1101, the CPU 570 loads original image data, which is color multi-level image data, from the image input unit 501, and stores the L*a*b* image data in the frame memory 503 in accordance an instruction from the user. In step S1102, after the L*a*b* image data is stored in the frame memory 503, the CPU 570 reads out the L*a*b* image data from the frame memory 503 and outputs the respective L*, a*, and b* image data to the histogram forming units 506 to 508, thereby forming histograms of all the pixels of the input L*, a*, and b* image data.

In step S1103, the CPU 570 operates the background density determining units 509 to 511 to extract pixel values exhibiting the maximum occurrence frequency values in the histograms of the L*, a*, and b* image data as the background representative densities bL, ba, and bb, respectively. In addition, the CPU 570 extracts the density width lower limit btL0, the density width upper limit btL1, the density width lower limit bta0, the density width upper limit bta1, the density width lower limit btb0, and the density width upper limit btb1 as values defining the widths of the densities of the pixels constituting the backgrounds of the L*, a*, and b* image data from the histograms formed by the histogram forming units 506 to 508.

In step S1104, when all the L*a*b* image data in the frame memory 503 is binarized, and the binarized L*a*b* image data is stored in the binary frame memory 513, the CPU 570 starts the image area separating unit 514. The image area separating unit 514 divides the binarized L*a*b* image data loaded from the binary frame memory 513 into areas, and determines the attributes of the divided areas by image area separation processing. The determined attributes of the areas and information indicating the positions of the respective areas and the like are stored in the area information memory 516.

In step S1105, the quantization level count determining unit 515 extracts foreground color representative colors from the histograms of the L*, a*, and b* image data on the basis of the pixel values, other than the background representative density, exhibiting the maximum occurrence frequency values. In step S1106, the number of quantization levels for quantizing the image data is determined on the basis of the extracted foreground representative colors.

In the fifth embodiment, in extracting the foreground color representative colors present in the area subjected to determination processing by the representative color determining unit 554, the foreground color representative colors are extracted on the basis of the comparison with the color frequency values (L*a*b* image data). The present invention is not limited to this. For example, the following processing may be performed. The L*a*b* image data is loaded from the frame memory 503 by using the combination of colors extracted by the representative color extracting unit 553 as initial vector data. The LBG method, which is generally used to decide vector data for vector quantization, is used to calculate optimal vector data. In addition, the color differences between the L*, a*, and b* image data represented by the respective vector data are determined, and color differences which are not visually noticeable are synthesized to extract foreground color representative colors.

Figure 34:
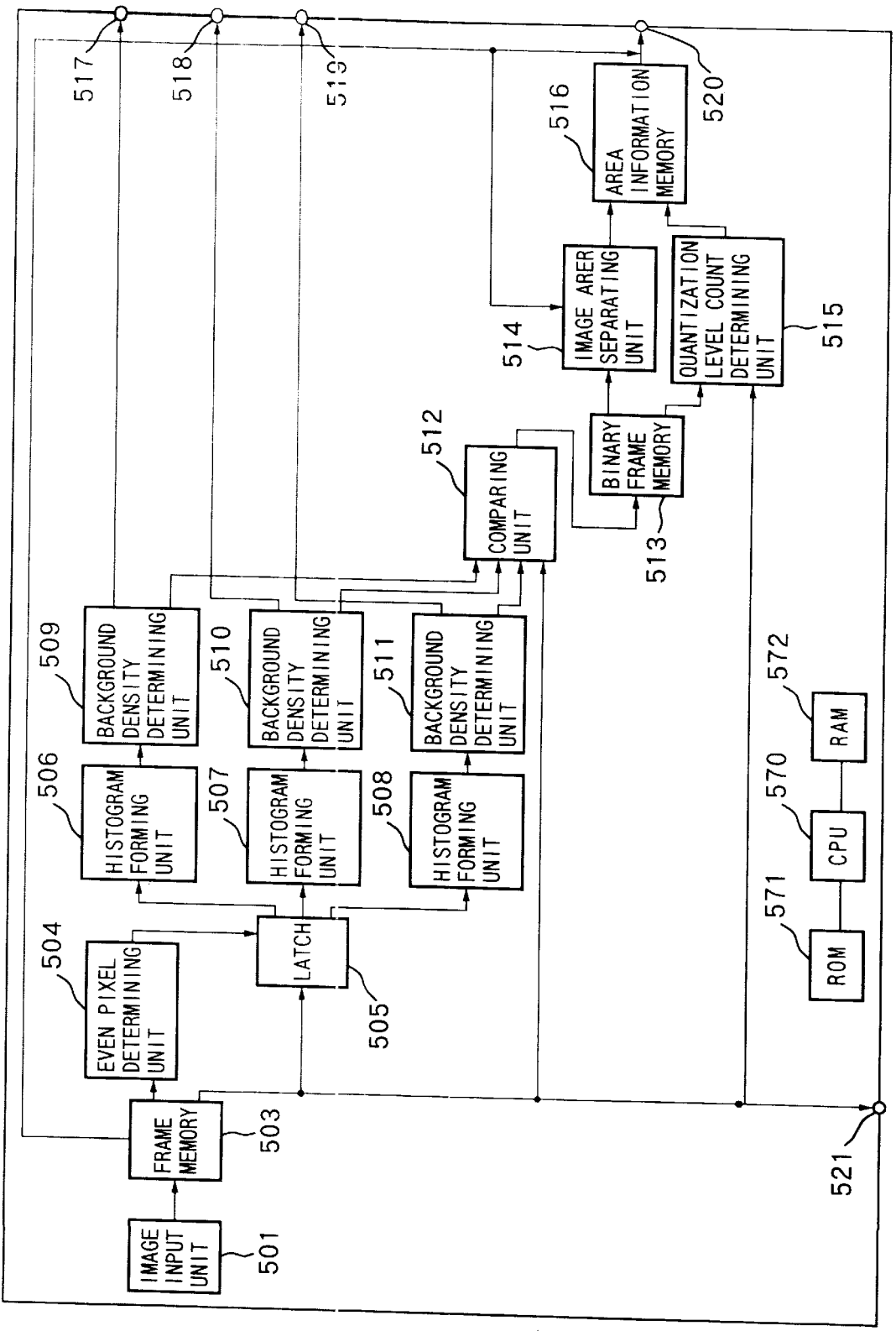
FIG. 34 is a block diagram showing another arrangement of the image processing apparatus of the fifth embodiment.

In the fifth embodiment, the color converting unit 502 in FIG. 32 obtains the representative color density, the number n of quantization levels, and the foreground color representative colors by converting the original image data into the L*a*b* image data. However, for example, the original image data may be converted into YCbCr image data representing luminance/chromaticity. In addition, in order to simplify the processing, the color converting unit 502 may be omitted, and the above processing may be performed without changing RGB color image data. FIG. 34 is a block diagram showing an arrangement for this processing. The same reference numerals in FIG. 34 denote the same parts operating in the same manner as in FIG. 31. The frame memory 503 stores the RGB image data. The histogram forming unit 506 and the background density determining unit 509 process the R image data; the histogram forming unit 507 and the maximum frequency detecting unit 110, the G image data; and the histogram forming unit 508 and the background density determining unit 511, the B image data.

Figure 35:
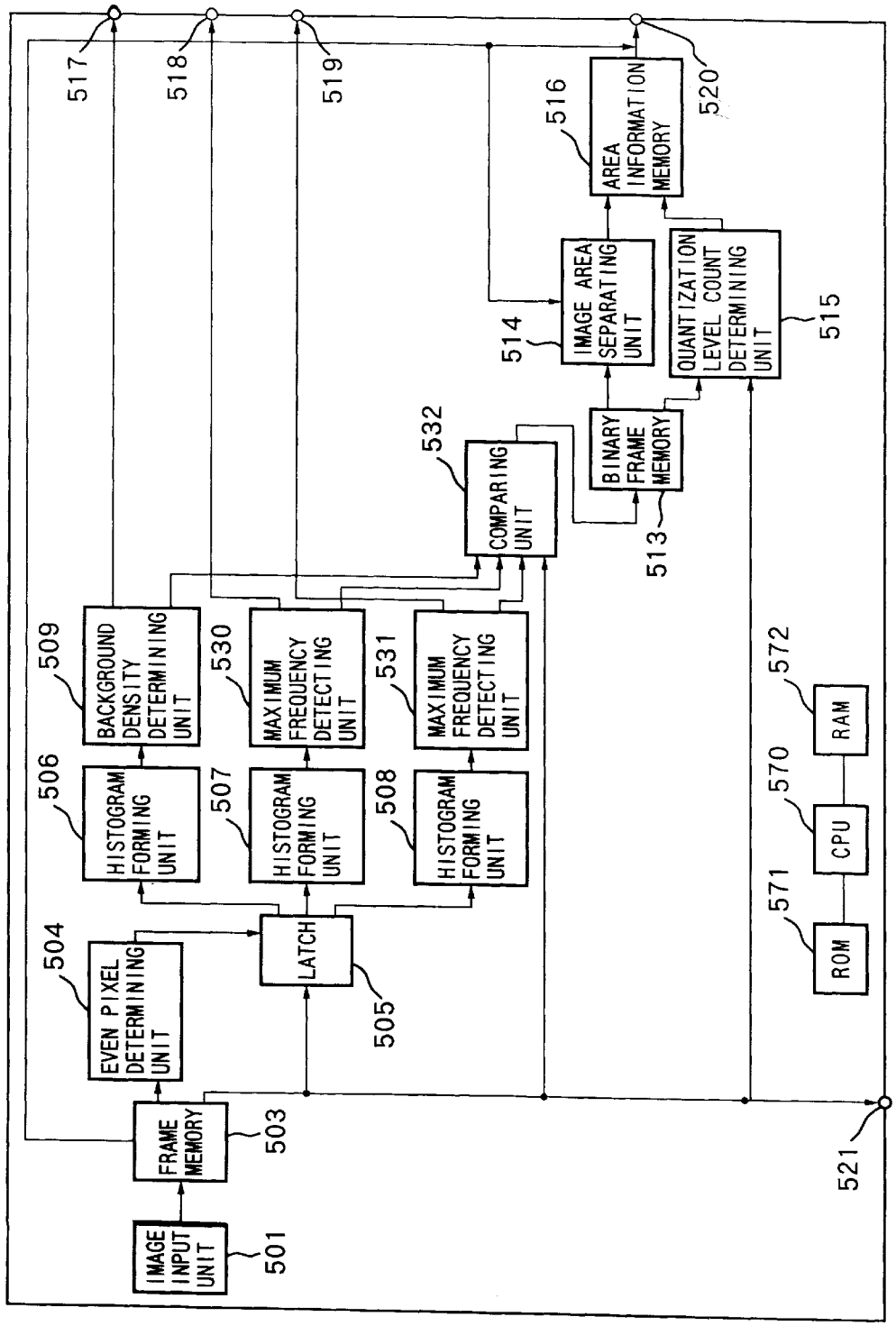
FIG. 35 is a block diagram showing still another arrangement of the image processing apparatus of the fifth embodiment.

Furthermore, in order to simplify the processing, only the L* image data may be used for image area separation processing. FIG. 35 is a block diagram showing an arrangement for this processing. Note that the same reference numerals in FIG. 35 denote the same parts operating in the same manner as in FIG. 31. Reference numeral 530 denotes an even pixel determining unit for loading the L* image data from the frame memory 503, obtaining the edge amount eL according to equation (4), and comparing the edge amount eL with the threshold Th2 to output "0" or "1"; 530 and 531, maximum frequency detecting units, each having the same arrangement as that of the maximum frequency detecting unit 404 in FIG. 23 and operating in the same manner; and 532, a comparing unit which receives the density width lower limit btL0 and the density width upper limit btL1 from the background density determining unit 509, and the L* image data from the frame memory 503.

At the same time when the L*a*b* image data is read out from the frame memory 503 in the input order and input to the latch 505, the L* image data is input to the even pixel determining unit 504. The even pixel determining unit 504 then outputs "0" or "1" in accordance with the edge amount eL.

After the histogram forming units 506 to 508 form the histograms, the CPU 570 starts the background density determining unit 509 and the maximum frequency detecting units 530 and 531. The background density determining unit 509 calculates the background representative density bL, density width lower limit btL0, and density width upper limit btL1 of the L* image data. The maximum frequency detecting units 530 and 531 calculate the background representative densities ba and bb of the a* and b* image data.

The comparing unit 532 receives the density width lower limit btL0 and the density width upper limit btL1, and loads the L* image data from the frame memory 503. If the value of the input L* image data falls within the range of the density width lower limit btL0 to the density width upper limit btL1, the comparing unit 532 outputs "0". Otherwise, the comparing unit 532 outputs "1". The resultant binary data is stored in the binary frame memory 513 and subjected to image area separation processing. The resultant area information is input to the area information memory 516. In addition, the CPU 570 loads the L*a*b* image data from the frame memory 503 and causes the quantization level count determining unit 515 to calculate the number n of quantization levels and foreground color representative colors.

An application of the image processing apparatus of the fifth embodiment will be described next. Assume that this apparatus is applied to an optical character recognition apparatus like the one shown in FIG. 36. The operation and arrangement of this optical character recognition apparatus will be described below.

Figure 36:
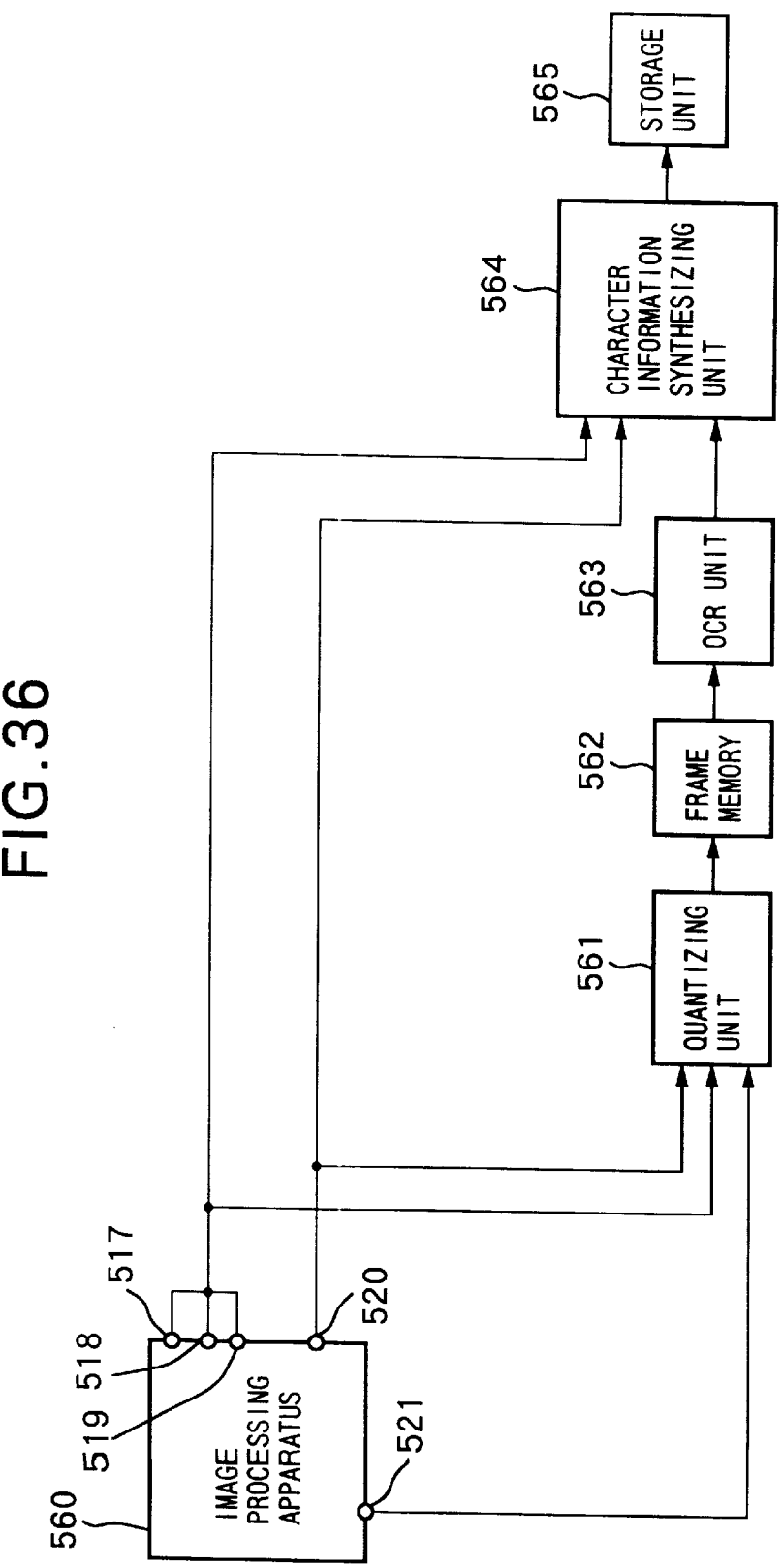
FIG. 36 is a block diagram showing the arrangement of an optical character recognition apparatus to which the image processing apparatus of the fifth embodiment is applied.

FIG. 36 is a block diagram showing the arrangement of the optical character recognition apparatus to which the image processing apparatus of the fifth embodiment is applied.

Referring to FIG. 36, reference numeral 560 denotes an image processing apparatus of the fifth embodiment shown in FIG. 36; and 561, a quantizing unit for receiving the background representative densities bL, ba, and bb of the L* a*, and b* image data, output from the terminals 517 to 519 in FIG. 31, and the area information, the number n of quantization levels, and the foreground color representative colors, output from the terminal 520, and quantizing the L*a*b* image data output from the frame memory 503 through the terminal 521.

Reference numeral 562 denotes a frame memory for storing the L*a*b* image data quantized by the quantizing unit 561. If, for example, the number of quantization levels is n, the frame memory 562 stores the base-n image data in n bit planes. Reference numeral 563 denotes an OCR unit for loading the respective bit plane images stored in the frame memory 562, recognizing characters included in the loaded images, and outputting the corresponding character information as character codes.

Reference numeral 564 denotes a character information synthesizing unit for storing the character codes output from the OCR unit 563. At the same time, the character information synthesizing unit 564 adjusts the arrangement of the characters on the basis of the attribute and information of each area present in the L*a*b* image data, and adds color codes to character codes representing color characters. Reference numeral 565 denotes a storage unit for storing the character codes and the color codes in correspondence with the respective areas present in the L*a*b* image data.

The processing executed by the apparatus shown in FIG. 36 will be briefly described next.

After the image processing apparatus 560 extracts the attribute and information of each area present in the L*a*b* image data, the number n of quantization levels for each area, and each foreground color representative color, the CPU 570 reads out the pixel values of the L*a*b* image data corresponding to each area, of the extracted areas, whose attribute is a "character" through the terminal 521; the information of the area, through the terminal 520; and the background representative densities bL, ba, and bb of the L*a*b* image data, through the terminals 517 to 519, and outputs the pieces of readout information to the quantizing unit 561.

In this case, the contents of the n bit plane images stored in the frame memory 562 are cleared to 0. In addition, the quantizing unit 561 assigns No. 0 to the colors represented by the background representative densities bL, ba, and bb, and Nos. 1 to n to the foreground color representative colors of the area information. Nos. 1 to n respectively correspond to the n bit plane images stored in the frame memory 562.

Subsequently, the color differences between the background colors of the L*a*b* image data and between the foreground color representative colors are extracted from the pixel values of the L*a*b* image data corresponding to each area, and colors exhibiting the minimum color differences are detected. The CPU 570 then determines the ordinal numbers assigned to the detected colors. If a given determined ordinal number is other than 0, the pixel corresponding to the bit plane image, in the frame memory 562, which is indicated by this ordinal number is set to "1". After this processing is performed for all the pixels in the area, the CPU 570 starts the OCR unit 563.

The OCR unit 563 sequentially receives the bit plane images from No. 1, generates character codes from the characters present in the received bit plane images by OCR processing, and detects the positions of the generated characters. When processing for one bit plane image is completed, the corresponding character codes, their positions, and the ordinal number of the bit plane image are stored in the character information synthesizing unit 564 in units of areas.

When the above processing is executed for all the areas stored in the area information memory 516, and the resultant data is stored in the character information synthesizing unit 564, the CPU 570 estimates the reading order of the respective areas from the information indicating the positions of the respective areas stored in the character information synthesizing unit 564. The CPU 570 reads out information about each character included in each area, and calculates a character order from the information indicating the position of each character. In addition, the character codes and the corresponding color codes are properly rearranged and stored in a predetermined storage area of the storage unit 565. When information about the characters included in all the areas is stored in the storage unit 565, all the operations are terminated.

As described above, according to the fifth embodiment, the background representative densities bL, ba, and bb of the L*, a*, and b* image data, together with the density width upper limit btL1, the density width lower limit btL0, the density width upper limit bta1, the density width lower limit bta0, the density width upper limit btb1, and the density width lower limit btb0, on the basis of the histograms of the pixel values of the L*, a*, and b* image data, and all the pixel values falling within the range of each density width upper limit to each density width lower limit are output as background representative densities, thereby outputting constant, proper background densities.

In addition, combinations of image colors present in the original image other than the background are determined on the basis of the numbers of maximum occurrence frequency values present in the histograms other than the maximum values indicating the background representative density bL, the background representative density ba, and the background representative density bb. The color differences between the respective color groups representing the determined combinations of image colors and the L*a*b* image data are calculated, and the occurrence frequency values of colors corresponding to the calculated minimum color differences are counted in units of pixel values. Furthermore, since an image is output in colors (foreground color representative colors) corresponding to counter values equal to or larger than the threshold Th3 according to the distribution of the occurrence frequency values of colors exhibiting the minimum color differences, the image can be output with the constant, proper pixel values of colors.

In addition, since the number of quantization levels for quantizing the original image is determined on the basis of the number of colors corresponding to counter values equal to or larger than the threshold Th3, the number of quantization levels required to properly quantize the original image can be decided.

With respect to color multi-level image data, the proper number of quantization levels can be determined at high speed with a relatively small circuit size, and foreground colors such as character colors can be efficiently extracted without being influenced by background noise. In addition, when this embodiment is applied to OCR, since character colors can be extracted, no color information omitted. Furthermore, character information can be efficiently retrieved with colors or keywords based on color characters as significant information.

<Sixth Embodiment>

In the sixth embodiment, the programs for processing executed by the apparatus arrangements of the fourth and fifth embodiments are stored in a recording medium such as a ROM, and the processing in the present invention is performed by executing the programs.

Figure 37:
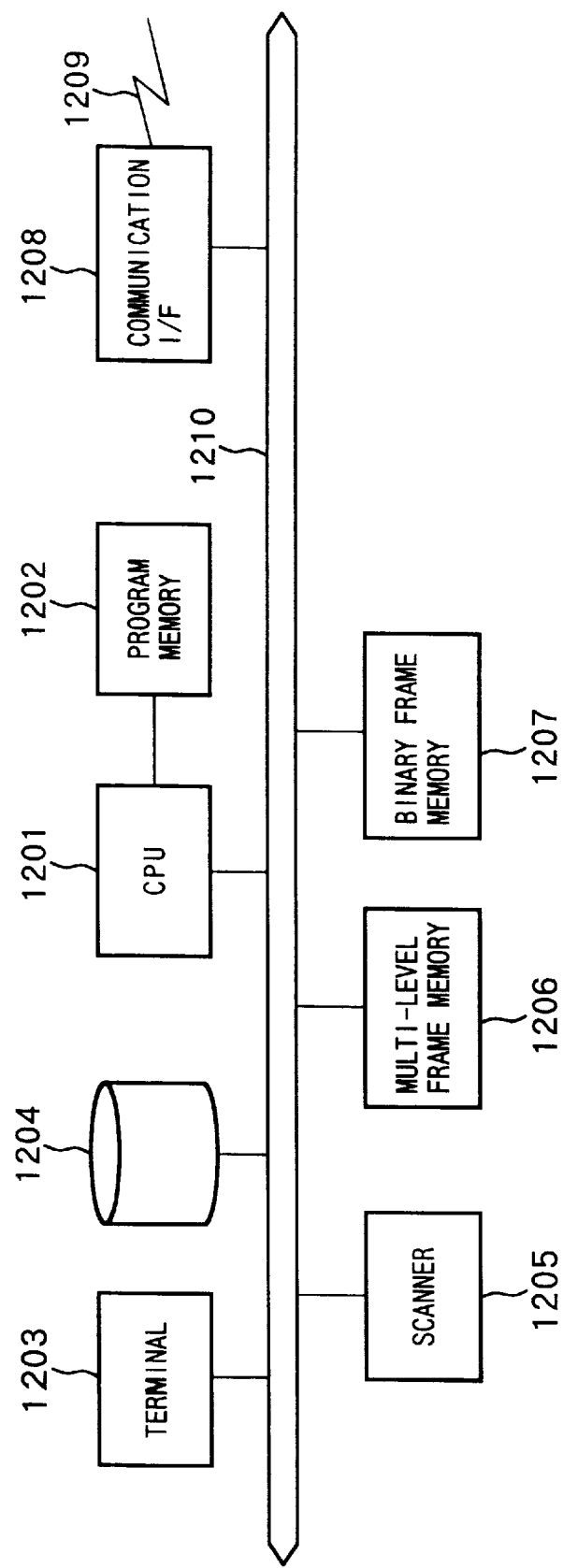
FIG. 37 is a block diagram showing the arrangement of an image processing apparatus according to the sixth embodiment of the present invention.

FIG. 37 is a block diagram showing the arrangement of the image processing apparatus of the sixth embodiment.

Referring to FIG. 37, reference numeral 1201 denotes a CPU which operates according to the execution programs for executing processing to be described later (see the flow charts of FIGS. 40 to 53) and controls the constituent elements of the apparatus; 1202, a program memory for ensuring a storage capacity required for the execution of the execution programs; 1203, a terminal with which the user inputs various instructions such as an instruction to execute an execution program; 1204, a storage unit constituted by a magnetic disk or the like; 1205, a monochrome scanner for reading an original image (color multi-level image data in this case); and 1206, a multi-level frame memory for storing color multi-level image data corresponding to the original image.

Reference numeral 1207 denotes a binary frame memory for storing the binary image data obtained by binarizing the color multi-level image data by the amount corresponding to the original image; 1208, a communication interface (communication I/F) for transmitting encoded data in accordance with a communication protocol; 1209, a communication line constituted by a telephone line or LAN; and 1210, a bus for connecting the respective constituent elements of the apparatus to transmit/receive various data such as image data and control signals.

The processing executed in the sixth embodiment will be described below with reference to the flow charts of FIGS. 40 to 53.

In the sixth embodiment, for example, the scanner 1205 is used to read an original image in accordance with an instruction from the user. The resultant image data is binarized, and the binary image data obtained by binarization is subjected to area division. The attributes of the respective divided areas are determined by image area separation processing, the numbers of quantization levels for quantizing the respective areas included in the binary image data are decided on the basis of the determined attributes. In addition, structured data of the respective areas are generated on the basis of the decided numbers of quantization levels, and the generated structured data is stored in the storage unit 1204. This processing will be described taking the following case as an example.

Figure 38A:
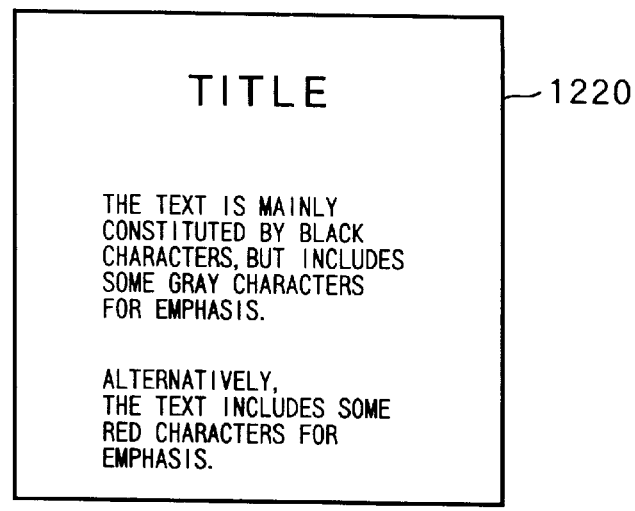
FIG. 38A is a view showing an example of an original image.

Note that structured data is encoded data obtained by properly encoding binary image data corresponding to a given area on the basis of its attribute. Assume that the original image shown in FIG. 38A is used as an original image subjected to the processing described in the sixth embodiment. Of the characters present in the original image, the thick characters "gray" are printed in gray, and the italic characters "red characters" are printed in red. The remaining characters are printed in black.

When the apparatus is started through the terminal 1203, image data of the original image set on the monochrome scanner 1205 is loaded, and a background representative density bg_value, a density width lower limit bt0, and a density width upper limit bt1 are calculated on the basis of the loaded image data. This processing will be described first with reference to the flow charts of FIGS. 40 to 42.

Figure 40:
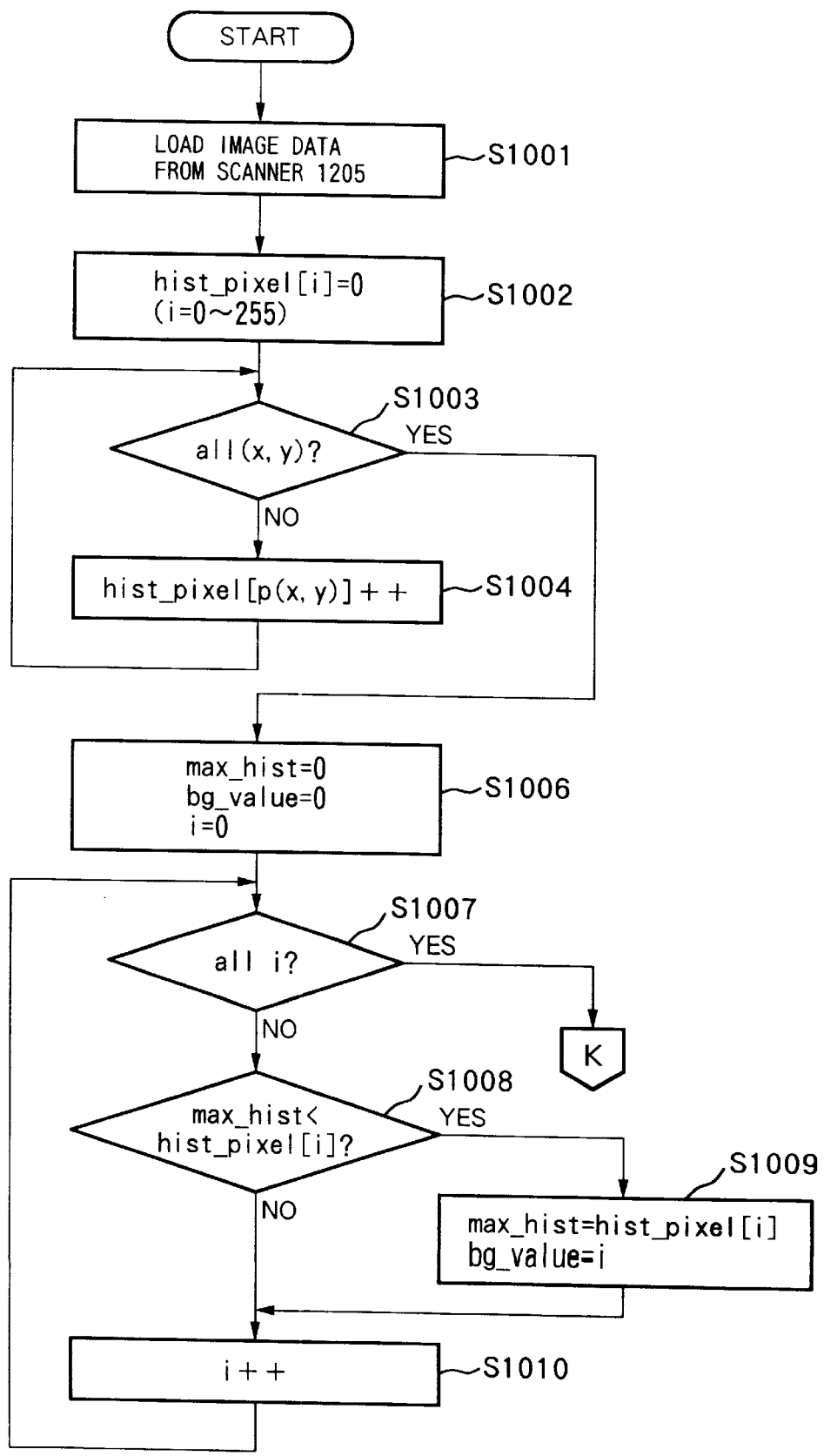
FIG. 40 is a flow chart showing the flow of the processing executed in the sixth embodiment to calculate a background representative density bg_value, density width lower limit bt0, and density width upper limit bt1 of image data.
Figure 41:
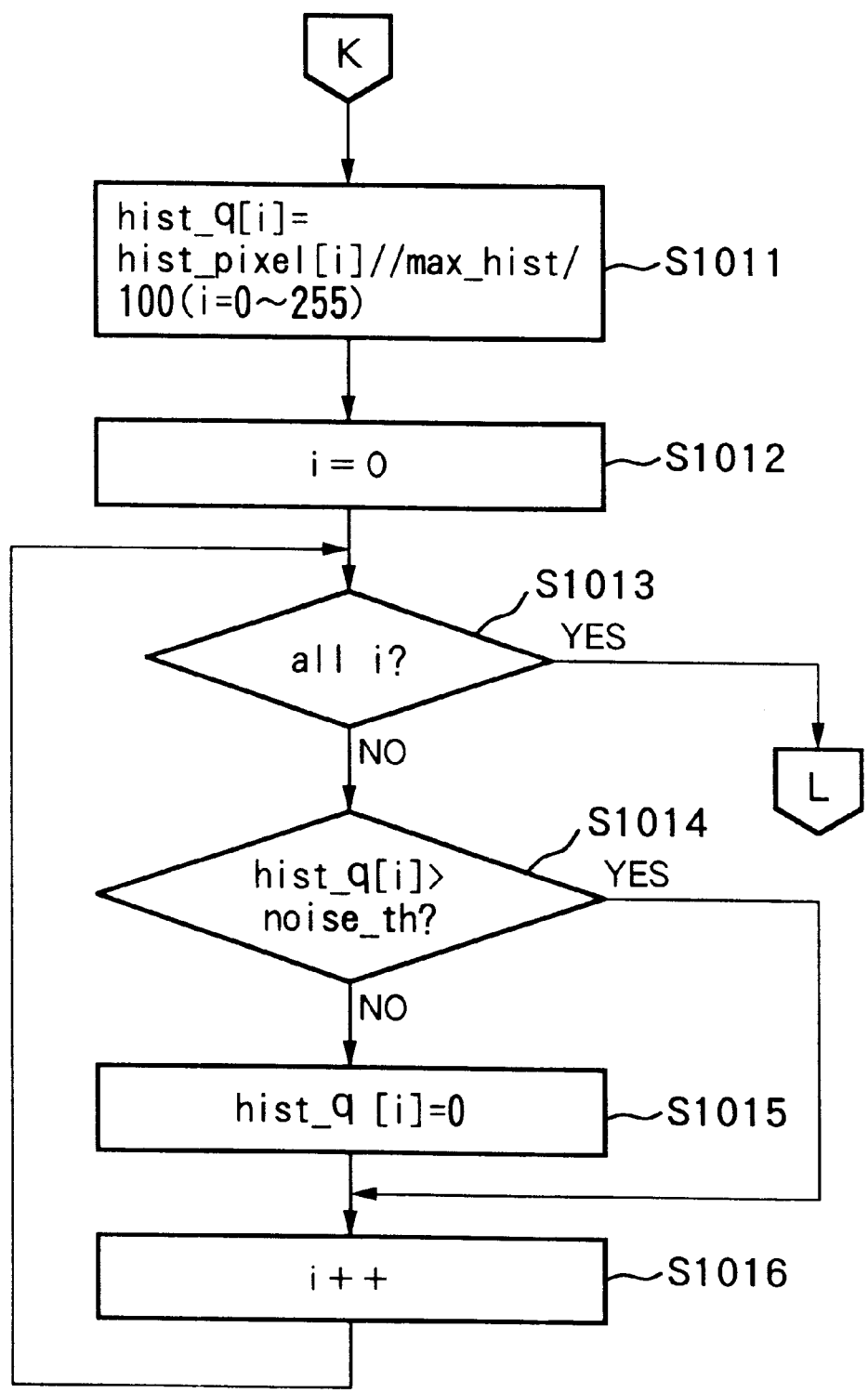
FIG. 41 is a flow chart showing the flow of the processing executed in the sixth embodiment to calculate the background representative density bg_value, density width lower limit bt0, and density width upper limit bt1 of the image data.
Figure 42:
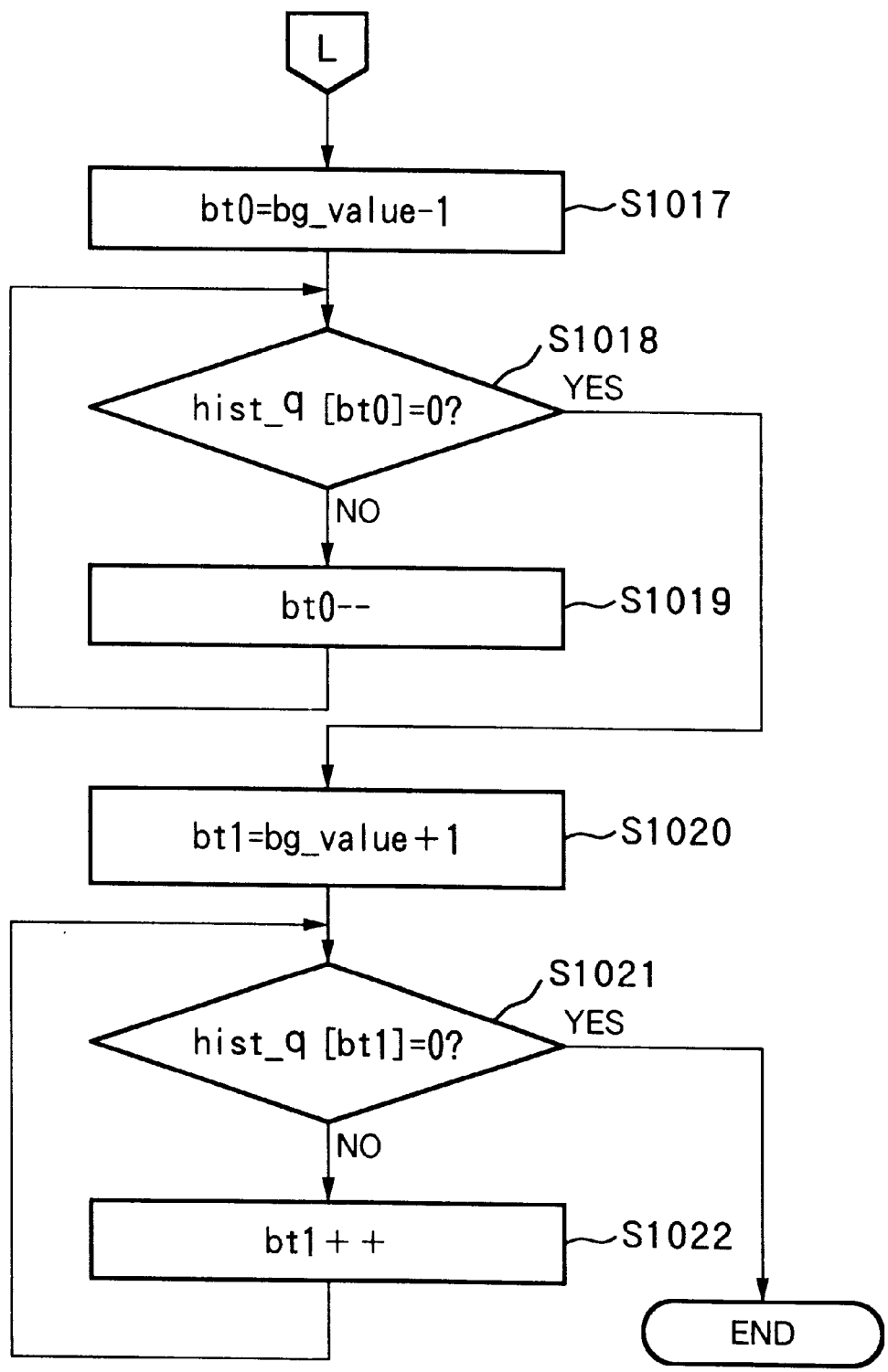
FIG. 42 is a flow chart showing the flow of the processing executed in the sixth embodiment to calculate the background representative density bg_value, density width lower limit bt0, and density width upper limit bt1 of the image data.

FIGS. 40 to 42 are flow charts showing the flow of the processing executed in the sixth embodiment to calculate the background representative density bg_value, density width lower limit bt0, and density width upper limit bt1 of image data.

Referring to FIG. 40, in step S1001, the CPU 1201 loads image data from the monochrome scanner 1205 and stores the data in the multi-level frame memory 1206. In step S1002, the counters for counting the pixel values of the respective pixel data p(x, y) of the image data developed in the multi-level frame memory 1206 are reset to 0. Note that the counters are constituted by 256 counters for frequency values hist_pixel[i] (i=0 to 255). For example, the pixel data with a pixel value i is counted as the hist_pixel [i]. The count values of the respective counters represent the occurrence frequency values of the respective pixel values.

In step S1003, the CPU 1201 sequentially loads the pixel values of pixel data p(x, y) from the multi-level frame memory 1206, and checks whether the pixel values of all the pixel data p(x, y) are loaded. In step S1004, the contents of the counters for frequency values hist_pixel [p(x, y)] corresponding to the pixel values of the pixel data p(x, y) which are sequentially loaded are incremented by one until the pixel values of all the pixel data p(x, y) are loaded.

When the pixel values of the respective pixel data p(x, y) are completely loaded, the flow advances to step S1006. Note that when the pixel values of the respective pixel data p(x, y) are completely loaded, a histogram of the occurrence frequency values of the pixel values of the image data is formed from the occurrence frequency values of the respective pixel values represented by the frequency values hist_pixel[i]. In step S1006, a variable max_hist to be compared with the occurrence frequency value of each pixel value in the formed histogram, the background representative density bg_value decided on the basis of the comparison result, and the contents of a loop counter i for counting the number of pixels compared are reset to 0.

In step S1007, the CPU 1201 loads the frequency values hist_pixel[i] of the respective pixel values from the formed histogram, and checks whether all the frequency values hist_pixel[i] are loaded. In step S1008, each of the frequency values hist_pixel[i] which are sequentially loaded is compared with the variable max_hist until all the frequency values hist_pixel[i] are loaded. If the frequency value hist_pixel[i] is larger than the variable max_hist (YES in step S1008), the flow advances to step S1009. In step S1009, the CPU 1201 substitutes the frequency value hist_pixel[i] for the variable max_hist, and substitutes the contents of the loop counter i for the background representative density bg_value. If the frequency value hist_pixel[i] is equal to or smaller than the variable max_hist (NO in step S1008), the flow advances to step S1010.

In step S1010, the contents of the loop counter i are incremented by one. When comparison with all the frequency values hist_pixel[i] is completed, i.e., the contents of the loop counter i become 255, the flow advances to step S1011.

Figure 39:
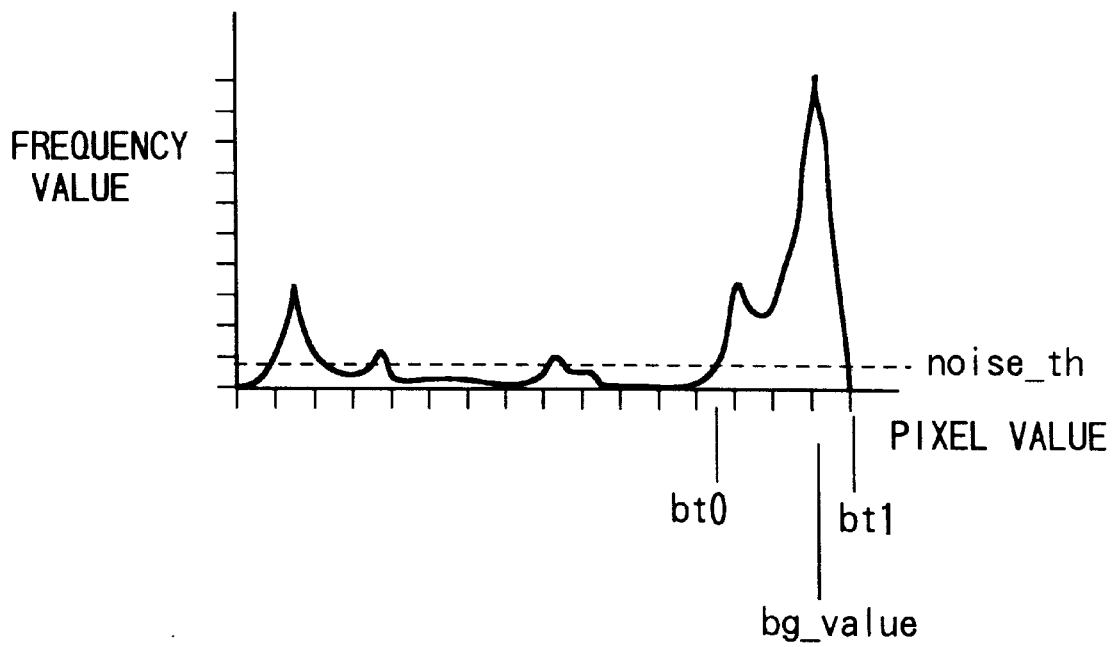
FIG. 39 is a graph for explaining how a background density width is extracted in the sixth embodiment.

Referring to FIG. 39, in step S1011, after a quantization step max_hist/100 for normalizing the histogram is calculated, a quantization frequency value hist_q[i] is calculated according to equation (6) above.

In step S1012, the contents of the loop counter i for counting the number of the loaded quantization frequency values hist_q[i] are reset to 0.

In step S1013, the CPU 1201 sequentially loads the quantization frequency values hist_q[i], and checks whether all the quantization frequency values hist_q[i] are loaded. In step S1014, the sequentially loaded quantization frequency values hist_q[i] are compared with a noise threshold noise_th. If the quantization frequency value hist_q[i] is equal to or smaller than the noise threshold noise_th (NO in step S1014), the flow advances to step S1015. In step S1015, the contents of the counter for the quantization frequency value hist_q[i] are set to 0. If the quantization frequency value hist_q[i] is larger than the noise threshold noise_th (YES in step S1014), the flow advances to step S1016. Note that the noise threshold noise_th is used for the same purpose as that of the threshold Th1 in the fourth embodiment.

In step S1016, the contents of the loop counter i are incremented by one. When all the quantization frequency values hist_q[i] are compared, i.e., the contents of the loop counter i become 256, the flow advances to step S1017.

In step S1017, "1" is subtracted from the background representative density bg_value to calculate the density width lower limit bt0. In step S1018, it is sequentially checked whether the quantization frequency value hist_q[i] is "0". In step S1019, the density width lower limit bt0 is decremented by one until the frequency value hist_q[bt0] becomes 0.

When the frequency value hist_q[bt0] becomes 0, "1" is subtracted from the background representative density bg_value to calculate the density width upper limit bt1 in step S1020. Note that the density width lower limit bt0 set when the frequency value hist_q[bt0] becomes "0" is used as the density width lower limit bt0.

In step S1021, it is checked whether the frequency value hist_q[bt1] of the density width upper limit bt1 is "0". In step S1022, the density width upper limit bt1 is incremented by one until the frequency value hist_q[bt1] becomes "0". When the frequency hist_q[bt1] becomes "0", the processing is completed. Note that the density width upper limit bt1 set when the frequency value hist_q[bt1] becomes "0" is used as the density width upper limit bt1.

The background representative density bg_value, density width lower limit bt0, and density width upper limit bt1 of image data are calculated by the processing described with reference to the flow charts of FIGS. 40 to 42. When the above processing is applied to the original image shown in FIG. 38A, a histogram like the one shown in FIG. 39 is obtained. Referring to FIG. 39, the dotted line represents the noise threshold noise_th. The pixel value exhibiting the maximum occurrence frequency value on the right end of the histogram is the background representative density bg_value, and the density width lower limit bt0 and the density width upper limit bt1 are present on both sides of the background representative density bg_value.

Processing of binarizing image data to perform image area separation processing of image data will be described next with reference to the flow chart of FIG. 43.

Figure 43:
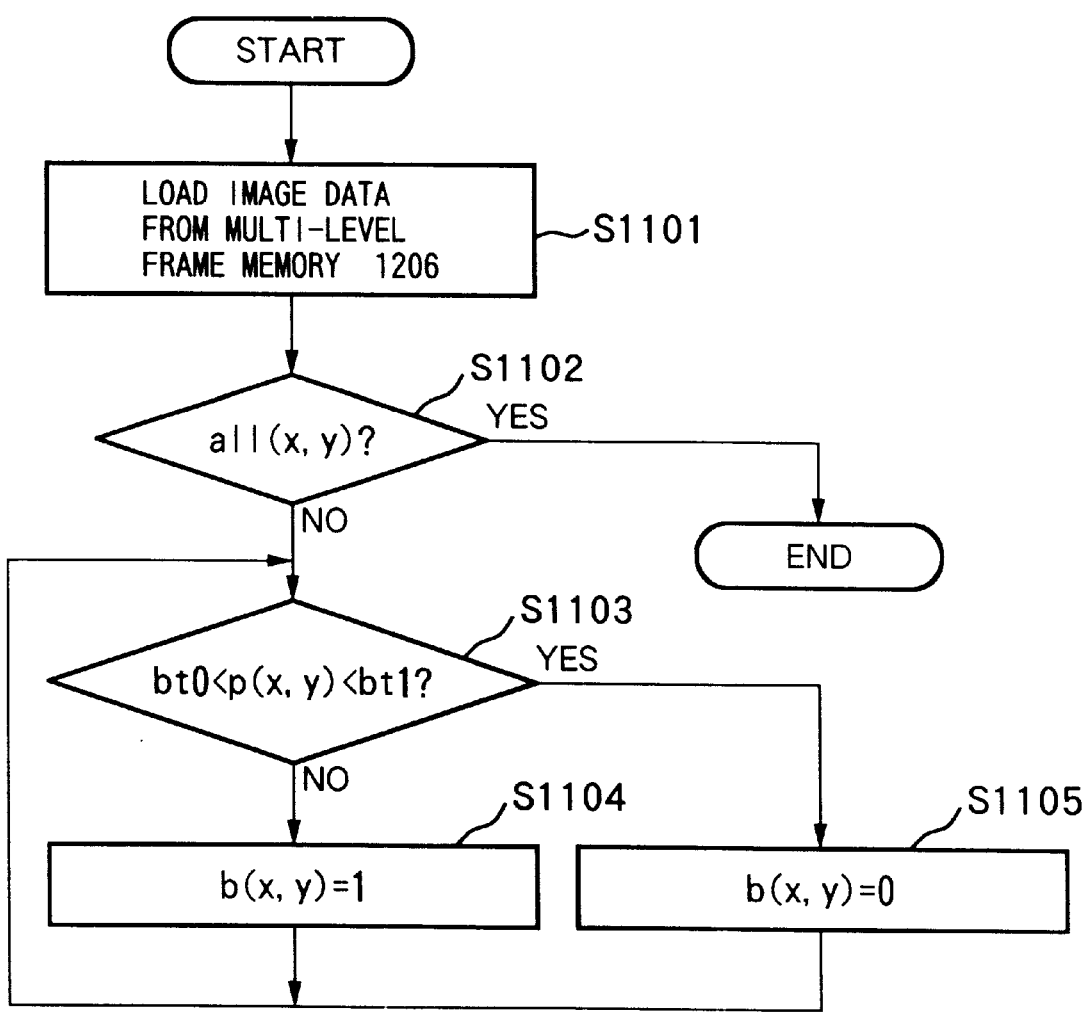
FIG. 43 is a flow chart showing the flow of the processing executed in the sixth embodiment to binarize image data.

FIG. 43 is a flow chart showing the flow of the processing executed in the sixth embodiment to binarize image data.

In step S1101, the CPU 1201 sequentially loads the respective pixel data p(x, y) of the image data developed in the multi-level frame memory 1206. In step S1102, the CPU 1201 checks whether the processing executed in step S1103 is completed with respect to all the pixel data p(x, y). In step S1103, all the pixel data p(x, y) is converted into binary image data b(x, y). In this binarization method, it is checked whether the pixel value of each of the pixel data p(x, y) which are sequentially loaded is larger than the density width lower limit bt0 and smaller than the density width upper limit bt1.

If the pixel data p(x, y) is larger than the density width lower limit bt0 and smaller than the density width upper limit bt1, the flow advances to step S1105 to write the binary image data b(x, y) of the pixel data p(x, y) as "0" in the corresponding area of the binary frame memory 1207. In contrast to this, if the pixel data p(x, y) is equal to or smaller than the density width lower limit bt0 and equal to or larger than the density width upper limit bt1, the flow advances to step S1104 to write the binary image data b(x, y) of the pixel data p(x, y) as "1" in the corresponding area of the binary frame memory 1207.

When all the pixel data p(x, y) in the multi-level frame memory 1206 are binarized, the processing is terminated.

With the above processing described with reference to the flow chart of FIG. 43, the binary image data b(x, y) obtained by binarizing the respective pixel data p(x, y) of the image data stored in the multi-level frame memory 1206 are stored in the binary frame memory 1207.

With the use of the flow charts of FIGS. 44 to 47, the binary image data stored in the binary frame memory 1207 is divided into areas, and the attributes of the divided areas are determined by image area separation processing. Subsequently, the foreground color representative densities of the areas included in the multi-level image data are extracted on the basis of the determined attributes, and the number of quantization levels for quantizing the respective areas is decided on the basis of the extracted foreground color representative colors and foreground color representative densities. This processing will be described below.

FIGS. 44 to 47 are flow charts showing the flow of the processing executed in the sixth embodiment to decide the number of quantization levels for quantizing the respective areas included in multi-level image data and foreground color representative densities thereof.

Figure 38B:
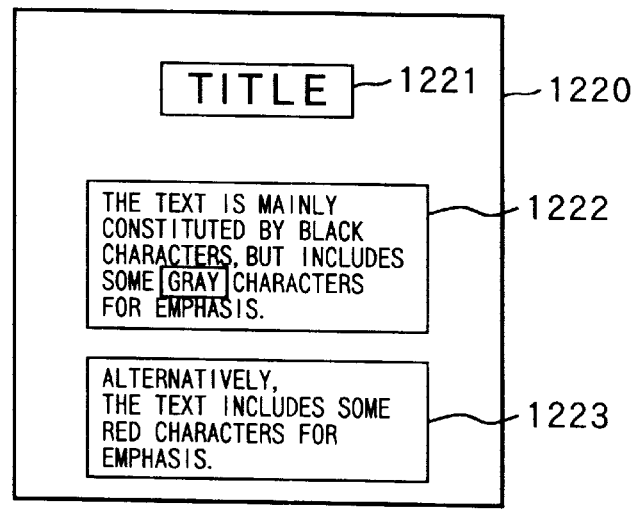
FIG. 38B is a view showing the arrangement of areas obtained by dividing the original image.
Figure 44:
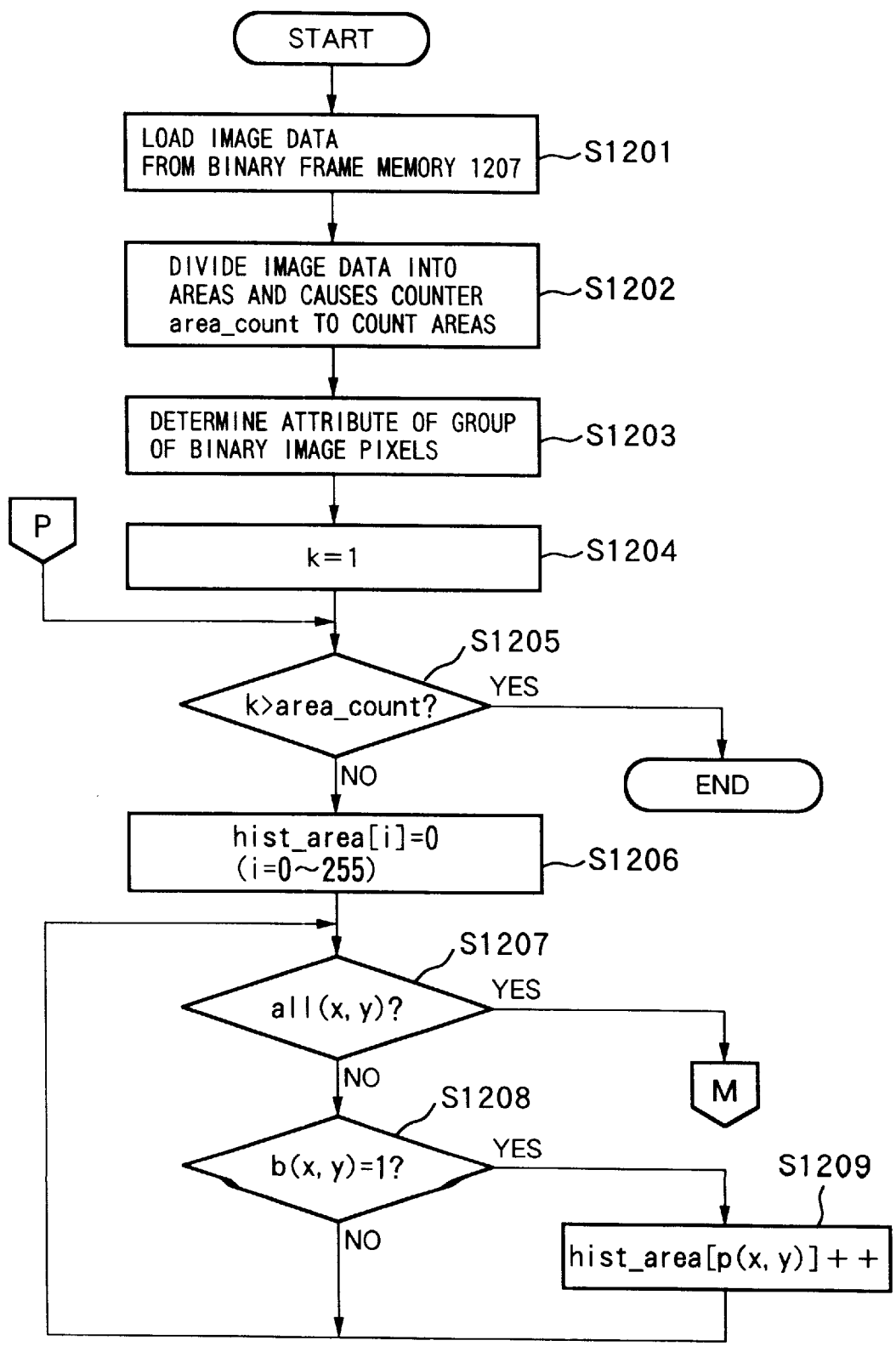
FIG. 44 is a flow chart showing the flow of the processing executed in the sixth embodiment to decide the number of quantization levels for quantizing the respective areas included in binary image data, foreground color representative colors, and foreground color representative densities.

Referring to FIG. 44, in step S1201, binary image data is loaded from the binary frame memory 1207. In step S1202, the loaded binary image data is divided in units of areas having similar attributes. The number of divided areas is counted by a counter area_count. In addition, the position coordinates and sizes of the respective areas are obtained. In step S1203, image area separation processing is performed for each counted area to determine the attribute of each area, e.g., "image", "graphic pattern", or "character", on the basis of the density, shape, and arrangement of groups of binary image data "1" included in each area. In this case, image area separation is performed by using, for example, the image area separation method disclosed in Japanese Patent Application No. 6-167748. Note that when image area separation of the original image shown in FIG. 38A is performed, the image is divided into areas 1221 to 1223, as shown in FIG. 38B. Each area is determined as an area having the attribute "character".

In step S1204 and the subsequent steps, the CPU performs the processing of deciding the number of quantization levels required for image expression in each counted area.

In step S1204, the value of a loop counter k is set to "1". Every time the processing of deciding the number of quantization levels is completed for each area, the loop counter k is incremented by one. This count value corresponds to the value of the area counted by the counter area_count. In step S1205, the CPU checks whether the value of the loop counter k is larger than that of the counter area_count. If the value of the loop counter k is equal to or smaller than that of the counter area_count (NO in step S1205), the flow advances to step S1206. If the value of the loop counter k is larger than that of the counter area_count (YES in step S1250), since it indicates that the processing of deciding the number of quantization levels is completed for all the counted areas, the processing terminated.

In step S1206, the counters for counting the pixels values of the pixel data p(x, y) in the area corresponding to the value of the loop counter k, input from the multi-level frame memory 1206, are reset to 0. Note that the counters are constituted by counters for the frequency values hist_area[i] (i=0 to 255). For example, the pixel data with the pixel value i is counted as the hist_area[i]. The count values of the respective counters represent the occurrence frequency values of the respective pixel values.

In step S1207, the CPU sequentially loads the pixel values of the pixel data p(x, y) in the area corresponding to the value of a loop counter k from the multi-level frame memory 1206, together with the pixel values of pixel data b(x, y) corresponding to the pixel data p(x, y) from the binary frame memory 1207, and determines whether the pixel values of all the pixel data p(x, y) and pixel data b(x, y) are loaded. In step S1208, the sequentially loaded pixel values of the pixel data b(x, y) are determined until the pixel values of all the pixel data p(x, y) and pixel data b(x, y) are loaded. If the pixel value of the pixel data b(x, y) is "1" (YES in step S1208), the flow advances to step S1209. In step S1209, the contents of the counter for the frequency value hist_area[p(x,y)] is incremented by one. If the pixel value of the pixel data b(x, y) is not "1" (NO in step S1208), i.e., the pixel value is "0", the flow returns to step S1207.

When all the pixel values are loaded, the flow advances to step S1210. Note that when all the pixel values are loaded, a histogram of the occurrence frequency values of the pixel values of the image data is formed on the basis of the occurrence frequency values of the respective pixel values indicated by the frequency values hist_area[i]. In steps S1210 to S1213, the formed histogram is smoothed.

Figure 45:
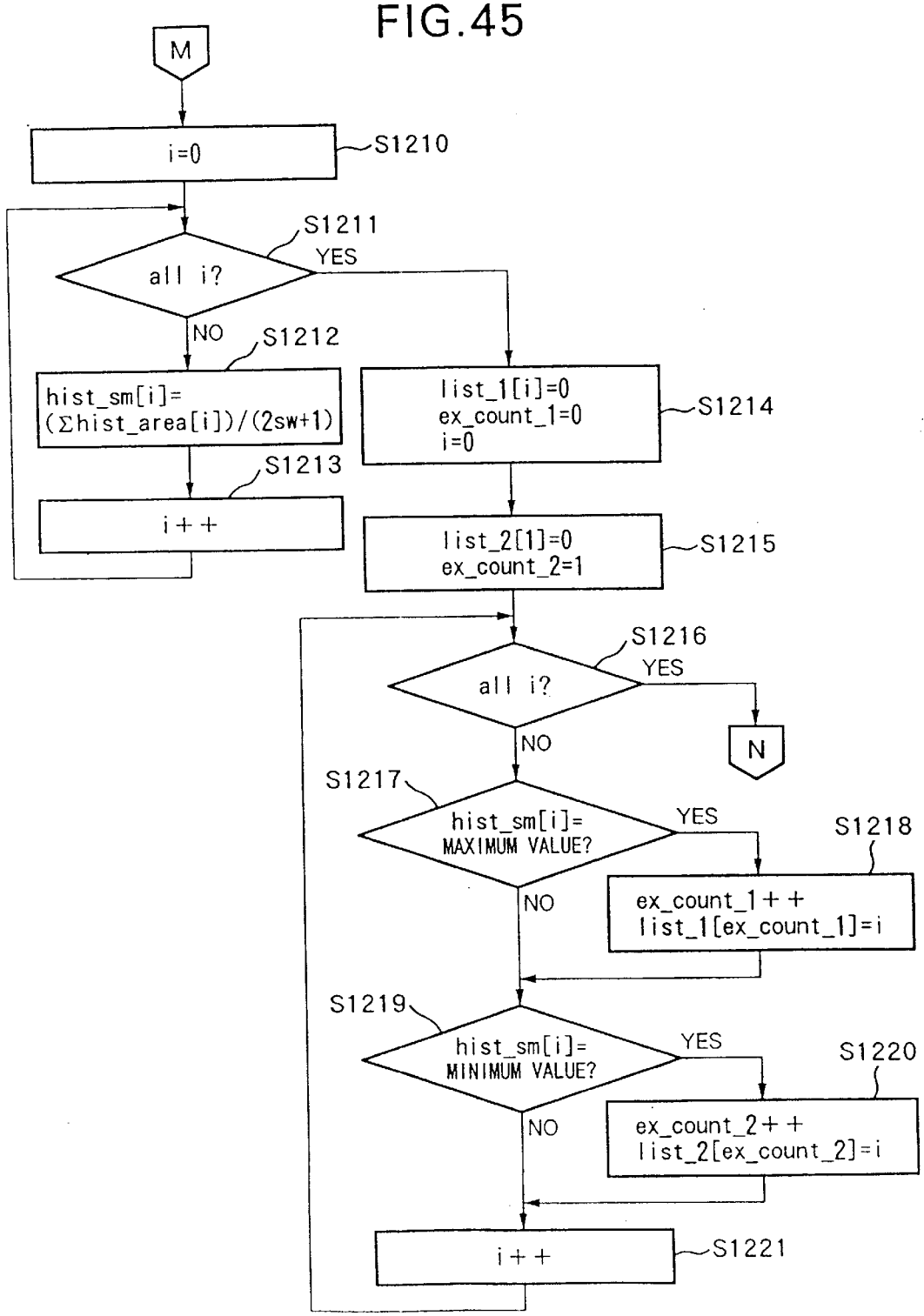
FIG. 45 is a flow chart showing the flow of the processing executed in the sixth embodiment to decide the number of quantization levels for quantizing the respective areas included in binary image data, the foreground color representative colors, and the foreground color representative densities.

Referring to FIG. 45, the contents of the loop counter i for counting the number of pixel values obtained by smoothing the occurrence frequency values hist_area[i] of the respective pixel values in the formed histogram are reset to 0 in step S1210.

In step S1211, the CPU loads the frequency values hist_area[i] of the respective pixel values from the formed histogram, and determines whether all the frequency values hist_area[i] are loaded. In step S1212, the sequentially loaded frequency values hist_area[i] are smoothed to calculate smoothed frequency values hist_sm[i] according to equation (8) above until all the frequency values hist_area[i] are loaded.

In step S1213, the contents of the loop counter i are incremented by one. When all the frequency values hist_area[i] are smoothed, i.e., the contents of the loop counter i become 256, the flow advances to step S1214.

In steps 1214 to 1228, the maximum and minimum values in the histogram are detected from the histogram constituted by the smoothed frequency values hist_sm[i], and the foreground color representative densities of each area are determined.

In step S1214, the contents of a maximum value table list_1[i], the contents of a counter ex_count_1 for counting the number of maximum values in the smoothed histogram, and the contents of the loop counter i for counting the number of smoothed frequency values hist_sm[i] are reset to 0. Note that the maximum value table list_1[i] is a table showing the relationship between the count value (list_1[ex_count_1]) of the counter ex_count_1 and the pixel value of the smoothed frequency value hist_sm[i] having the maximum value corresponding to the count value.

In step S1215, the contents of a minimum value table list_2[1] are set to 0, and the contents of a counter ex_count_2 for counting the number of the minimum values present in the smoothed histogram are set to 1. Note that the minimum value table list_2[i] is a table showing the relationship between the count value (list_2[ex_count_2]) of the counter ex_count_2 and the pixel value of the smoothed frequency value hist_sm[i] having the minimum value corresponding to the counter value. In general, a smoothed histogram includes a small pixel value exhibiting an occurrence frequency value of 0 as the minimum value. For this reason, the pixel value having the minimum value and counted first is "0", and hence "0" is set in the minimum value table list_2[1].

In step S1216, the CPU loads the smoothed frequency values hist_sm[i] of the respective pixel values from the smoothed histogram, and determines whether all the smoothed frequency values hist_sm[i] are loaded. In step S1217, it is checked whether the sequentially loaded smoothed frequency values hist_sm[i] are the maximum value, until all the smoothed frequency values hist_sm[i] are loaded. If the smoothed frequency value hist_sm[i] is the maximum value (YES in step S1217), the flow advances to step S1218. In step S1218, the contents of the counter ex_count_1 are incremented by one, and the pixel value of the smoothed frequency value hist_sm[i] is made to correspond to the count value (list_1[ex_count_1]) of the maximum value table list_1[i]. In contrast to this, if the smoothed frequency value hist_sm[i] is not the maximum value (NO in step S1217), the flow advances to step S1219.

In step S1219, it is checked whether the sequentially loaded smoothed frequency values hist_sm[i] are the minimum value. If the smoothed frequency value hist_sm[i] is the minimum value (YES in step S1219), the flow advances to step S1220. In step S1220, the contents of the counter ex_count_2 are incremented by one, and the pixel value of the smoothed frequency value hist_sm[i] is made to correspond to the count value list_2[ex_count_2] of the minimum value table list_2[i]. In contrast to this, if the smoothed frequency value hist_sm[i] is not the minimum value (NO in step S1219), the flow advances to step S1221.

In step S1221, the contents of the loop counter i are incremented by one. When all the smoothed frequency values hist_sm[i] are compared, i.e., the contents of the loop counter i become 256, the flow advances to step S1222.

Figure 46:
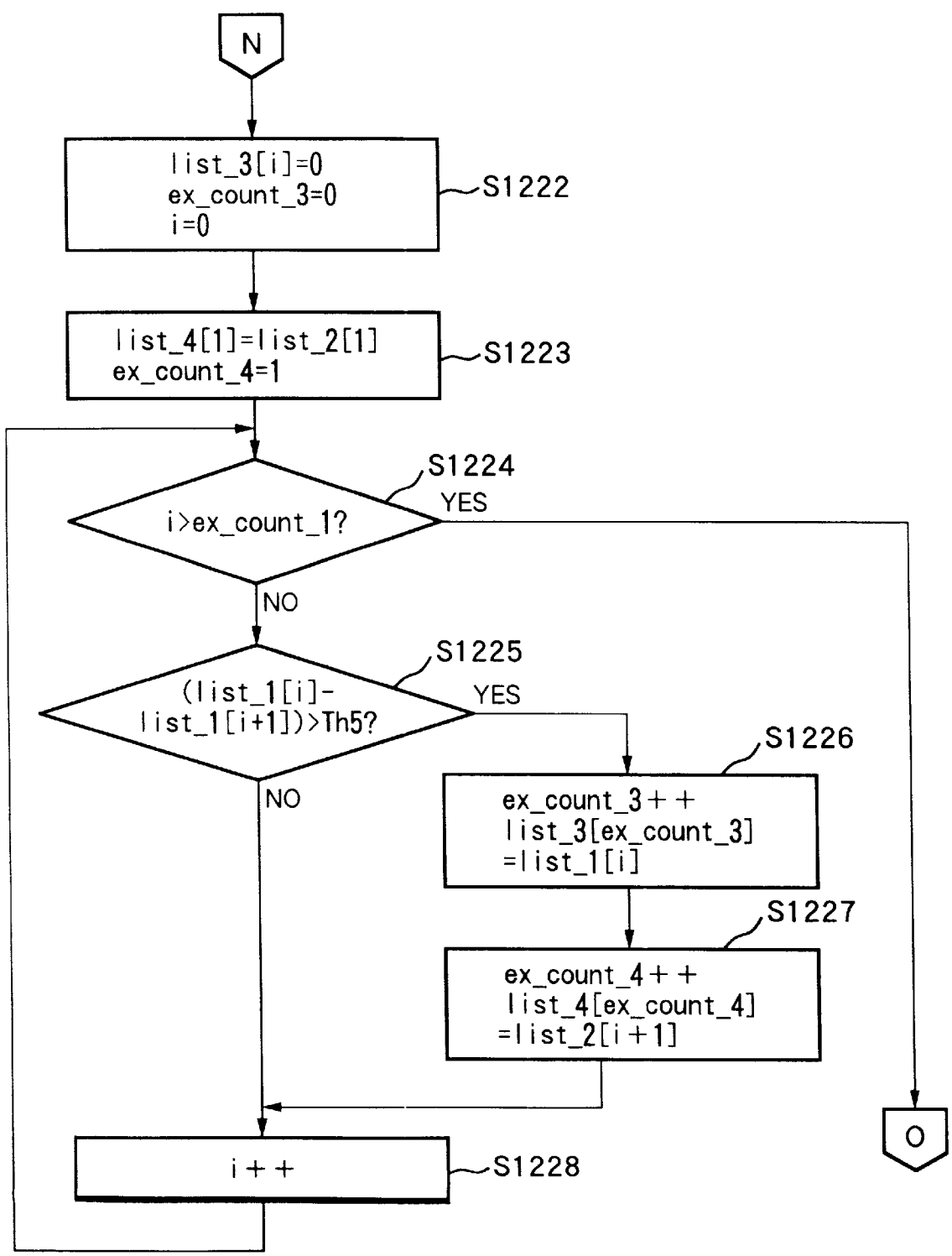
FIG. 46 is a flow chart showing the flow of the processing executed in the sixth embodiment to decide the number of quantization levels for quantizing the respective areas included in binary image data, the foreground color representative colors, and the foreground color representative densities.

Referring to FIG. 46, in step S1222, the contents of a maximum value table list_3[i] are reset to 0. In addition, the contents of a counter ex_count_3 for counting the number of maximum values obtained by synthesizing closer maximum values in the maximum value table list_1[i] into one maximum value, and also counting the number of other maximum values are reset to 0. In addition, the contents of the loop counter i for counting the number of smoothed frequency values hist_sm[i] having undergone the determination of the presence/absence of a maximum value to be synthesized are reset to 0. Note that the maximum value table list_3[i] is a table showing the relationship between the count value (list_3[ex_count_3]) of the counter ex_count_3 and the pixel value of the smoothed frequency value hist_sm[i] having the maximum value corresponding to the count value.

In step S1223, the contents of the minimum value table list_2[1] are set to a minimum value table list_4[1]. The contents of a counter ex_count_4 for counting the number of minimum values which are eliminated upon synthesis of maximum values, together with the number of other minimum values, are set to 1. Note that the minimum value table list_4[i] is a table showing the relationship between the count value (list_4[ex_count_4]) and the pixel value of the smoothed frequency value hist_sm[i] having the minimum value corresponding to the count value.

In step S1224, the CPU loads the respective maximum values from the maximum value table list_1[i], and determines whether the number of loaded maximum values is larger than the count value of the counter ex_count_1. In step S1224, the CPU calculates the difference between the (i+1)th maximum value in the maximum value table list_1[i] and the pixel value corresponding to the ith maximum value, and determines whether the calculated difference is larger than a predetermined threshold Th5, until the number of loaded maximum values exceeds the count value of the counter ex_count_1.

If the calculated difference is larger than the predetermined threshold Th5 (YES in step S1225), the flow advances to step S1226. In step S1226, the contents of the counter ex_count_3 are incremented by one, and the pixel value of the smoothed frequency value hist_sm[i] corresponding to the count value list_1[i] of the maximum value table list_1[i] is made to correspond to the count value list_3[ex_count_3] of the maximum value table list_3[i]. In step S1227, the pixel value of the smoothed frequency value hist_sm[i] corresponding to the count value list_2[i] of the minimum value table list_2[1] is made to correspond to the count value list_4[ex_count_4] of the minimum value table list_4[1]. If the calculated difference is equal to or smaller than the predetermined threshold Th5 (NO in step S1225), the flow advances to step S1228.

In step S1228, the contents of the loop counter i are incremented by one. When the respective maximum values are loaded from the maximum value table list_1[i], and the number of loaded maximum values, i.e., the contents of the loop counter i become larger than those of the counter ex_count_1, the flow advances to step S1229.

Note that the pixel values corresponding to the maximum values stored in the maximum value table list_3[i] correspond to the foreground color representative densities.

In steps S129 to S1237, the foreground color representative densities of each area are determined on the basis of the maximum and minimum values detected from the histogram constituted by the smoothed frequency values hist_sm[i]. In addition, the number of quantization levels for quantizing each area, and the foreground color representative thresholds as quantization thresholds are determined on the basis of the determined foreground color representative densities.

Figure 47:
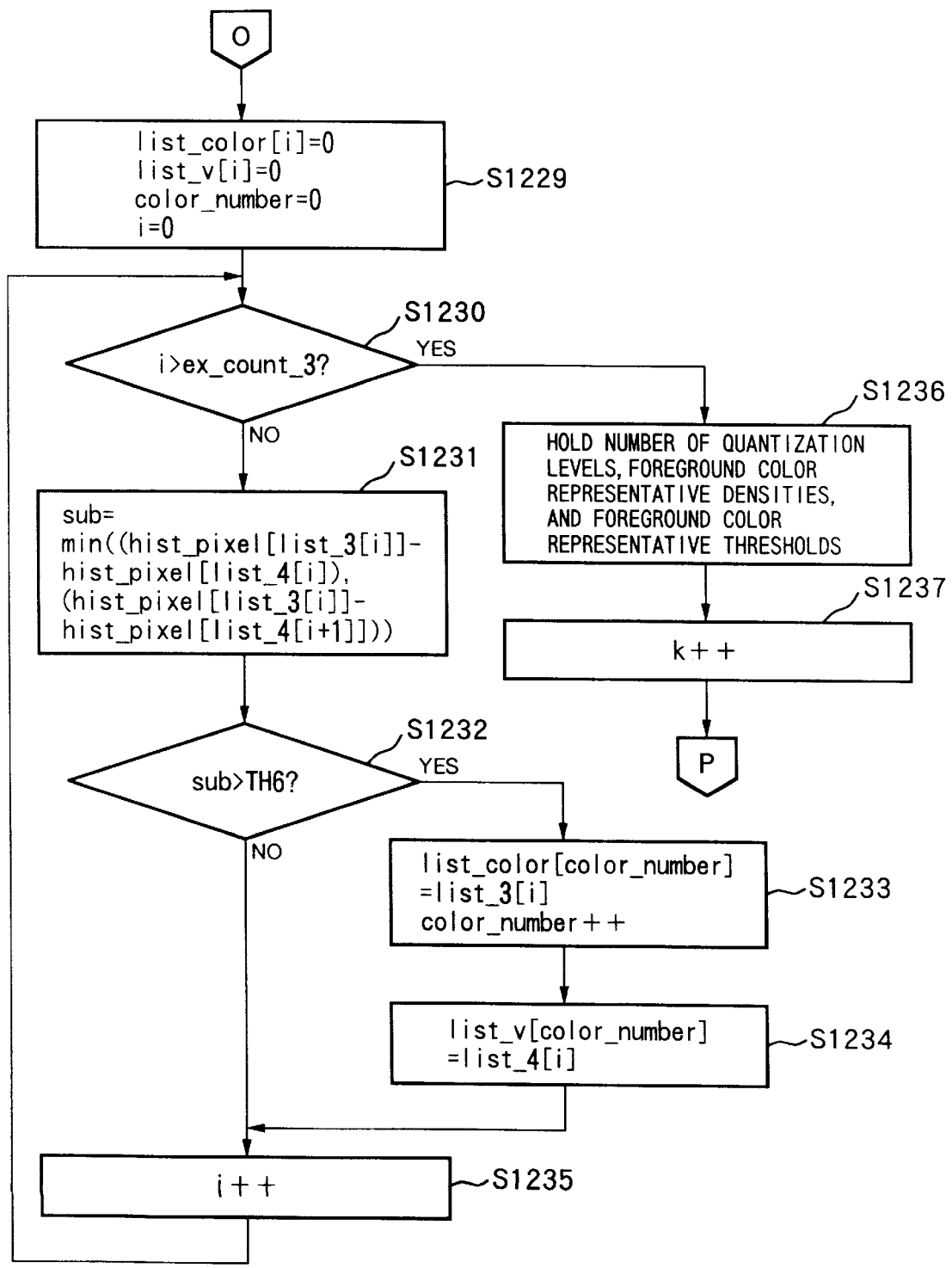
FIG. 47 is a flow chart showing the flow of the processing executed in the sixth embodiment to decide the number of quantization levels for quantizing the respective areas included in binary image data, the foreground color representative colors, and the foreground color representative densities.

Referring to FIG. 47, in step S1229, the contents of a foreground color representative density table list_color[i], the contents of a foreground color representative threshold table list_v[i], the contents of a counter color_number for counting the number of foreground color representative densities, and the contents of the loop counter i for counting the number of maximum values (foreground color representative densities) having undergone foreground color representative density determination are reset to 0. Note that the foreground color representative density table list_color[i] is a table showing the relationship between the count value (list_color[color_number]) of the counter color_number and the pixel value of the smoothed frequency value hist_sm[i] having the maximum value corresponding to the count value. The foreground color representative threshold table list_v[i] is a table showing the relationship between the count value (list_v[color_number]) of the counter color_number and the pixel value of the smoothed frequency value hist_sm[i] having the minimum value corresponding to the count value.

In step S1230, the CPU loads the respective maximum values from the maximum value table list_3[i], and determines whether the number of loaded maximum values is larger than the count value of the counter ex_count_3. In step S1231, variables sub are calculated according to equation (9) until the number of loaded maximum values exceeds the count value of the counter ex_count_3:

$$sub = \min((hist\_pixel[list\_3[i]] - hist\_pixel[list\_4[i]]), (hist\_pixel[list\_3[i]] - hist\_pixel[list\_4[i+1]])) \quad (9)$$

In step S1232, it is checked whether the calculated variable sub is larger than a predetermined threshold Th6. If the calculated difference is larger than the predetermined threshold Th6 (YES in step S1233), the flow advances to step S1233. In step S1233, the contents of the counter color_number are incremented by one, and the pixel value of the smoothed frequency value hist_sm[i] corresponding to the count value list_3[i] of a maximum value table list_3[i] is made to correspond to the count value list_color[color_number] of the foreground color representative density table list_color[i]. In step S1234, the pixel value of the smoothed frequency value hist_sm[i] corresponding to the count value list_4[i] of a minimum value table list_4[i] is made to correspond to the count value list_v[i][color_number] of the foreground color representative threshold table list_v[i]. If the calculated difference is equal to or smaller than the predetermined threshold Th6 (NO in step S1232), the flow advances to step S1235.

In step S1235, the contents of the loop counter i are incremented by one. When the respective maximum values are loaded from the maximum value table list_3[i], and the number of loaded maximum values, i.e., the contents of the loop counter i, become larger than the contents of the counter ex_count_3, the flow advances to step S1236.

In step S1236, the pixel values corresponding to the maximum values stored in the foreground color representative density table list_color[i] are set as foreground color representative densities, and the pixel values corresponding to the minimum values stored in the foreground color representative threshold table list_v[i] are set as foreground color representative thresholds. The count value of the counter color_number indicates the number of foreground color representative densities present in each area, and set as the number of quantization levels for quantizing the area. These values are stored as pieces of information of the respective areas in a predetermined area of the program memory 1202 in units of areas.

In step S1237, the contents of the loop counter k are incremented by one. When quantization level count decision processing of deciding the number of quantization levels required for image expression is completed with respect to all the areas, i.e., the contents of the loop counter k coincide with the count value of the counter area_count, all the processing operations are terminated.

With the processing described with reference to the flow charts of FIGS. 44 to 47, the binary image data stored in the binary frame memory 1207 is divided into areas, and the attributes of the divided areas are determined by image area separation processing. The number of quantization levels for quantizing the respective areas included in the binary image data, the foreground color representative thresholds required for quantization, and foreground color representative densities are decided on the basis of the determined attributes.

Processing of further dividing the respective areas on the basis of the foreground color representative thresholds and foreground color representative density areas for the respective areas will be described next with reference to the flow chart of FIG. 48.

When the image area separation processing in step S1204 in FIG. 44 is performed for a color multi-level image like the one shown in FIG. 38A, since no colors are discriminated, the image is not divided into areas in units of colors. For this reason, the processing described with reference to the flow chart of FIG. 48 is performed to divide the image into areas in units of colors.

Figure 48:
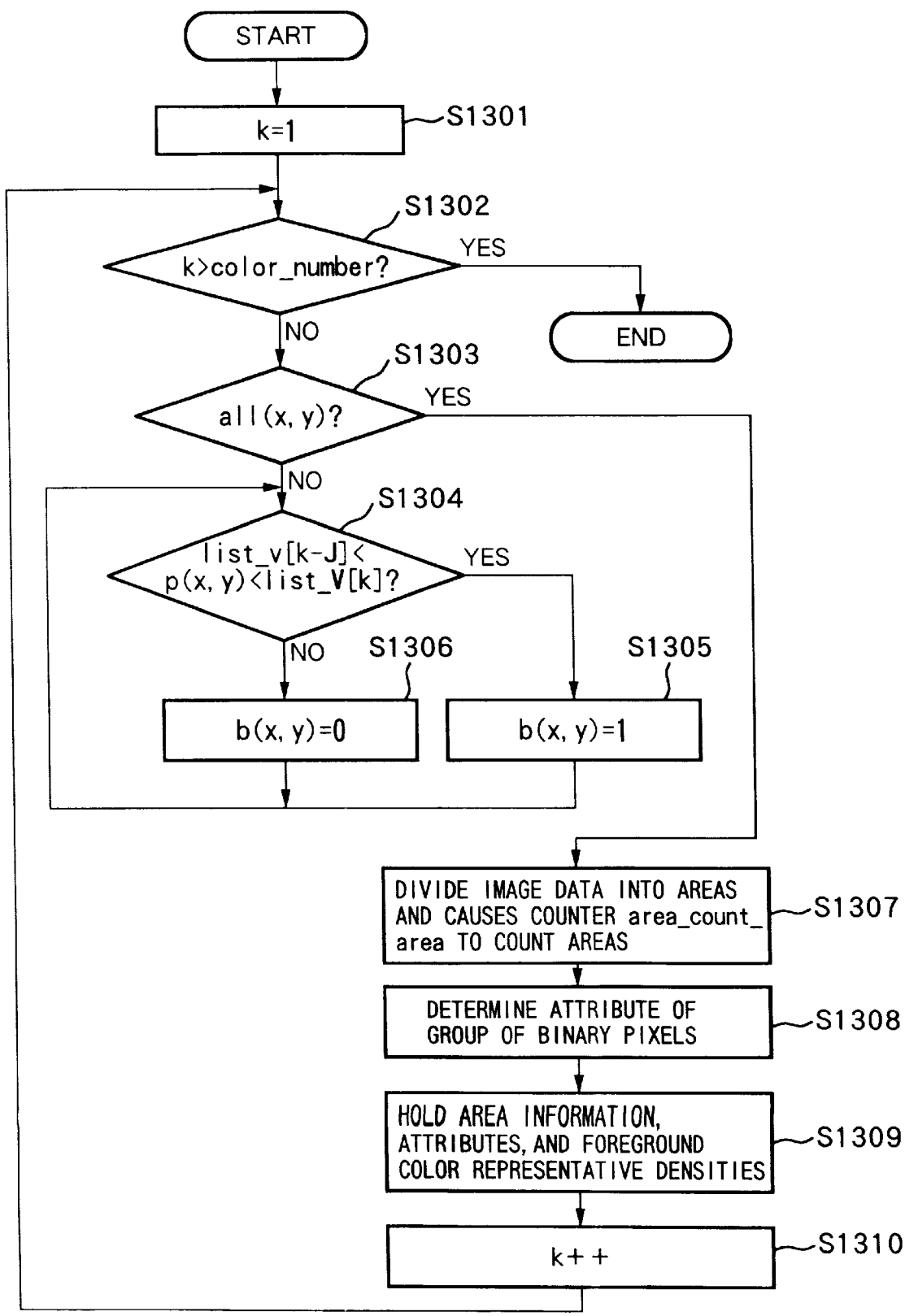
FIG. 48 is a flow chart showing the flow of the processing executed in the sixth embodiment to further divide the respective divided areas on the basis of foreground color representative thresholds and foreground color representative density areas.

FIG. 48 is a flow chart showing the flow of the processing executed in the sixth embodiment to further divide the respective divided areas on the basis of foreground color representative thresholds and foreground color representative density areas.

In step S1301, the value of the loop counter k is set to 1. The loop counter k is incremented by one every time the processing of further dividing each area on the basis of the foreground color representative thresholds and foreground color representative density areas of each area is completed. This count value corresponds to the value counted by the counter color_number as the number of quantization levels.

In step S1302, it is checked whether the value of the loop counter k is larger than that of the counter color_number (the number of quantization levels). If the value of the loop counter k is equal to or smaller than that of the counter color_number (the number of quantization levels) (NO in step S1302), the flow advances to step S1303. In contrast to this, if the value of the loop counter k is larger than that of the counter color_number (the number of quantization levels) (YES in step S1302), it indicates that the processing of further dividing each area on the basis of the foreground color representative thresholds and foreground color representative density areas of each area is completed with respect to all the counted areas. The processing is therefore terminated.

In step S1303, the CPU sequentially loads the pixel values of the image data p(x, y) in the corresponding area from the multi-level frame memory 1206, and determines whether all the pixel data p(x, y) are loaded. In step S1304, the CPU checks whether the pixel value of each of the pixel data p(x, y) which are sequentially loaded is larger than a foreground color representative threshold list_v[k−1] and smaller than a foreground color representative threshold list_v[k], until the pixel values of all the pixel data p(x, y) are loaded.

If the pixel value of the pixel data p(x, y) is larger than the foreground color representative threshold list_v[k−1] and smaller than the foreground color representative threshold list_v[k], the binary image data b(x, y) of the pixel data p(x, y) is written as "1" in the corresponding area of the binary frame memory 1207 in step S1305. In contrast to this, if the pixel value of the pixel data p(x, y) is equal to or smaller than the foreground color representative threshold list_v[k−1] or equal to or larger than the foreground color representative threshold list_v[k], the binary image data b(x, y) of the pixel data p(x, y) is written as "0" in the corresponding area of the binary frame memory 1207 in step S1306.

When the pixel values of all the pixel data p(x, y) in the multi-level frame memory 1206 are compared with the foreground color representative thresholds, the flow advances to step S1307.

In step S1307, the areas included in the binary image data written in the binary frame memory 1207 are further divided in units of areas having similar attributes. The number of areas obtained by further dividing each area is counted by a counter area_count_area. In addition, the position coordinates and sizes of the respective divided areas are obtained. In step S1308, image area separation processing is performed for each counted and divided area to determine the attribute of each area, e.g., "image", "graphic pattern", or "character", on the basis of the density, shape, and arrangement of groups of binary image data "1" included in each area. In this case, image area separation is performed by using the same image area separation method as that used in the third embodiment.

In step S1309, the position coordinates, sizes, attributes, and foreground color representative densities of the further divided areas are stored in a predetermined area of the program memory 1202 in units of areas.

In step S1310, the contents of the loop counter k are incremented by one. When all the areas are further divided on the basis of the foreground color representative thresholds and foreground color representative density areas of the respective areas, i.e., the contents of the loop counter k coincide with the value of the counter color_number (the number of quantization levels), all the processing operations are terminated.

With the processing described with reference to the flow chart of FIG. 48, the respective areas having undergone the image area separation processing in step S1202 in FIG. 42 are further divided into areas in units of colors. In addition, the attributes of the respective divided areas are determined by image area separation processing.

Figure 38C:
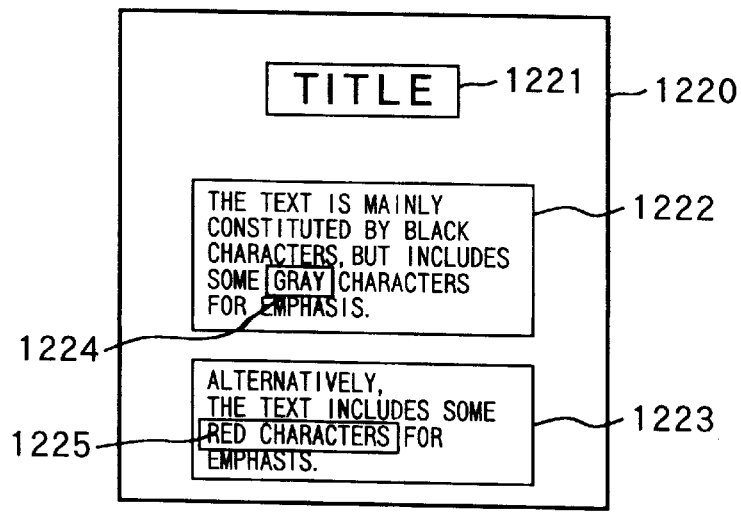
FIG. 38C is a view showing the arrangement of areas obtained by further dividing the divided areas.

When the image area separation processing in step S1202 in FIG. 44 is performed for the original image in FIG. 38A, the areas shown in FIG. 38B are obtained. In contrast to this, when the processing described with reference to the flow chart of FIG. 48 is performed for the original image, an area 1224 indicating gray characters is separated within the area 1222, and an area 1225 indicating red characters is separated within the area 1223, as shown in FIG. 38C. When color multi-level image data is read by a monochrome scanner as in the sixth embodiment, no color information included in the color multi-level image data is read. However, since the density of the color multi-level image data varies depending on colors, the colors can be determined or estimated on the basis of the density differences. For this reason, as in the processing described with reference to the flow chart of FIG. 48, the respective areas can be further divided in units of colors.

Conventionally, the foreground color representative densities of an original image, including the background densities, are determined on the basis of the occurrence frequency values of the pixel values of the original image. For example, a histogram of the occurrence frequency values of the pixel values in the area 1222 in FIG. 38B is formed as shown in FIG. 49A, and a histogram of the occurrence frequency values of the pixel values in the area 1223 is formed as shown in FIG. 49B. When foreground color representative densities are determined on the basis of the maximum values in these histograms, maximum values may be erroneously counted because of noise such as transparency of back side. Furthermore, since the frequency values of densities to be extracted, e.g., characters, are smaller than the overall density, it is difficult to separate them from noise.

In the sixth embodiment, the precision of determination of the foreground color representative densities of an original image is improved by removing the background densities of the original image. For example, FIG. 49C shows a histogram of the occurrence frequency values of the pixel values in the area 1222 in FIG. 38B after removal of the background densities; and FIG. 49D, a histogram of the occurrence frequency values of the pixel values in the area 1223 in FIG. 38B after removal of the background densities. Since histograms in which necessary densities such as those of characters are emphasized can be obtained in this manner, even if the representative densities of black, gray, and red characters are read by the monochrome scanner 1205, the respective representative densities can be clearly read.

Processing of generating structured data of the respective areas included in binary image data on the basis of the attributes of the respective areas included in the binary image data and the corresponding numbers of levels of quantization will be described next with reference to the flow charts of FIGS. 50 to 53.

FIGS. 50 to 53 are flow charts showing the flow of the processing executed in the sixth embodiment to generate structured data of the respective areas included in binary image data.

Figure 50:
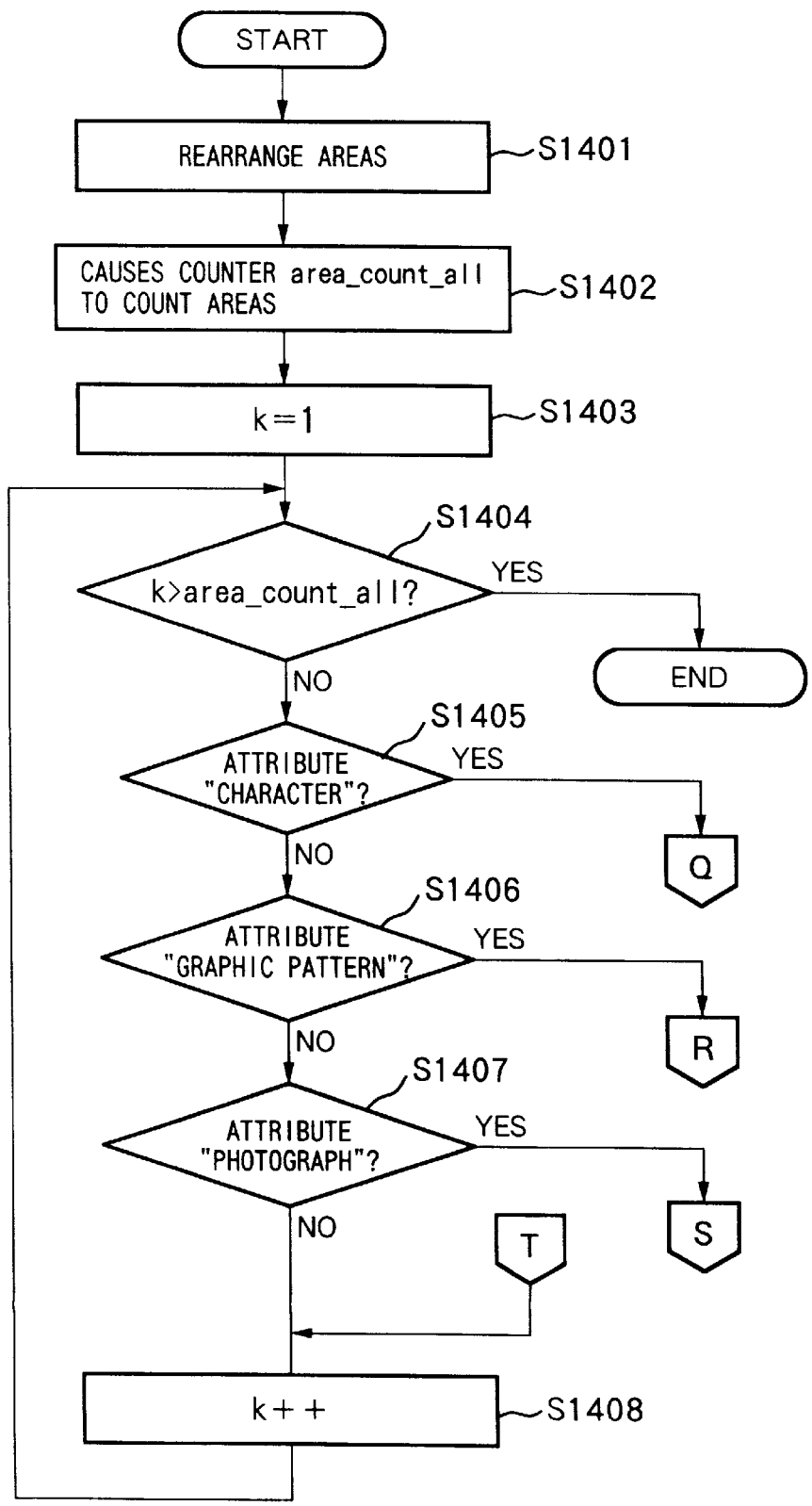
FIG. 50 is a flow chart showing the flow of the processing executed in the sixth embodiment to generate structured data of each area included in binary image data.

Referring to FIG. 50, in step S1401, the CPU 1201 rearranges all the areas stored in the program memory 1202. Rearrangement is performed to decide the processing order of processing operations of generating structured data of the areas included in an original image. In this case, first of all, when areas having the attribute "character", of the areas counted by the counter area_count, are to be further divided by the processing described with reference to the flow chart of FIG. 48, the areas having the attribute "character" before further division of the areas are omitted. The areas having the attribute "character" are determined as a plurality of areas which are further divided. The remaining areas which are not further divided are determined as one area. In this manner, the areas included in the original image are determined. Of the areas stored in the program memory 1202, the areas which are not further divided are retrieved in the raster direction and arranged in the order in which they are retrieved. Subsequently, the areas which are further divided are retrieved in the raster direction and arranged in the order in which they are retrieved.

In step S1402, the total number of areas rearranged is counted by a counter area_count_all. In step S1403, the value of the loop counter k is set to 1. The loop counter k is incremented by one every time the processing of generating structured data of each area is completed. This count value corresponds to the number of areas counted by the counter area_count_all. In step S1404, it is checked whether the value of the loop counter k is larger than the value of the counter area_count_all. If the value of the loop counter k is equal to or smaller than the value of the counter area_count_all (NO in step S1404), the flow advances to step S1405. If the value of the loop counter k is larger than the value of the counter area_count_all (YES in step S1404), it indicates that the processing of generating structured data is performed with respect to all the counted areas. The processing is therefore terminated.

In step S1405, it is checked whether the attribute of the area corresponding to the value of the loop counter k is determined as a "character" by image area separation processing. If the attribute of the area is determined as a "character" (YES in step S1405), the processing in steps S1409 to S1414 (to be described later) will be described below. If the attribute of the area is not determined as a "character" (NO in step S1405), the flow advances to step S1406.

The processing to be executed when the attribute of the area is determined as a "character" will be described below with reference to the flow chart of FIG. 51.

Figure 51:
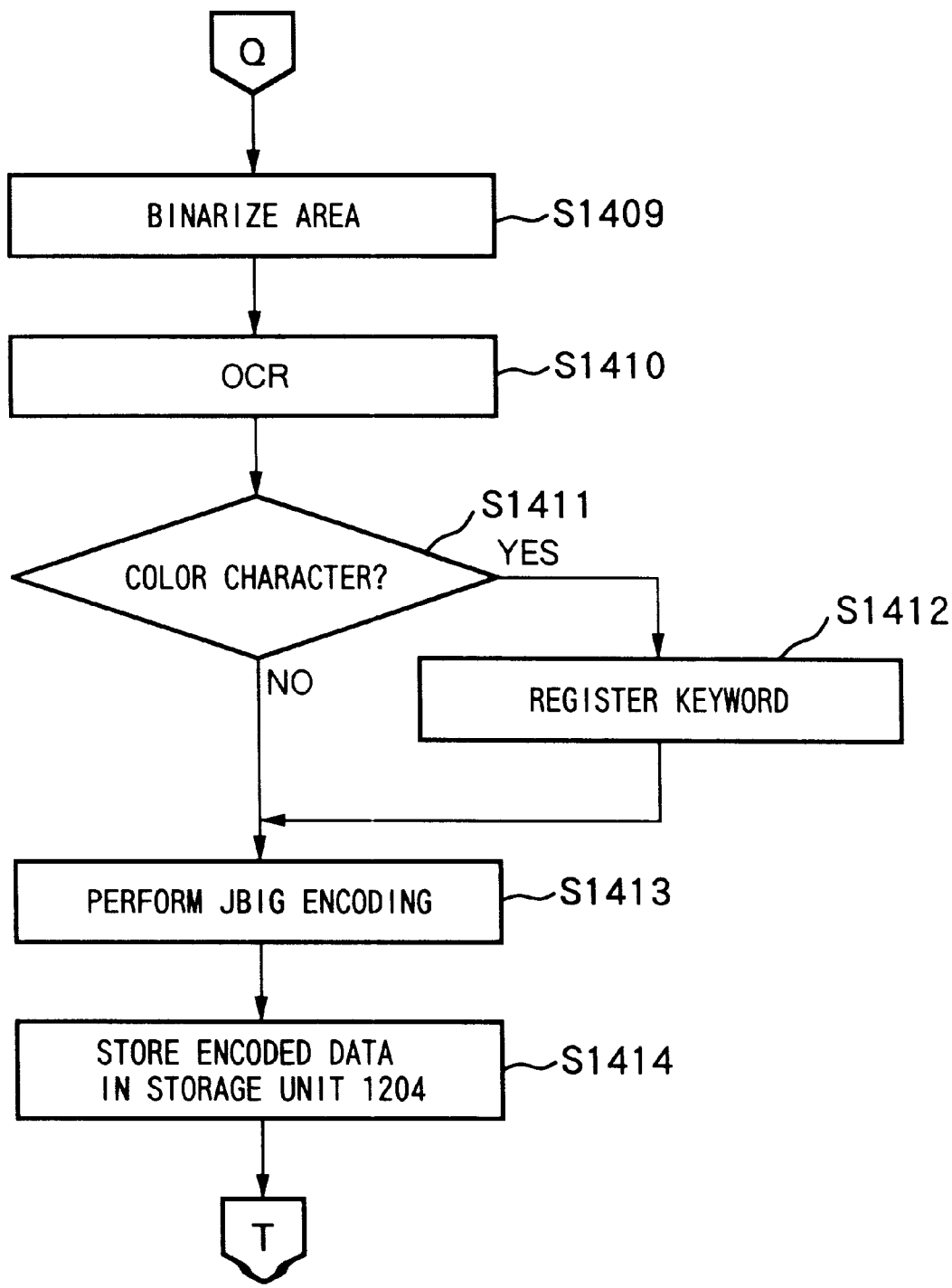
FIG. 51 is a flow chart showing the flow of the processing to be executed in the sixth embodiment when the attribute of an area is a "character"

FIG. 51 is a flow chart showing the flow of the processing to be executed when the attribute of the area is determined as a "character".

In step S1409, the CPU loads image data corresponding to the area whose attribute is a "character" from the multi-level frame memory 1206. The CPU then binarizes the loaded image data such that each pixel having a foreground color representative density is set to "1" and the remaining pixels are set to "0".

In step S1410, OCR is performed with respect to the area whose attribute is a "character". In step S1411, it is checked whether the area is a color character area. If the area is a color character area (YES in step S1411), the flow advances to step S1412. In step S1412, a color is extracted, and the extracted color and the corresponding character string are set as a keyword. If the area is not a color character area (NO in step S1411), the flow advances to step S1413.

In step S1413, JBIG encoding of the area whose attribute is a "character" is performed. In steps S1410 and S1412, the JBIG encoded data is stored in a predetermined area of the storage unit 1204, together with the character strings obtained by OCR, the densities (foreground color representative densities) of the respective character strings, the corresponding character code, and keywords, in accordance with the format of a structured document constituted by structured data. When JBIG encoding and storage of the area are completed, the flow advances to step S1408.

The flow returns to the flow chart in FIG. 50.

In step S1406, it is checked whether the area corresponding to the value of the loop counter k is determined as a "graphic pattern" by image area separation processing. If the attribute of the area is determined as a "graphic pattern" (YES in step S1406), the processing in steps S1415 to S1417 (to be described later) is performed. If the attribute of the area is not determined as a "graphic pattern" (NO in step S1406), the flow advances to step S1407.

The processing to be executed when the attribute of the area is determined as a "graphic pattern" will be described below with reference to the flow chart of FIG. 52.

Figure 52:
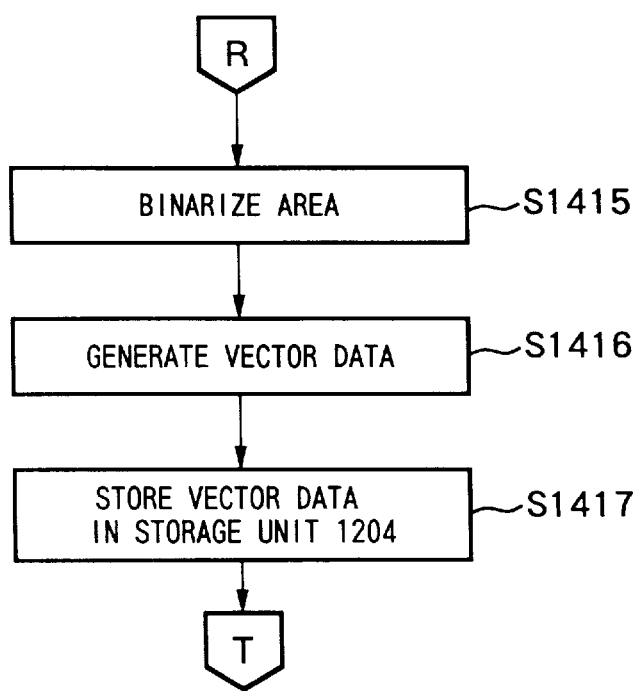
FIG. 52 is a flow chart showing the flow of the processing to be executed in the sixth embodiment when the attribute of the area is a "graphic pattern"

FIG. 52 is a flow chart showing the flow of the processing to be executed in the sixth embodiment when the attribute of the area is determined as a "graphic pattern".

In step S1415, the CPU loads image data corresponding to the area whose attribute is a "graphic pattern" from the multi-level frame memory 1206. The CPU then binarizes the loaded image data such that each pixel having a foreground color representative density is set to "1", and the remaining pixels are set to "0". In step S1416, the CPU generates vector data from the area whose attribute is a "graphic pattern" by outline extraction.

In step S1417, the generated vector data is stored in a predetermined area of the storage unit 1204, together with the foreground color representative densities, the coordinates, and the area size, in accordance with the format of a structured document constituted by structured data. When the vector data is generated from the area and stored, the flow advances to step S1408.

The flow returns to the flow chart in FIG. 50.

In step S1407, it is checked whether the attribute of the area corresponding to the value of the loop counter k is determined as a "photograph" by image area separation processing. If the attribute of the area is a "photograph" (YES in step S1407), the processing in steps S1418 and S1419 (to be described later) is performed. If the attribute of the area is a "photograph" (NO in step S1407), the flow advances to step S1408.

The processing to be executed when the attribute of the area is a "photograph" will be described with reference to the flow chart of FIG. 53.

Figure 53:
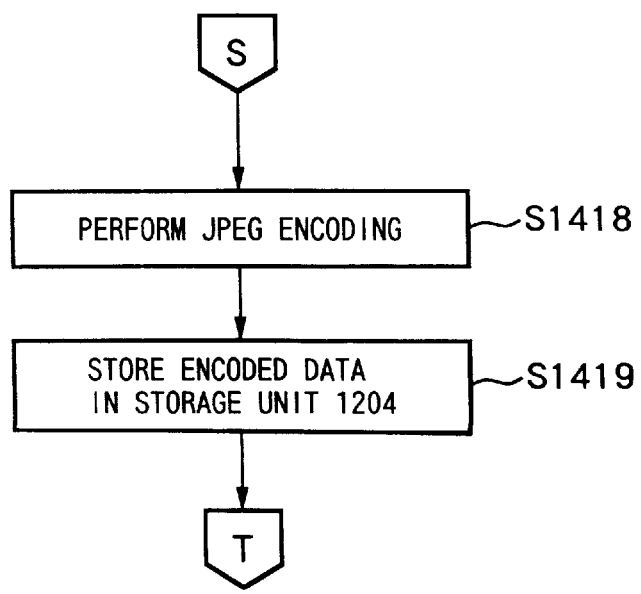
FIG. 53 is a flow chart showing the flow of the processing to be executed in the sixth embodiment when the attribute of the area is a "photograph"

FIG. 53 is a flow chart showing the flow of the processing to be executed in the sixth embodiment when the attribute of the area is a "photograph".

In step S1418, the CPU loads image data corresponding to the area whose attribute is a "photograph" from the multi-level frame memory 1206. The CPU then performs JPEG encoding of the loaded image data.

In step S1419, the encoded data obtained by JPEG encoding is stored in a predetermined area of the storage unit 1204, together with the coordinates and the area size, in accordance with the format of a structured document constituted by structured data. When JPEG encoding and storage of the area are completed, the flow advances to step S1408.

The flow returns to the flow chart in FIG. 50 again.

In step S1408, the contents of the loop counter k are incremented by one. When structured data of all the areas are generated, i.e., the contents of the loop counter k coincide with the value of a counter area_count_all, all the processing operations are terminated.

With the processing described with respect to the flow charts of FIGS. 50 to 53, structured data of each area included in binary image data is generated on the basis of the attribute of each area included in the binary image and the corresponding number of quantization levels.

In the sixth embodiment, structured data is stored in the storage unit 1204. However, this data can be transmitted to the communication line 1209 through the communication interface 1208.

As described above, according to the sixth embodiment, the background representative density bg_value, the density width upper limit bt1, and the density width lower limit bt0 are extracted on the basis of a histogram of the pixel values of image data, and all the pixel values within the range of the density width upper limit bt1 to the density width lower limit bt0 are output as the background representative densities bg_value, thereby outputting a constant, proper background density.

In addition, a group of pixels exhibiting occurrence frequency values equal to or larger than the threshold noise_th, including pixel values exhibiting the maximum occurrence frequency values in a histogram other than the maximum occurrence frequency value indicating the background representative density bg_value, are determined as an image portion present in the original image other than the background. This group of pixels within the predetermined range, which expresses the determined image portion, is uniformly output as pixel values (foreground color representative densities) exhibiting the maximum occurrence frequency values within the predetermined range. With this operation, an image can be output with constant, proper pixel values.

Furthermore, since the number of quantization levels for quantizing the original image and thresholds therefor are determined on the basis of the range of the pixel values within the predetermined range, including the foreground color representative densities expressing the determined image, and the number of pixel values, the number of quantization levels required to properly quantize the original image can be decided.

Moreover, proper area determination can be performed with respect to a color image at high speed with a relatively small circuit size. Quantization required for reproduction of an image can be properly performed in units of areas, and characters and graphic patterns having specific colors can be properly determined. The image can therefore be structured at a higher level.

Note that the arrangements of the image processing apparatuses of the fourth to sixth embodiment are not limited to those described above, and may be partly realized by software, e.g., programs.

In the fourth to sixth embodiments, monochrome image data is processed. As is apparent, however, the present invention can also be applied to a color image by processing an L*a*b* image in the same manner as a monochrome image. In addition, the number of input bits and formation of a histogram upon input of data are not limited to those described above. For example, the frequency distribution of quantized data may be formed.

A histogram may not be formed from all input pixels but may be formed from some of the input pixels upon thinning out or the like. With this operation, high-speed processing can be realized.

The methods of performing image area separation processing and quantization are not limited to those described above, and other methods may be used. According to the above description, each area has a rectangular shape. However, the present invention is not limited to this, and each area may have an arbitrary shape defined by a contour line or the like.

In the above arrangement, the frame memory is used. However, the present invention is not limited to this, and a line buffer or the like may be used.

Note that the present invention may be applied to either a system constituted by a plurality of devices (e.g., a host computer, an interface device, and a reader, a printer), or an apparatus consisting of a single device (e.g., a copying machine or a facsimile apparatus).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiment may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer and receives the program code read out from the storage medium.

Figure 54:
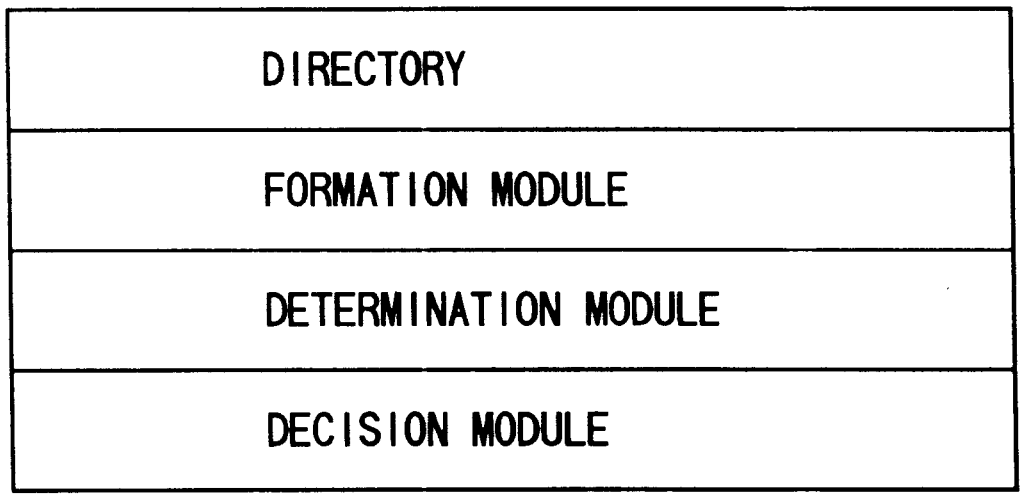
FIG. 54 is a view showing the memory map structure of a storage medium in which programs corresponding to the flows of the processing executed in the present invention are stored.

When the present invention is applied to the storage medium, the storage medium stores program codes corresponding to the above-mentioned flow charts. As will be briefly described below, the respective modules shown in an example of the memory map in FIG. 54 are stored in the storage medium.

More specifically, the program codes of at least a "formation module", "determination module", and "decision module" need only be stored in the storage medium.

Note that the "formation module" forms the distribution of the occurrence frequencies of the densities of image data. The "determination module" determines a density area exhibiting occurrence frequency values equal to or larger than a predetermined threshold and including the density exhibiting the maximum occurrence frequency value. The "decision module" decides the number of quantization levels on the basis of the number of maximum values included in the distribution other than the determined density area.

As described above, according to each embodiment of the present invention, there is provided an image processing apparatus and method which can properly remove noise in the background of image data of an original image read by a scanner or the like, and improve the quality of an output image based on the image data.

In addition, there is provided an image processing apparatus and method which can properly determine the number of quantization levels for quantizing image data by properly removing noise from the background of the image data.

Furthermore, proper area determination can be performed with respect to an image at high speed with a relatively small circuit size. Graphic pattern/photograph determination can be accurately performed by eliminating the influences of noise. Even if there is no difference in luminance between a background and characters, they can be accurately detected.

Moreover, quantization required for reproduction of an image is properly performed in units of areas, and characters and graphic patterns having specific colors are properly determined. The image can therefore be output, encoded, and structured at a higher level.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

input means for inputting multi-level image data representing an image;

extracting means for extracting binary image data from the multi-level image data;

dividing means for dividing the image into a plurality of blocks based on the binary image data;

deciding means for deciding a number of quantization levels to be utilized for quantization processing for each of the plurality of blocks based on the binary image data; and quantizing means for quantizing the multi-level image data in each of said blocks by using the number of quantization levels decided by the deciding means, said quantizing means comprising forming means for forming frequency histograms of said multi-level image data in units of said blocks, wherein the number of quantization levels is determined on the basis of the frequency histograms, wherein the multi-level image data is constituted by a plurality of color component data, and wherein said binary image data is extracted by the extracting means on the basis of a distribution of said multi-level image data, said distribution being examined on the basis of the frequency histograms of said multi-level image data.

2. The apparatus according to claim 1, wherein said dividing means divides the image into said blocks on the basis of attributes of the image.

3. The apparatus according to claim 2, wherein said attributes include at least a "character" and a "photograph".

4. The apparatus according to claim 1, further comprising discriminating means for discriminating characters of a plurality of colors based on the quantized multi-level image data.

5. The apparatus according to claim 4, wherein said discriminating means outputs the characters of a plurality of colors as character codes.

6. An image processing method comprising:

an input step of inputting multi-level image data representing an image;

an extraction step of extracting binary image data from the multi-level image data;

a division step of dividing the image into a plurality of blocks based on the binary image data;

a deciding step of deciding a number of quantization levels to be utilized for quantization processing for each of the plurality of blocks based on the binary image data; and a quantization step of quantizing the multi-level image data in each of said blocks by using the number of quantization levels by deciding step, said quantizing step comprising a forming step for forming frequency histograms of said multi-level image data in units of said blocks, wherein the number of quantization levels is determined on the basis of the frequency histograms, wherein the multi-level image data is constituted by a plurality of color component data, and wherein said binary image data is extracted by the extracting step on the basis of a distribution of said multi-level image data, said distribution being examined on the basis of the frequency histograms of said multi-level image data.

7. A computer readable memory that stores program codes of image processing, comprising:

a program code of an input step of inputting multi-level image data representing an image;

a program code of an extraction step of extracting binary image data from the multi-level image data;

a program code of a division step of dividing the image into a plurality of blocks based on the binary image data;

a program code of a deciding step of deciding a number of quantization levels to be utilized for quantization processing for each of the plurality of blocks based on the binary image data; and a program of quantization step of quantizing the multi-level image data in each of said blocks by using the number of quantization levels decided by deciding step, said quantization step comprising a forming step for forming frequency histograms of said multi-level image data in units of said blocks, wherein the number of quantization levels is determined on the basis of the frequency histograms, wherein the multi-level image data is constituted by a plurality of color component data, and wherein said binary image data is extracted by the extracting step on the basis of a distribution of said multi-level image data, said distribution being examined on the basis of the frequency histograms of said multi-level image data.

8. An image processing apparatus comprising:

forming means for forming a frequency distribution of densities of image data;

calculating means for calculating a predetermined threshold on the basis of the distribution formed by said forming means;

extracting means for extracting a density exhibiting maximum frequency value in the distribution formed by said forming means;

determining means for determining a density area exhibiting frequency values not less than the threshold and including the density exhibiting the maximum frequency value; and output means for uniformly outputting densities of the image data which have densities within the density area as densities exhibiting the maximum frequency value, wherein the image data is color image data.

9. The apparatus according to claim 8, wherein said output means outputs the density exhibiting the maximum frequency value as a background density of the image data.

10. The apparatus according to claim 8, wherein said calculating means comprises quantizing means for quantizing the distribution on the basis of the density exhibiting the maximum frequency value, and detecting means for detecting numbers of same frequency values in the distribution quantized by said quantizing means, and calculates the threshold on the basis of a frequency value exhibiting a maximum number of same frequency values of the numbers of frequency values detected by said detecting means.

11. The apparatus according the claim 8, further comprising acquiring means for acquiring image data, of the image data, which has an even density, and
wherein said forming means forms a distribution of frequency values of densities of the image data acquired by said acquiring means.

12. The apparatus according to claim 8, further comprising:
a plurality of encoding means for encoding said image data;
dividing means for dividing image data into a plurality of areas in unit of attributes;
counting means for counting maximum values present in an output distribution of densities of image data corresponding to the area; and
selecting means for selecting one of said encoding means to encode the image data corresponding to the area on the basis of a result obtained by said counting means.

13. The apparatus according to claim 12, wherein said encoding means includes at least multi-level image encoding, binary image encoding, and shape encoding.

14. The apparatus according to claim 8, wherein said forming means forms luminance image data from the color image data, and forms a frequency distribution of the luminance image data.

15. An image processing method comprising:
a formation step of forming a frequency distribution of densities of image data;
a calculation step of calculating a predetermined threshold on the basis of the distribution formed in said formation step;
an extraction step of extracting a density exhibiting a maximum frequency value in the distribution formed in said formation step;
a determination step of determining a density area exhibiting frequency values not less than the threshold and including the density exhibiting the maximum frequency value; and
an output step of uniformly outputting densities of the image data which have densities within the density area as densities exhibiting the maximum frequency value,
wherein the image data is color image data.

16. A computer readable memory that stores program codes of an image processing, comprising:
a program code of a formation step of forming a frequency distribution of densities of image data;
a program code of a calculation step of calculating a predetermined threshold on the basis of the distribution formed in said formation step;
a program code of an extraction step of extracting a density exhibiting a maximum frequency value in the distribution formed in said formation step;
a program code of a determination step of determining a density area exhibiting frequency values not less than the threshold and including the density exhibiting the maximum frequency value; and
a program code of an output step of uniformly outputting densities of the image data which have densities within the density area as densities exhibiting the maximum frequency value,
wherein the image data is color image data.

17. An image processing apparatus comprising:
forming means for forming a frequency distribution of densities of image data;
determining menas for determining a density area exhibiting frequency values not less than a predetermined threshold and including a maximum frequency value in the distribution formed by said forming means; and
first deciding means for deciding numbers of quantization levels on the basis of a number of maximum values included in the distribution other than the density area determined by said determining means.

18. The apparatus according to claim 17, further comprising:
extracting means for extracting densities exhibiting maximum and minimum frequency values; and
second deciding means for deciding a quantization level for quantization of the image data from the distribution on the basis of the density exhibiting the maximum frequency value and extracted by said extracting means.

19. The apparatus according to claim 18, wherein if there are a plurality of maximum values in a predetermined density range and a predetermined frequency range, said extracting means extracts a largest maximum value among the plurality of maximum values.

20. The apparatus according to claim 18, further comprising:
quantizing means for quantizing the image data on the basis of the quantization level; and
first output means for outputting a density of the image data on the quantization level which is quantized by said quantizing means as a maximum density on the quantization level.

21. The apparatus according to claim 17, further comprising second output means for uniformly outputting densities of the image data having densities within the density area as densities exhibiting the maximum frequency values.

22. The apparatus according to claim 21, wherein said second output means outputs the density exhibiting the maximum frequency value as a background density of the image data.

23. The apparatus according to claim 22, further comprising detecting means for detecting an area having a smaller density difference than the image data, and
wherein said second output means outputs a background density of the image data on the basis of a distribution of densities of the image data in the area detected by said detecting means.

24. The apparatus according to claim 17, further comprising dividing means for dividing the image data into a plurality of areas in units of attributes, and
wherein said forming means forms a frequency distribution of the densities of the image data corresponding to the area.

25. The apparatus according to claim 17, wherein said image data is image data represented by a plurality of signals, and said forming means forms a frequency distribution of constituent elements of the image.

26. The apparatus according to claim 25, wherein each signal of the image data is represented by a luminance and a chromaticity.

27. The apparatus according to claim 26, wherein said determining means determines density areas each exhibiting frequency values not less than a predetermined threshold and including a density exhibiting a maximum frequency value in a frequency distribution of density values of each of the signals, formed by said forming means, and further comprising judging means for judging the number of quantization levels for quantizing the image data and colors included in the image data on the basis of the number of maximum values included in the distribution other than each of density areas determined by said determining means.

28. The apparatus according to claim 25, wherein each signal of the image data is represented by an intensity of a reference color stimulus.

29. An image processing method comprising:

a formation step of forming a frequency distribution of densities of image data;

a determination step of determining a density area exhibiting frequency values not less than a predetermined threshold and including a maximum frequency value in the distribution formed at said formation step; and a first decision step of deciding numbers of quantization levels on a basis of the number of maximum values included in the distribution other than the density area determined at said determination step.

30. A computer readable memory that stores program codes of an image processing, comprising:

a program code of a formation step of forming a frequency distribution of densities of image data;

a program code of a determination step of determining a density area exhibiting frequency values not less than a predetermined threshold and including a maximum frequency value in the distribution formed at said formation step; and a program code of a first decision step of deciding numbers of quantization levels on the basis of a number of maximum values included in the distribution other than the density area determined at said determination step.

* * * * *

UNITED STATES PATENT AND TRADEMARK OFFICE
CERTIFICATE OF CORRECTION

PATENT NO. : 6,389,162 B2
DATED : May 14, 2002
INVENTOR(S) : Maeda

It is certified that error appears in the above-identified patent and that said Letters Patent is hereby corrected as shown below:

Title page,
Item [56], References Cited, OTHER PUBLICATIONS, "Automated Entry System … Patter Recognition …" should read -- Automated Entry System For Printed Documents", T. Akiyama et al. Pattern Recognition, 1990, UK, vol. 223, No. 11, ISSN 0031-3203, pp. 1141-1154. --;
Item [56], References Cited, FOREIGN PATENT DOCUMENTS, "62226770" should read -- 62-226770 --; "6415889" should read -- 64-15889 --; "3126181" should read -- 3-126181 --; "4248766" should read -- 4-248766 --; and "5233783" should read -- 5-233783 --.

Column 1,
Line 56, "removes" should read -- remove --.

Column 8,
Line 39, "Prior" should read -- Prior to --; and
Line 63, "calculates" should read -- calculate --.

Column 30,
Line 8, "determines" should read -- determine --.

Column 39,
Line 52, "top" should read -- to --.

Column 42,
Line 58, "an" should read -- with an --.

Column 50,
Line 49, "terminated." should read -- is terminated --.

Column 62,
Line 23, "program" should read -- program code --.

Column 63,
Line 16, "unit" should read -- units --.

UNITED STATES PATENT AND TRADEMARK OFFICE
CERTIFICATE OF CORRECTION

PATENT NO. : 6,389,162 B2
DATED : May 14, 2002
INVENTOR(S) : Maeda

It is certified that error appears in the above-identified patent and that said Letters Patent is hereby corrected as shown below:

<u>Column 64,</u>
Line 4, "menas" should read -- means --; and

Signed and Sealed this

Twenty-fourth Day of December, 2002

JAMES E. ROGAN
*Director of the United States Patent and Trademark Office*

UNITED STATES PATENT AND TRADEMARK OFFICE
CERTIFICATE OF CORRECTION

PATENT NO. : 6,389,162 B2
DATED : May 14, 2002
INVENTOR(S) : Maeda

It is certified that error appears in the above-identified patent and that said Letters Patent is hereby corrected as shown below:

Title page,
Item [56], References Cited, OTHER PUBLICATIONS, "Automated Entry System … Patter Recognition …" should read -- Automated Entry System For Printed Documents", T. Akiyama et al. Pattern Recognition, 1990, UK, vol. 223, No. 11, ISSN 0031-3203, pp. 1141-1154. --;
FOREIGN PATENT DOCUMENTS,
"62226770" should read -- 62-226770 --; "6415889" should read -- 64-15889 --; "3126181" should read -- 3-126181 --; "4248766" should read -- 4-248766 --; and "5233783" should read -- 5-233783 --.

Column 1,
Line 56, "removes" should read -- remove --.

Column 8,
Line 39, "Prior" should read -- Prior to --; and
Line 63, "calculates" should read -- calculate --.

Column 30,
Line 8, "determines" should read -- determine --.

Column 39,
Line 52, "top" should read -- to --.

Column 42,
Line 58, "an" should read -- with an --.

Column 50,
Line 49, "terminated." should read -- is terminated --.

Column 62,
Line 23, "program" should read -- program code --.

UNITED STATES PATENT AND TRADEMARK OFFICE
CERTIFICATE OF CORRECTION

PATENT NO. : 6,389,162 B2
DATED : May 14, 2002
INVENTOR(S) : Maeda

It is certified that error appears in the above-identified patent and that said Letters Patent is hereby corrected as shown below:

<u>Column 63,</u>
Line 16, "unit" should read -- units --.

<u>Column 64,</u>
Line 4, "menas" should read -- means --.

Signed and Sealed this

Twenty-second Day of April, 2003

JAMES E. ROGAN
*Director of the United States Patent and Trademark Office*